March 21, 1944.  S. N. WIGHT ET AL  2,344,761
AIRWAY TRAFFIC CONTROL SYSTEM
Filed June 5, 1943  22 Sheets-Sheet 1

Inventors
S. N. Wight and O. S. Field
By Neil L. Preston,
Their Attorney

March 21, 1944.　　S. N. WIGHT ET AL　　2,344,761
AIRWAY TRAFFIC CONTROL SYSTEM
Filed June 5, 1943　　22 Sheets-Sheet 2
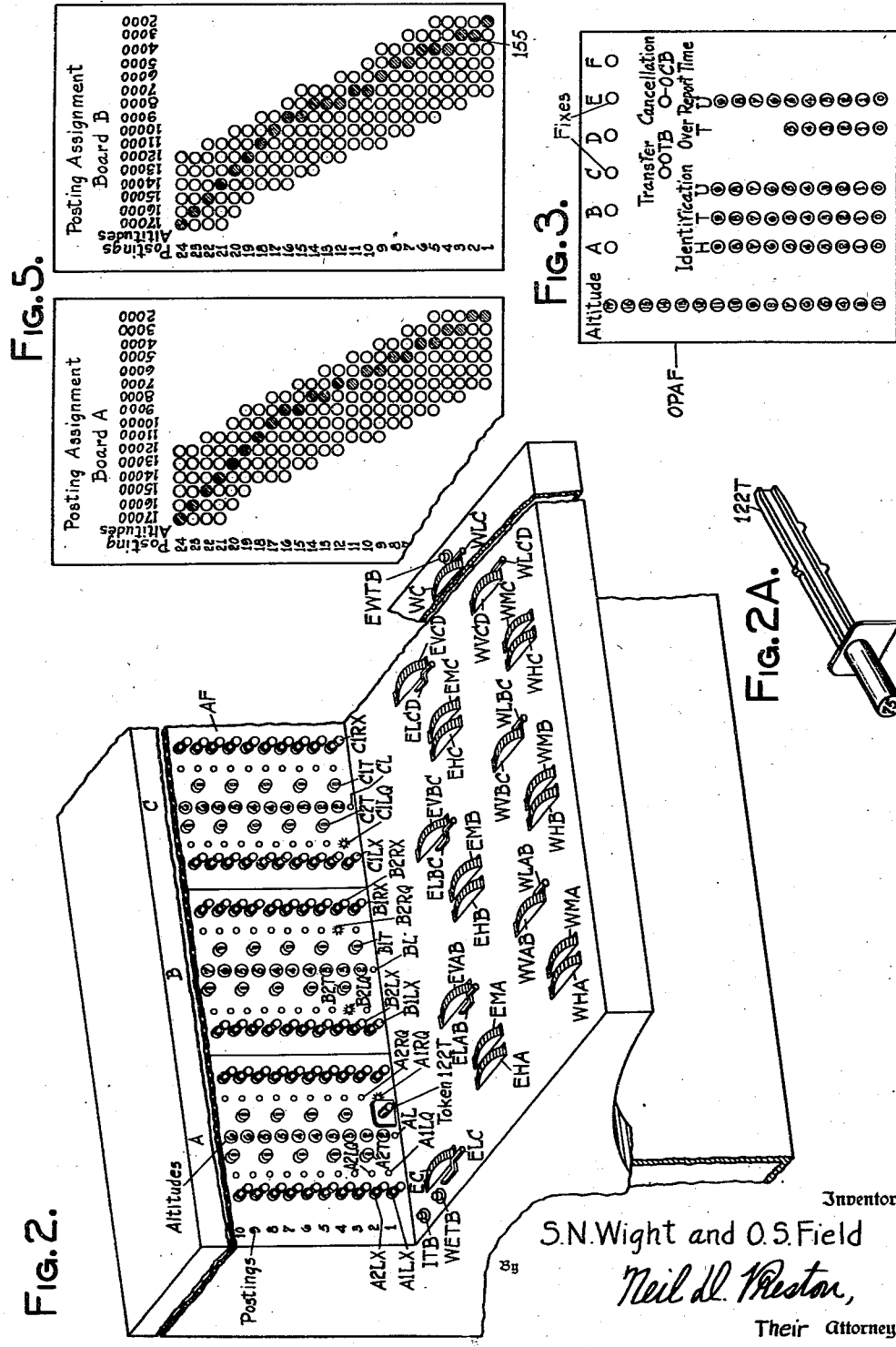
Inventors
S. N. Wight and O. S. Field
Neil D. Preston,
Their Attorney

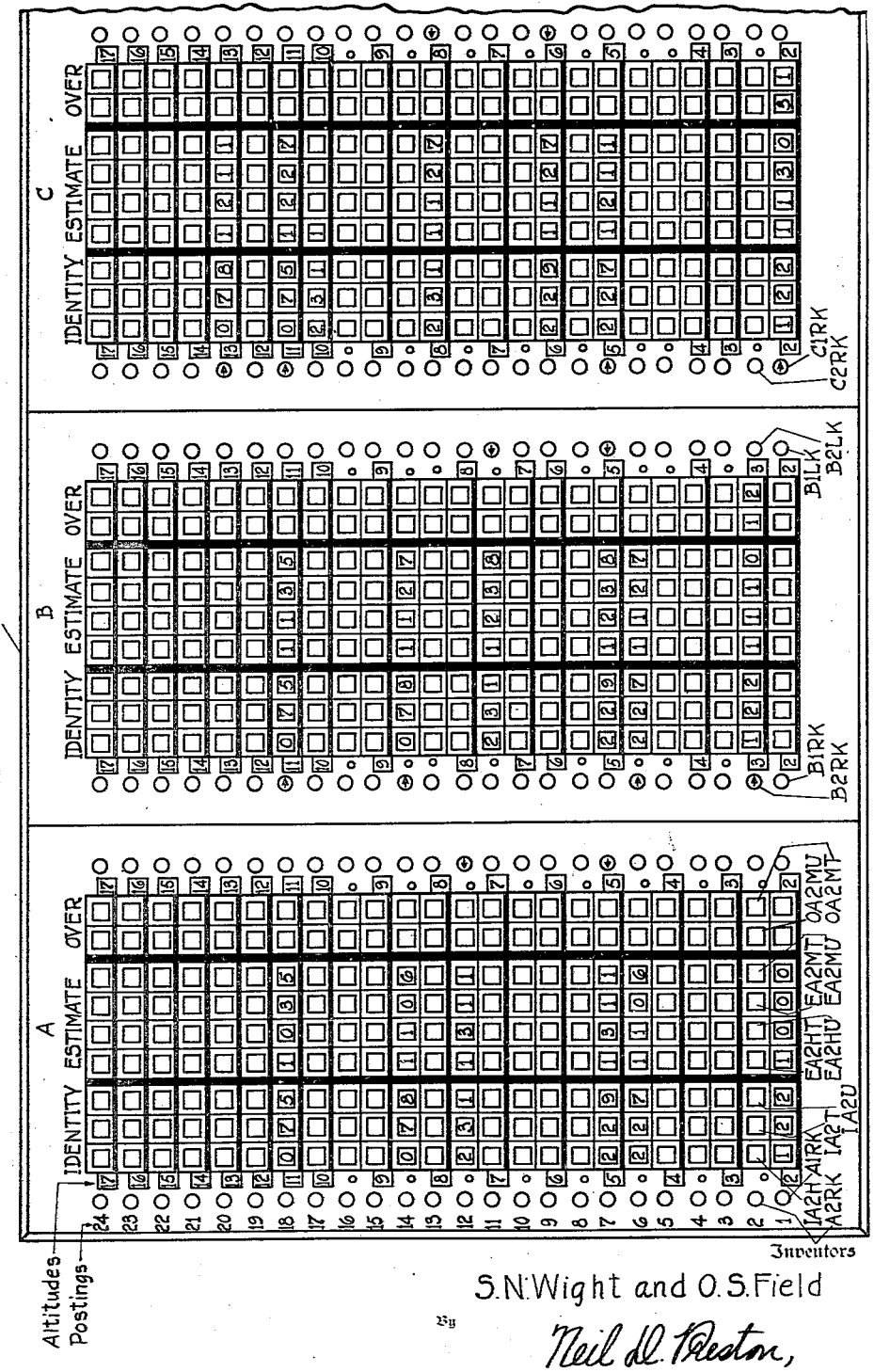

March 21, 1944.    S. N. WIGHT ET AL    2,344,761
AIRWAY TRAFFIC CONTROL SYSTEM
Filed June 5, 1943    22 Sheets-Sheet 4
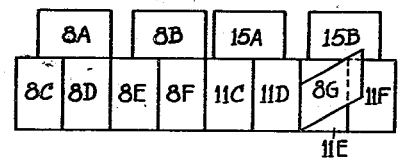
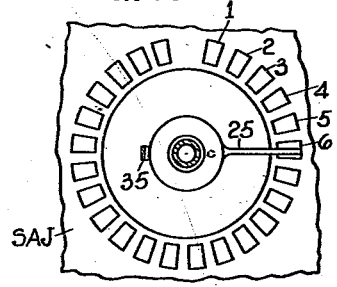
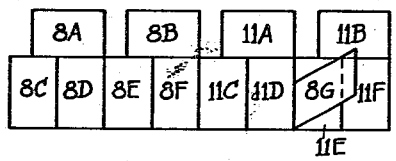
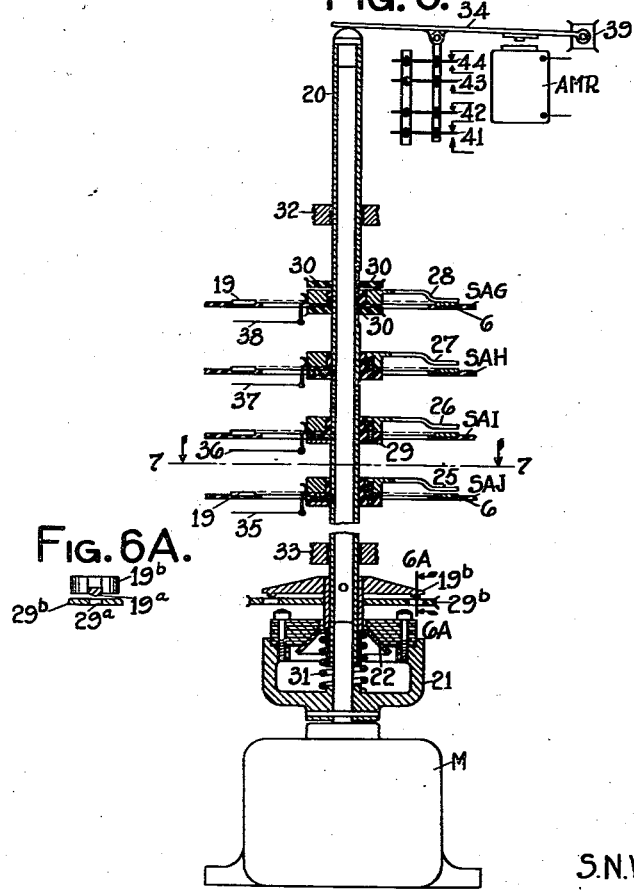
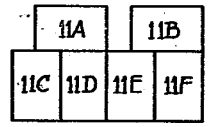
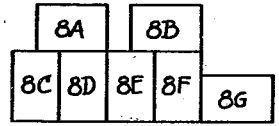
Inventors
S. N. Wight and O. S. Field
Neil d. Preston,
Their Attorney

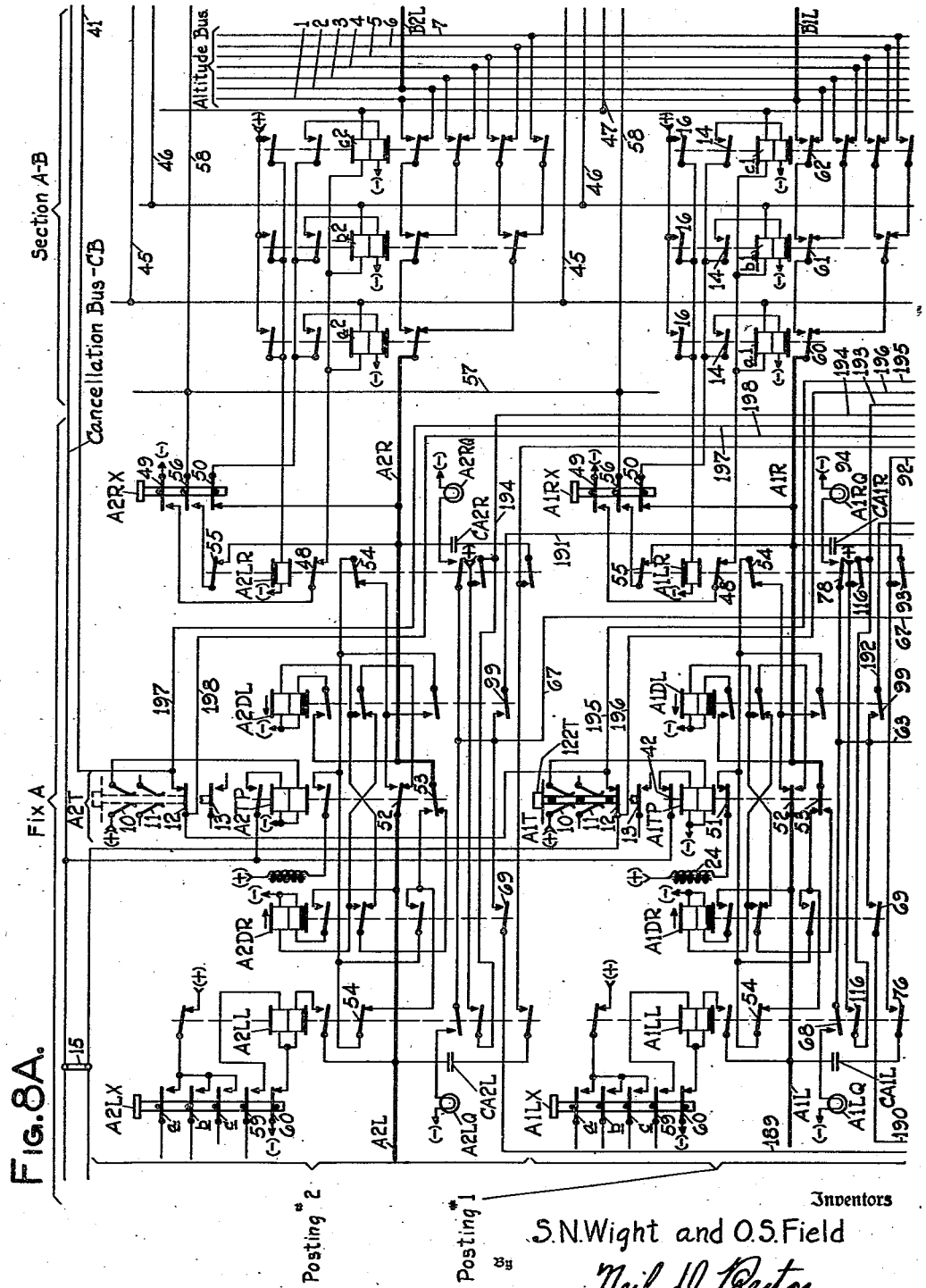

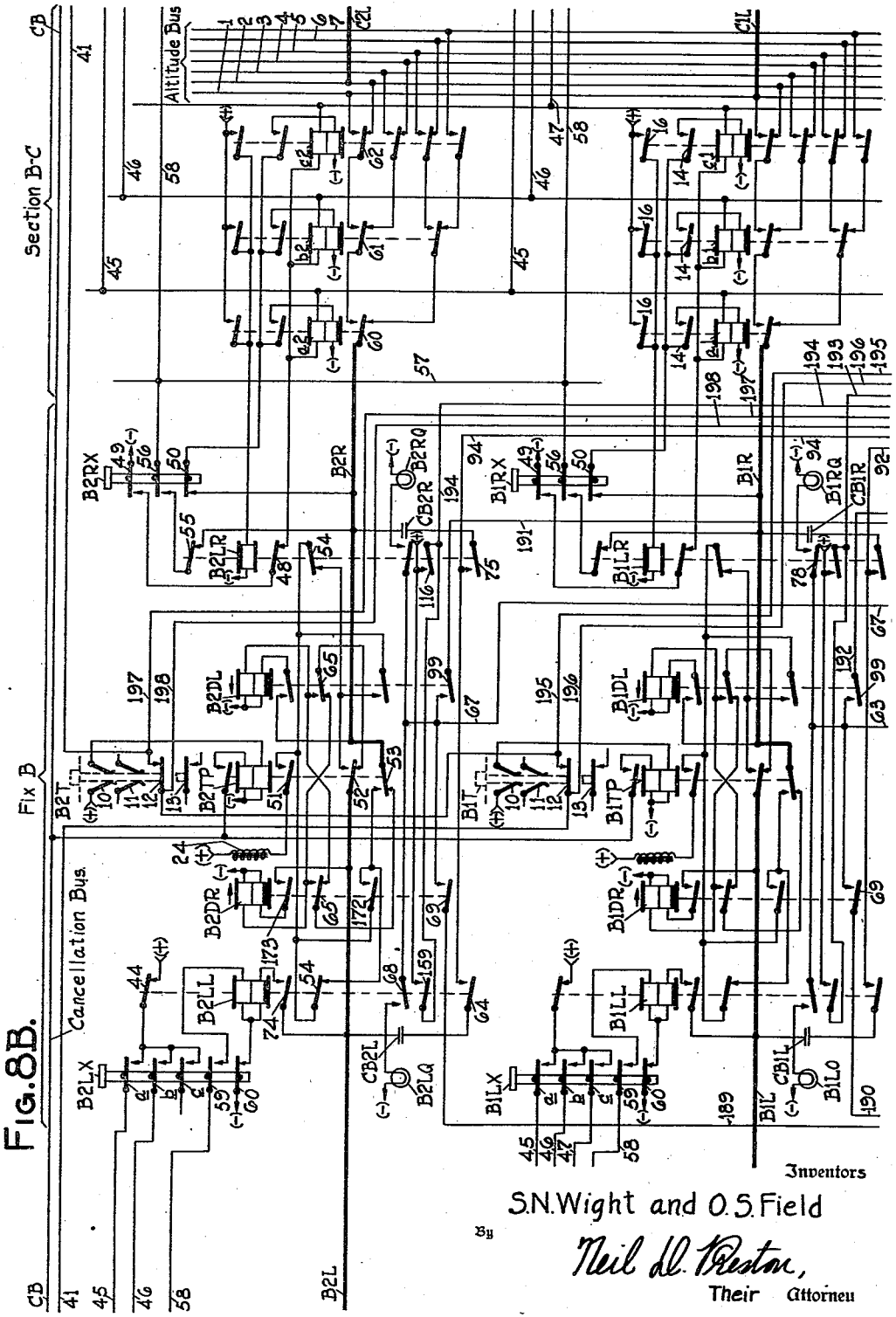
March 21, 1944.  S. N. WIGHT ET AL  2,344,761
AIRWAY TRAFFIC CONTROL SYSTEM
Filed June 5, 1943  22 Sheets-Sheet 6
Inventors
S.N.Wight and O.S.Field
By Neil D. Preston,
Their Attorney March 21, 1944.    S. N. WIGHT ET AL    2,344,761
AIRWAY TRAFFIC CONTROL SYSTEM
Filed June 5, 1943    22 Sheets-Sheet 7

Inventors
S. N. Wight and O. S. Field
By Neil D. Preston,
Their Attorney

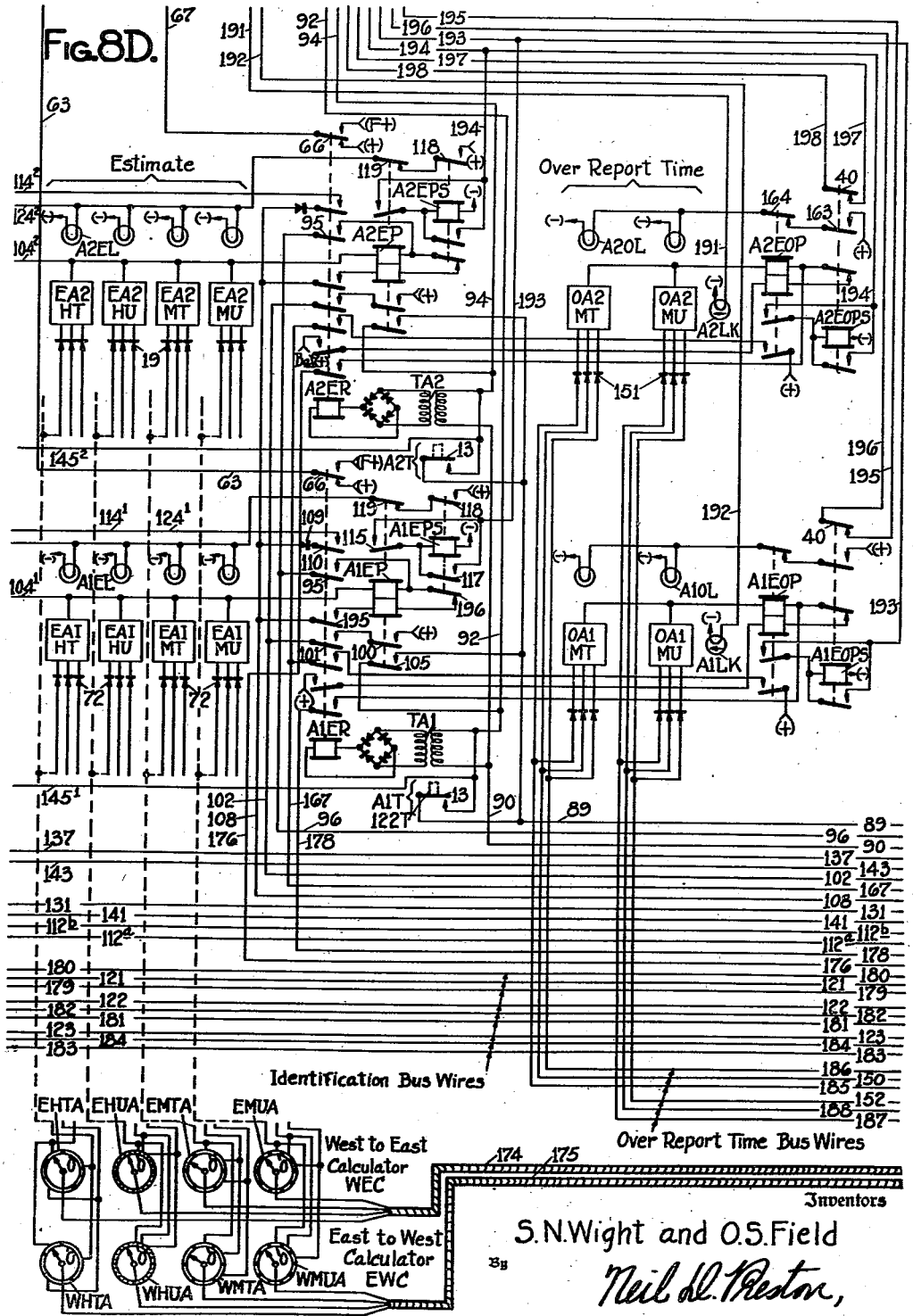

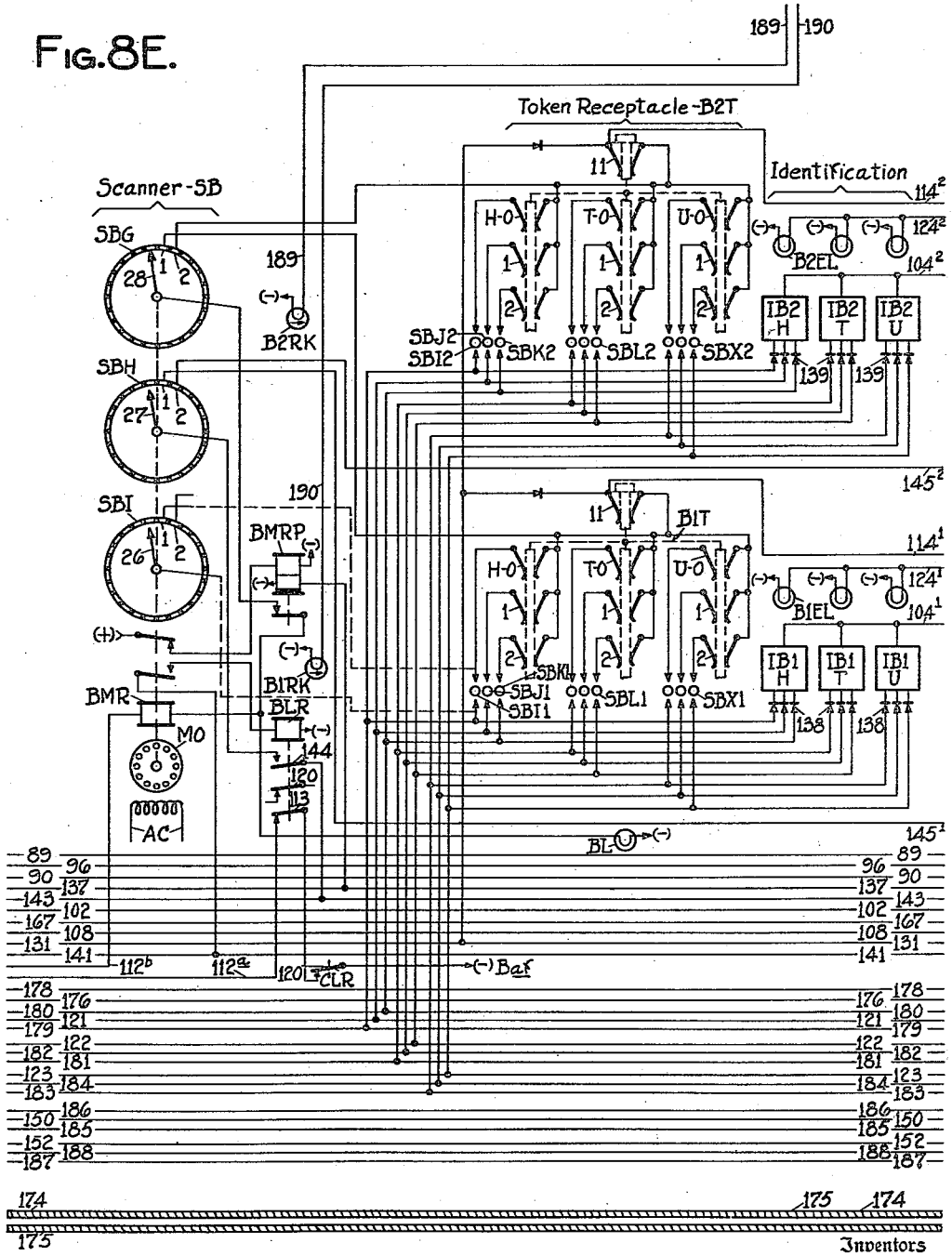

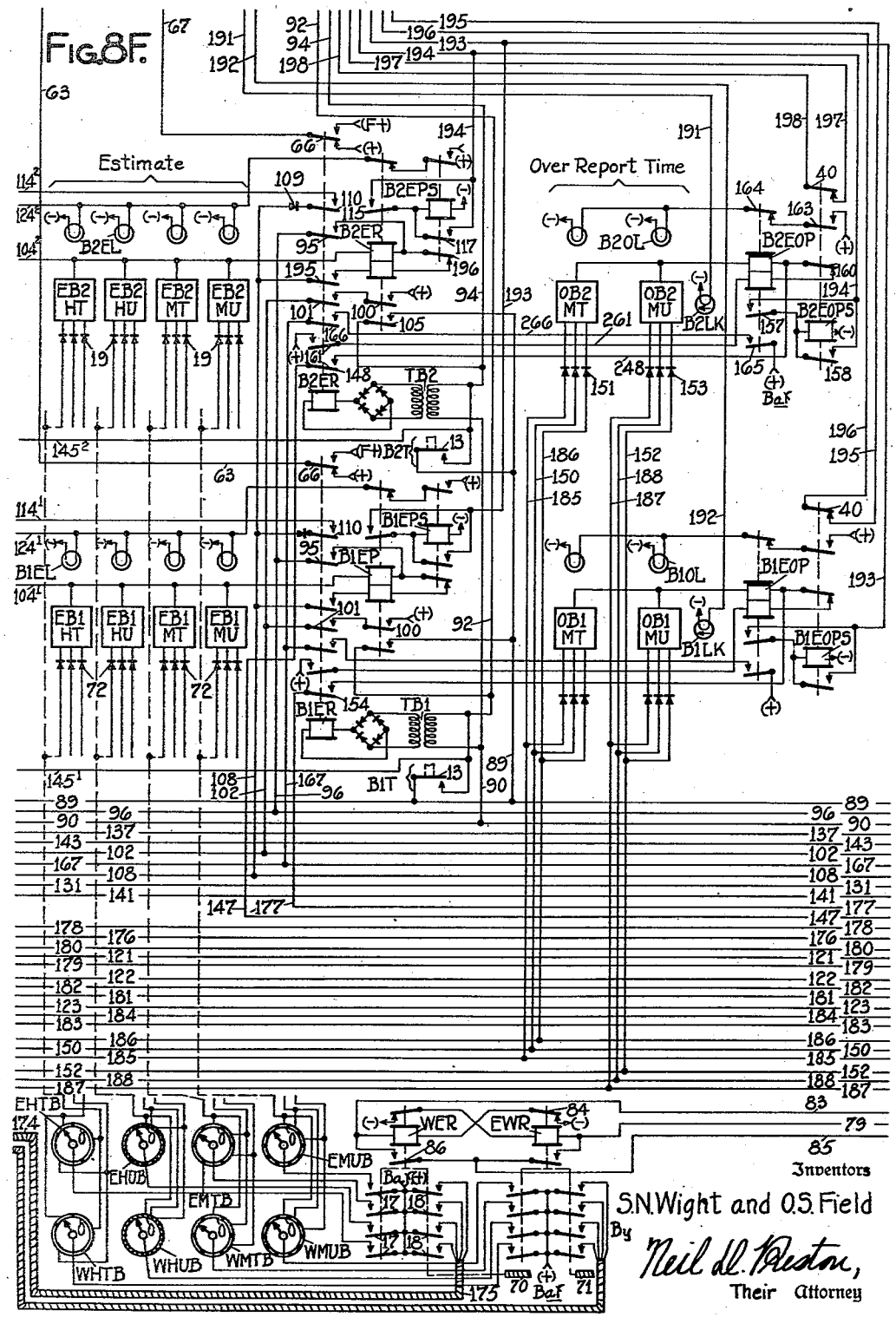

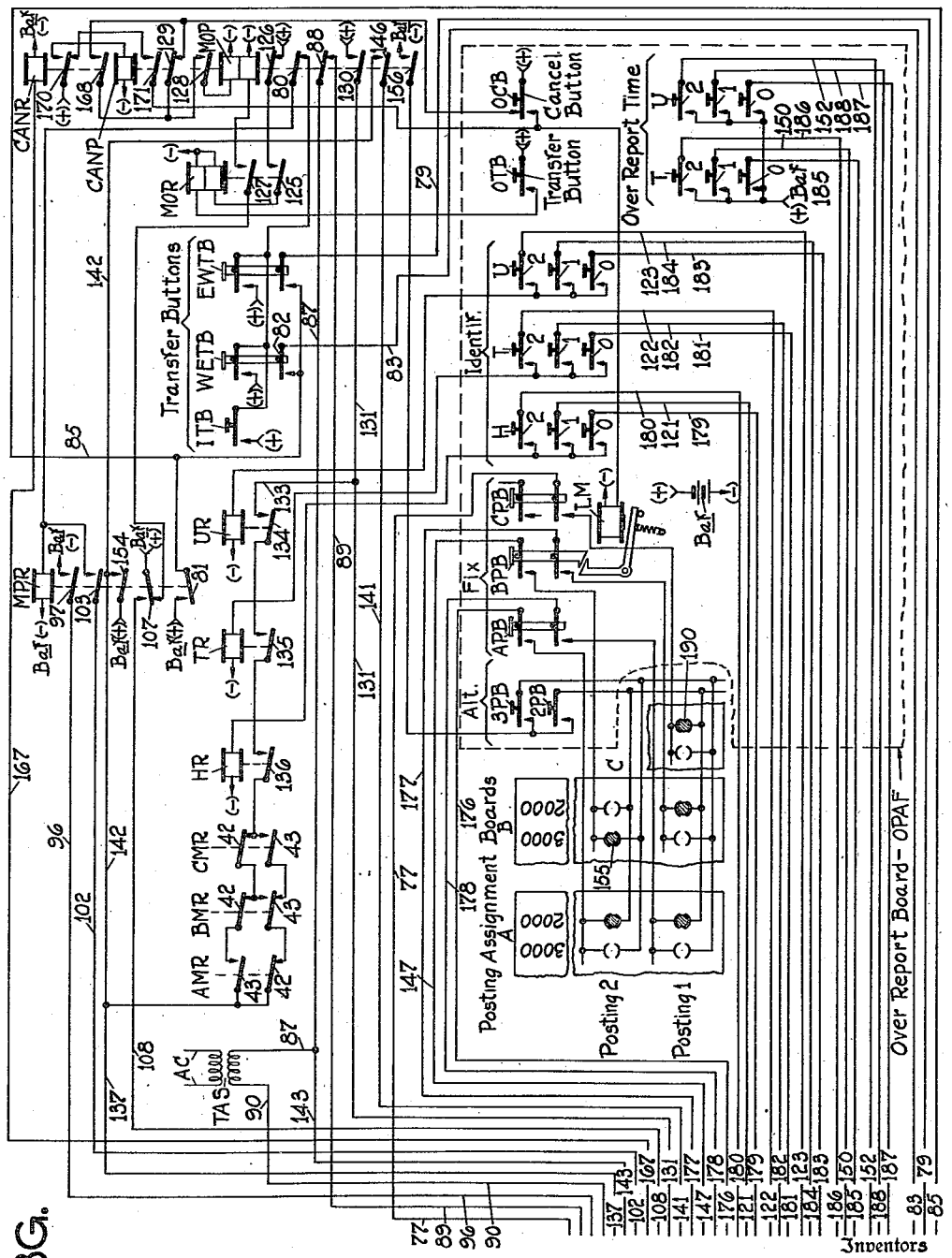

Inventors
S. N. Wight and O. S. Field
By Neil D. Preston,
Their Attorney

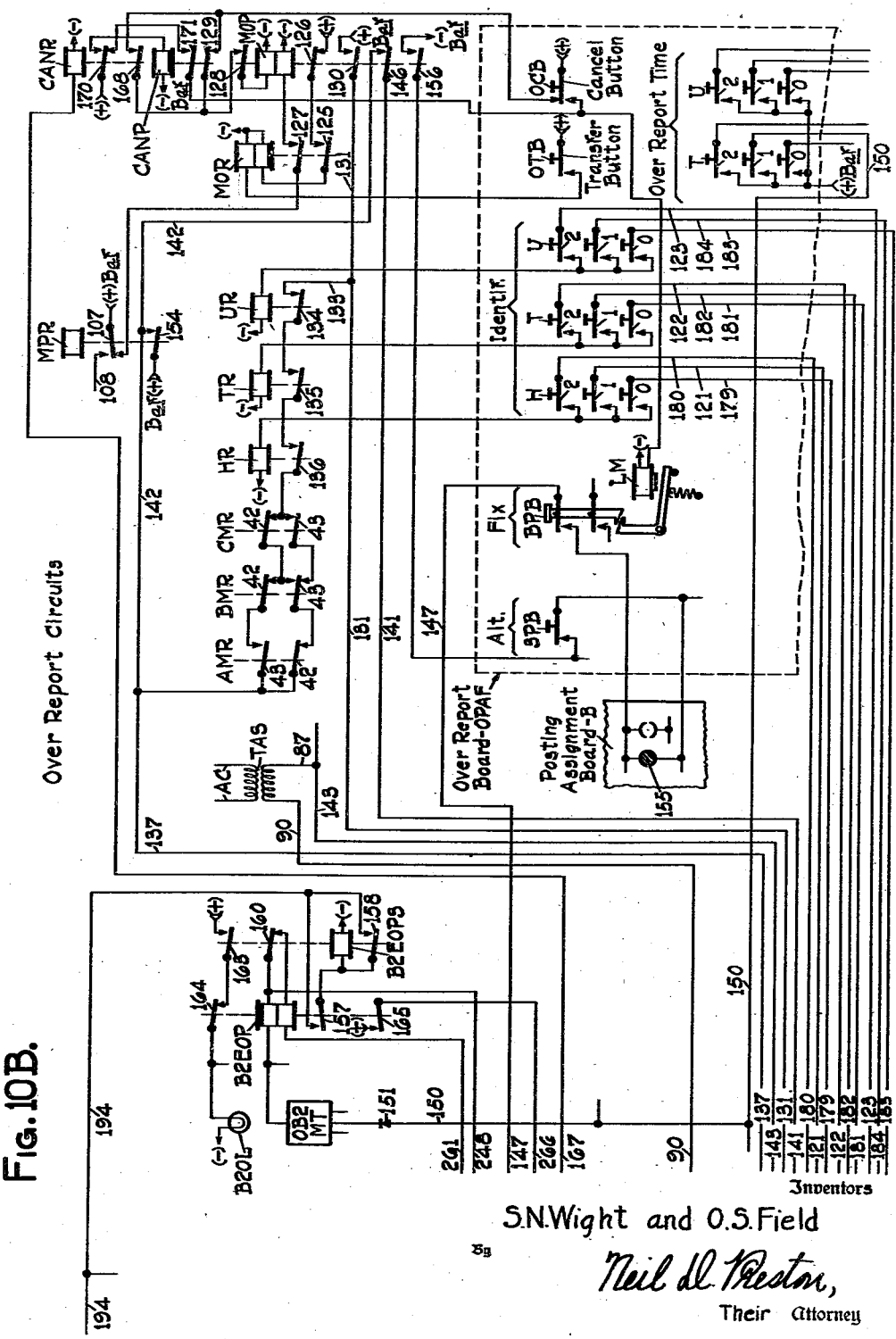

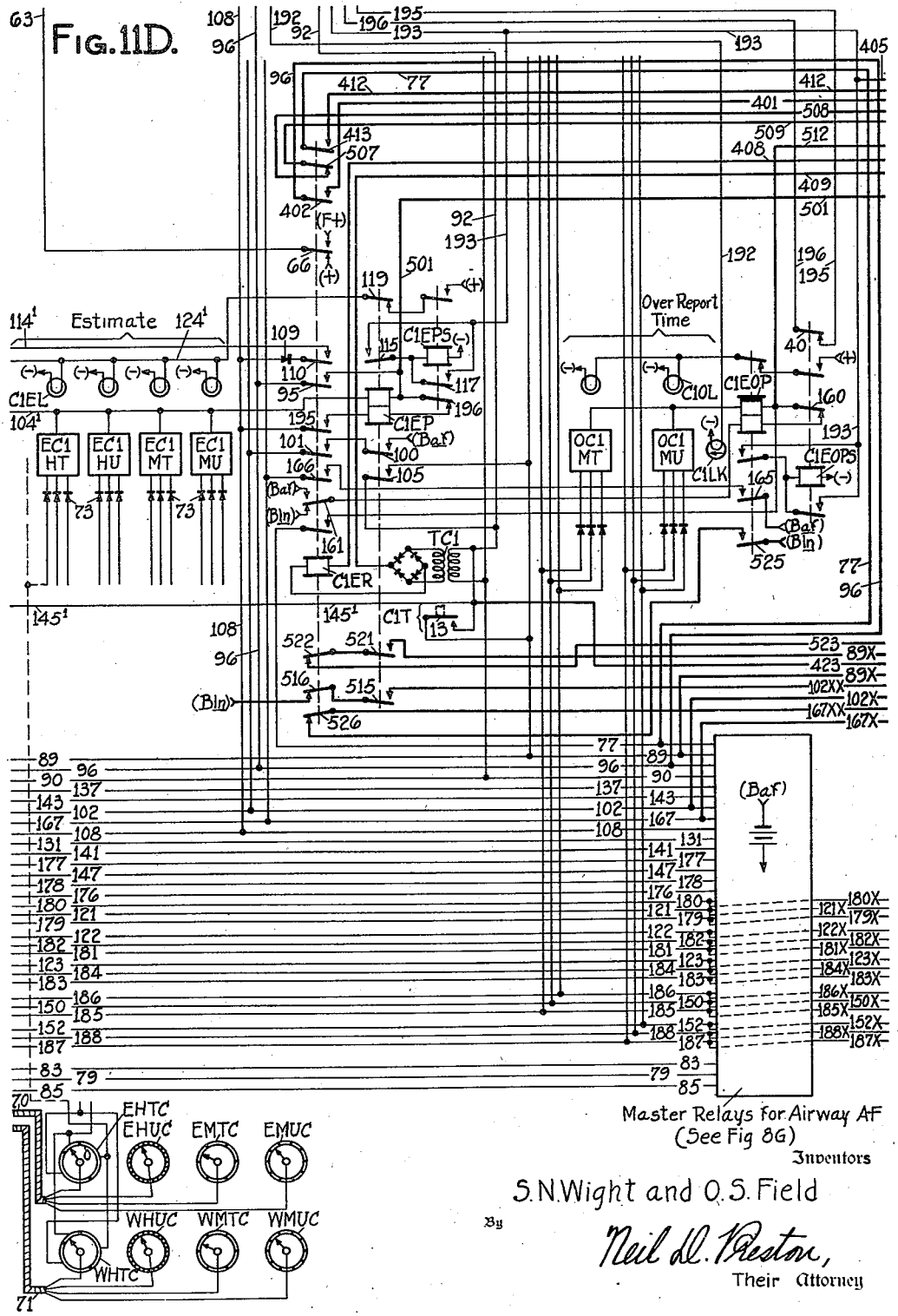

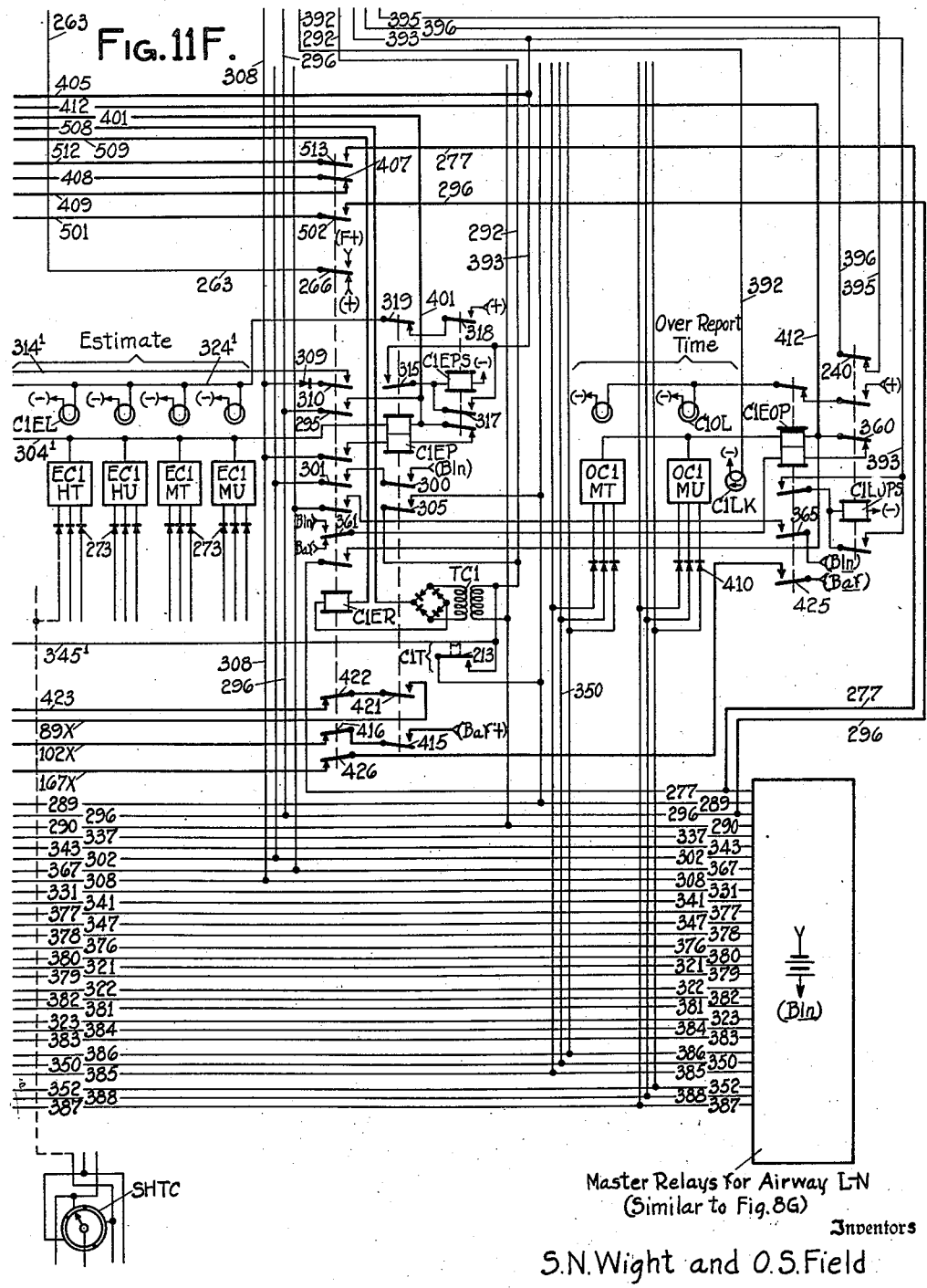

March 21, 1944.  S. N. WIGHT ET AL  2,344,761
AIRWAY TRAFFIC CONTROL SYSTEM
Filed June 5, 1943  22 Sheets-Sheet 21

Inventors
S.N.Wight and O.S.Field
By Neil D. Preston,
Their Attorney

Patented Mar. 21, 1944

2,344,761

UNITED STATES PATENT OFFICE 2,344,761

AIRWAY TRAFFIC CONTROL SYSTEM

Sedgwick N. Wight and Oscar S. Field, Rochester, N. Y., assignors to General Railway Signal Company, Rochester, N. Y.

Application June 5, 1943, Serial No. 489,774

36 Claims. (Cl. 177—353)

The present invention relates to airways traffic control systems or for airplane dispatching systems, and more particularly to a system for displaying on a flight progress board authorized plane flights or authorized flight routes over various altitudes over a geographic route (route on the ground) and for displaying at each fix, check point or station a number identifying the airplane, the arrival time and also displaying the time at which the airplane actually reaches such fix conveniently called the over-report time, and which flight route may be cancelled by one man or by the cooperation of two different operators. This application constitutes an improvement over our prior application, Ser. No. 470,018, filed December 24, 1942.

In railway signalling it is customary and practical and almost necessary for routes set up over certain railway tracks to be protected by interlocking so that trains cannot move on conflicting routes. This is an ideal and safe way of preventing trains from colliding with each other during their progress. By reason of the extremely high speed at which airplanes fly, and by reason of the fact that airplanes must either continue their flight or come to the ground, an entirely different problem presents itself in airplane dispatching which problem in certain respects is advantageous. The advantages reside in the fact that airplanes in flight fly at very high speeds and cannot come to rest on their route, and this enables their arrival times at certain destinations to be made much more certain than is true of railway trains.

In accordance with the present invention it is proposed to post or display by suitable posting units on a flight progress board, preferably of large dimensions and located at considerable distance away from the dispatcher operator and over-reporter, the airplane identification of the flight route or the airplane and its estimated arrival times at each of various fixes, check points or report stations along the ground route and to rely on the dispatcher and operator to give authority to airplane pilots to fly over certain designated ground routes at specified altitudes on different stretches thereof only if the estimated arrival time for other airplanes at various fixes as compared with the estimated arrival times of the airplane under consideration is such as not to impose a hazard on any of these airplanes. It is readily seen that in some instances airplane flight routes may be set up over the same altitude and displayed on the display board at the same fix at the same time if the arrival times for such airplanes are sufficiently different to preclude the possibility of a collision between such airplanes either at that fix or in adjacent territory extending say at least one-half the distance to the next adjacent fix. By reason of the fact that a plurality of postings of airplane flight routes which pass over certain fixes at the same altitude is contemplated and since the over-report, namely, the report from the airplane pilot to the dispatcher or one of his assistants, will give the altitude of the airplane but not the particular posting number assigned to that airplane, the cancellation of a flight route will be determined by the airplane identification and altitude information reported by the pilot which must be translated into posting information. The circuits for displaying an over-report involves particular postings rather than particular altitudes only. Since weather conditions and other abnormal airway traffic conditions demand that a certain amount of flexibility as to the number of postings assigned to specific altitudes is essential, it is desirable to provide a ready means of changing the circuits to conform to a change in the number of postings assigned to a particular altitude and in accordance with the present invention it is proposed to employ a switching board or plug board for making the necessary electrical connections to conform with the appearance of the flight progress board when new assignments of postings to particular altitude at specific stations are made.

In accordance with the present invention it is also proposed to employ an interlocked network of electrical circuits for setting up on the flight progress board various airplane flight routes varying in altitude from fix to fix and to indicate on this flight board where a proposed route shall be established and to thereafter automatically, in accordance with contacts closed by a token identifying a particular airplane or flight route project electrically this identification, expressed by a flight character or flight number of such airplane and of its token into posting units at the particular altitude at each fix over which such airplane flight route is proposed. It is further proposed to provide a mechanical arrival time calculator which electrically manifests by the closing of particular contacts the arrival time for the airplane on a proposed flight route as determined by setting the starting time and the cruising speed for such airplane and to then project electrically to suitable posting units on the flight progress board the arrival times at the proper altitudes at each of the various check points, fixes or report station panels.

It is further proposed in accordance with the present invention to indicate the actual arrival time or over-report time on the flight progress board only if the airplane identification, altitude and fix reported by the pilot to the over-report operator, who translates this report into specific manipulation, is in agreement with the token inserted in a token receptacle of a route passing through such altitude for such fix. It is further proposed to cancel that portion of the airplane flight route to the rear of such token when such token is depressed.

It is also proposed in accordance with the present invention to employ a particular display board for each ground route. Since the various ground routes may have report stations or fixes in common, it will follow that the same report station may be represented by a panel on each of a plurality of boards, and in accordance with the present invention it is proposed to display the same indication for a common report station located on each of a plurality of boards and to so interlock the route circuits that a particular display set up by the operator of one board cannot be changed or disturbed by an operator of another board having the same report station displayed thereon.

Fig. 2 shows the controller's board for fixes A, B and C on an enlarged scale illustrating a west-to-east calculator and an east-to-west calculator and the transfer buttons on the operator's desk together with the various control knobs, token receptacles and indicating lamps located on the back panel of the operator's board;

Fig. 2A illustrates the token shown in Fig. 2 on an enlarged scale;

Fig. 3 illustrates, on an enlarged scale, the over-report board for pedestal OPAF of Fig. 1 illustrating the various altitude push buttons, check point or fix push buttons, identification push buttons, over-report time push buttons, transfer push button and cancellation push button;

Fig. 4 illustrates on an enlarged scale the flight progress board for panels A, B and C of flight progress board A—F;

Fig. 5 illustrates panels A and B of the postings assignment boards;

Fig. 6 and 6A illustrate the structure of the banners employed for each fix in the interlocked network;

Fig. 7 is a sectional plan view of Fig. 6 taken on the line 7—7 as viewed in the direction of the arrows;

Figure 9:
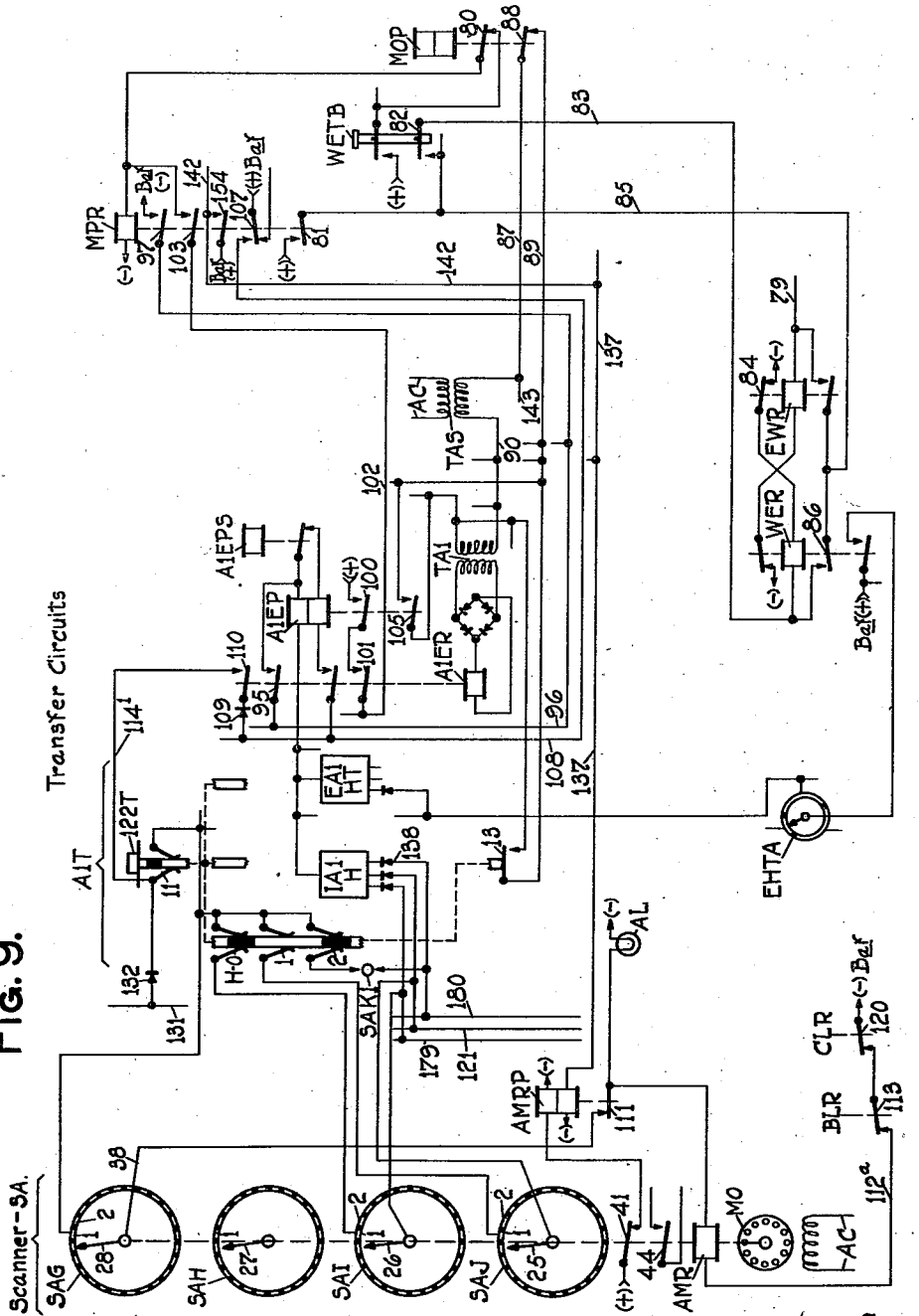

Figs. 8A–8G, when assembled as shown in Fig. 12, illustrate the circuit network interconnecting the various apparatuses illustrated in Figs. 1 to 7, inclusive, for establishing flight route circuits;

Fig. 9 illustrates in simplified form the transfer circuits for controlling the posting units for one digit of the airplane identification and for one digit of the arrival time indication.

Figure 10A:
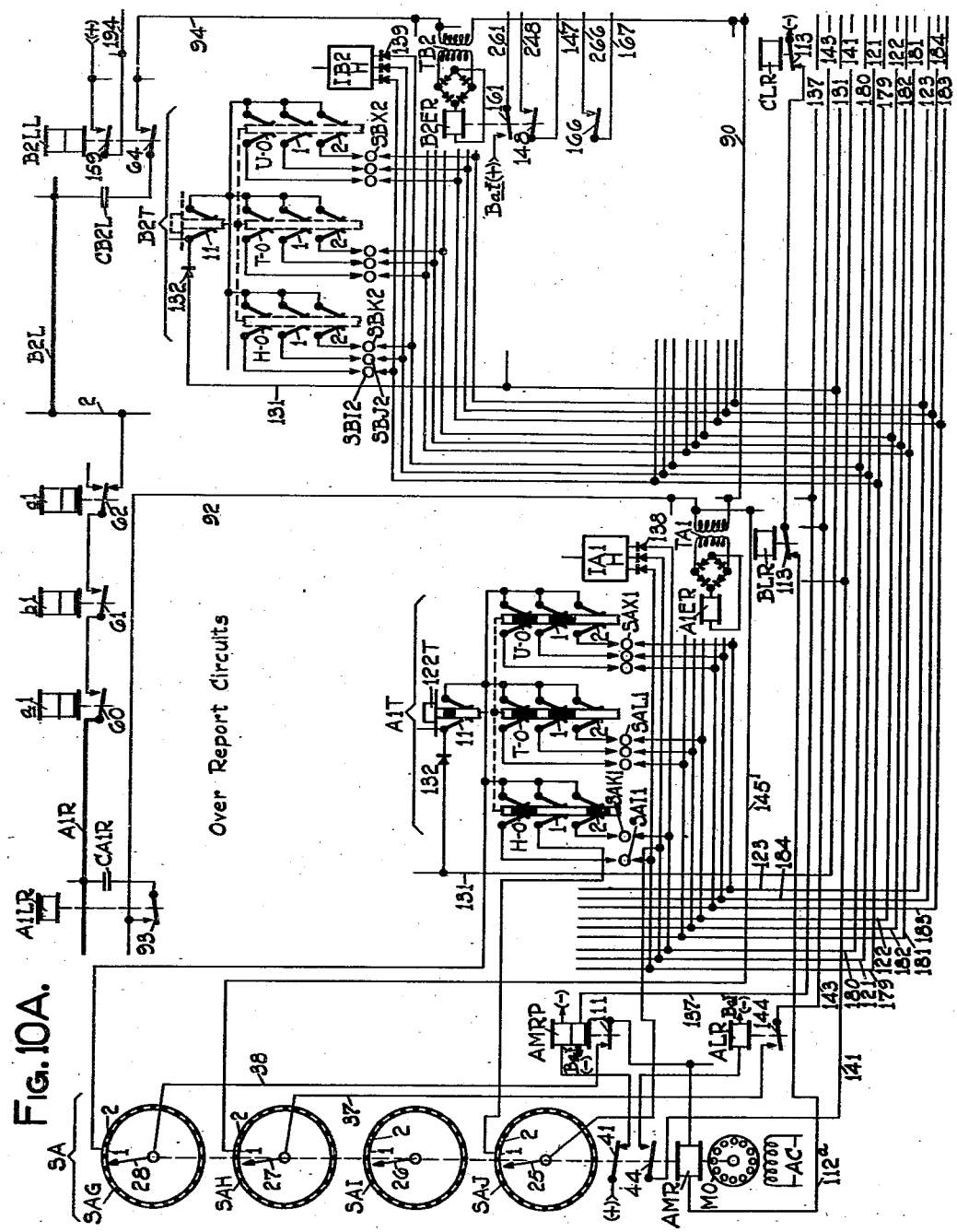
Figure 11A:
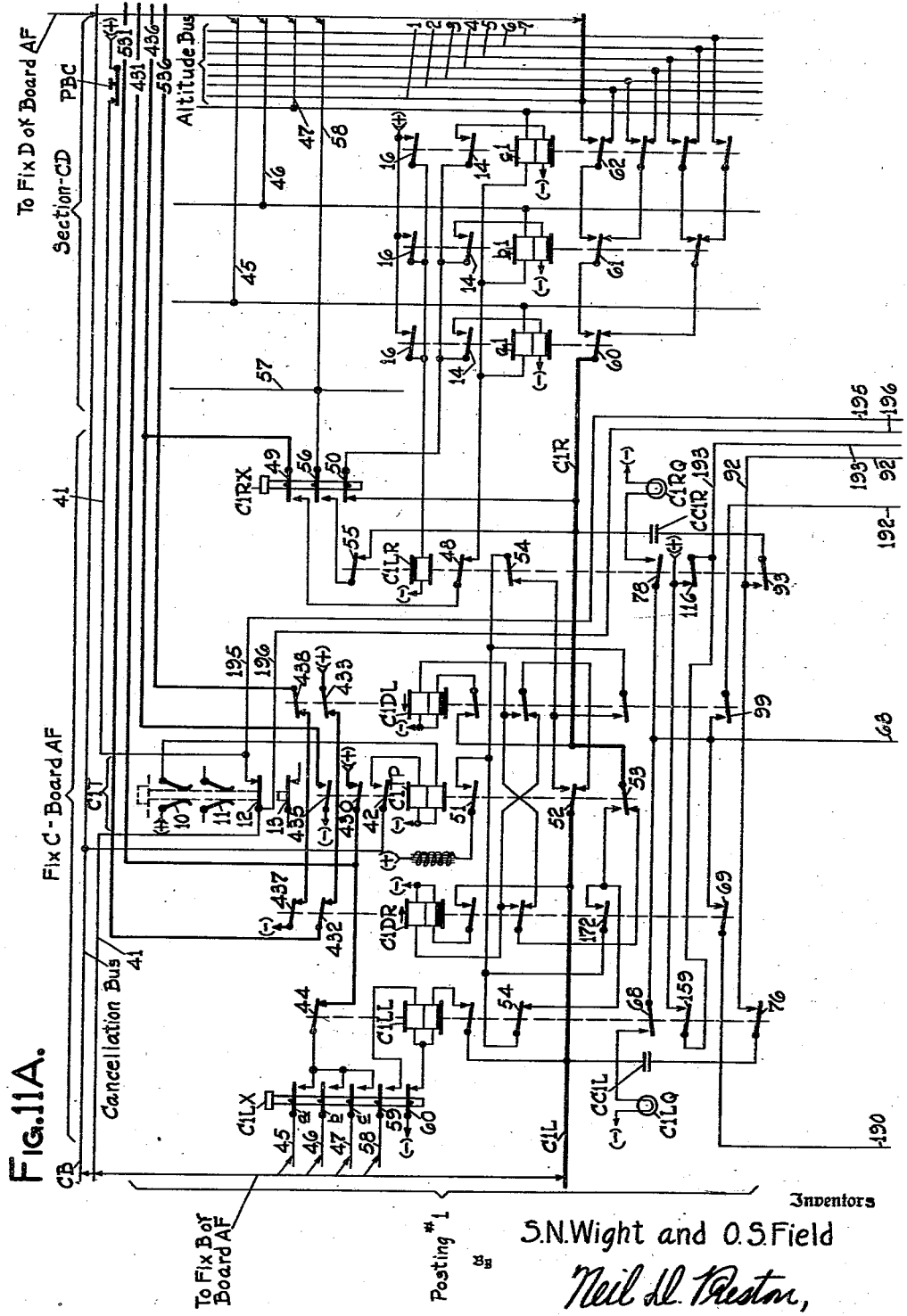
Figure 11B:
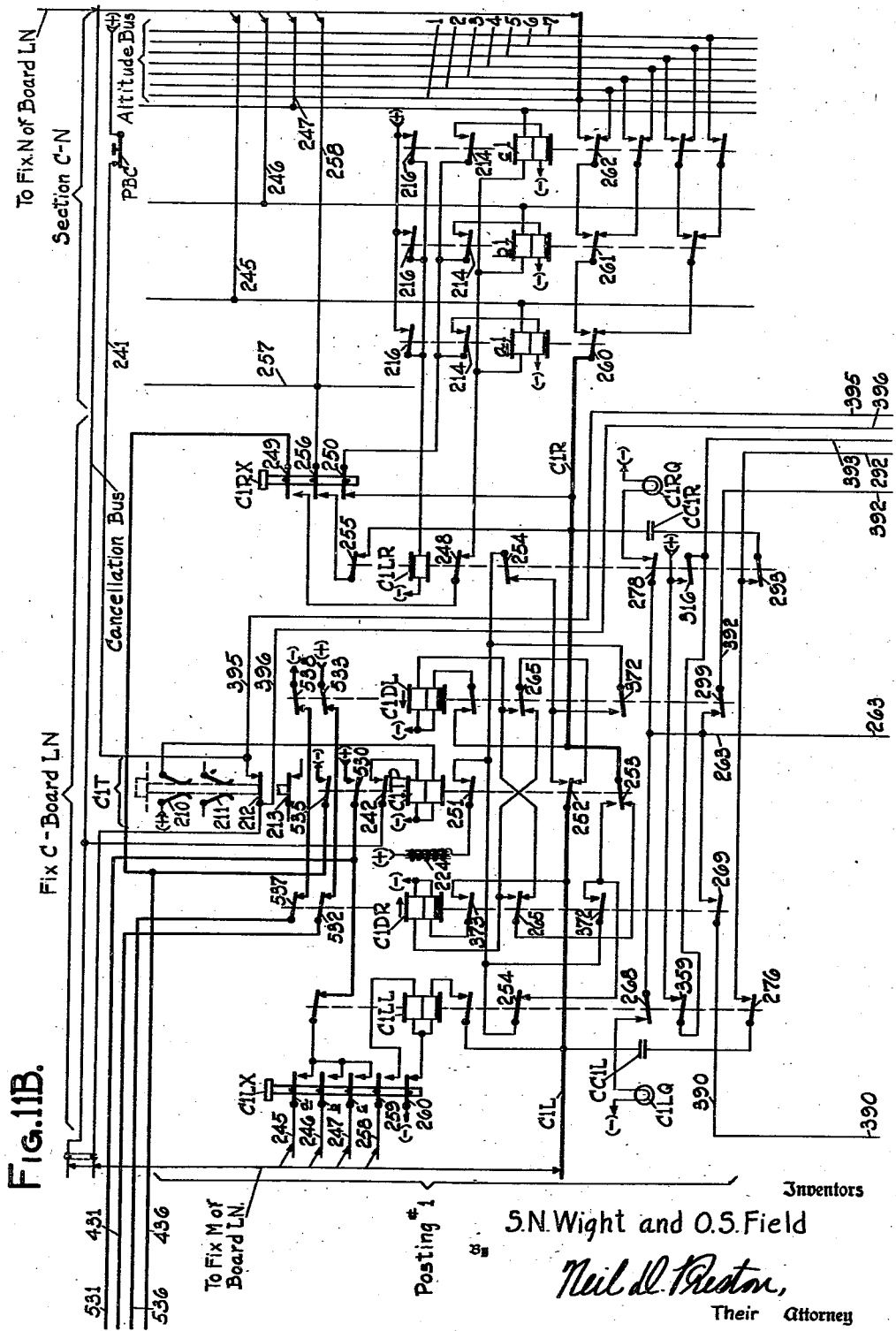
Figure 15A:
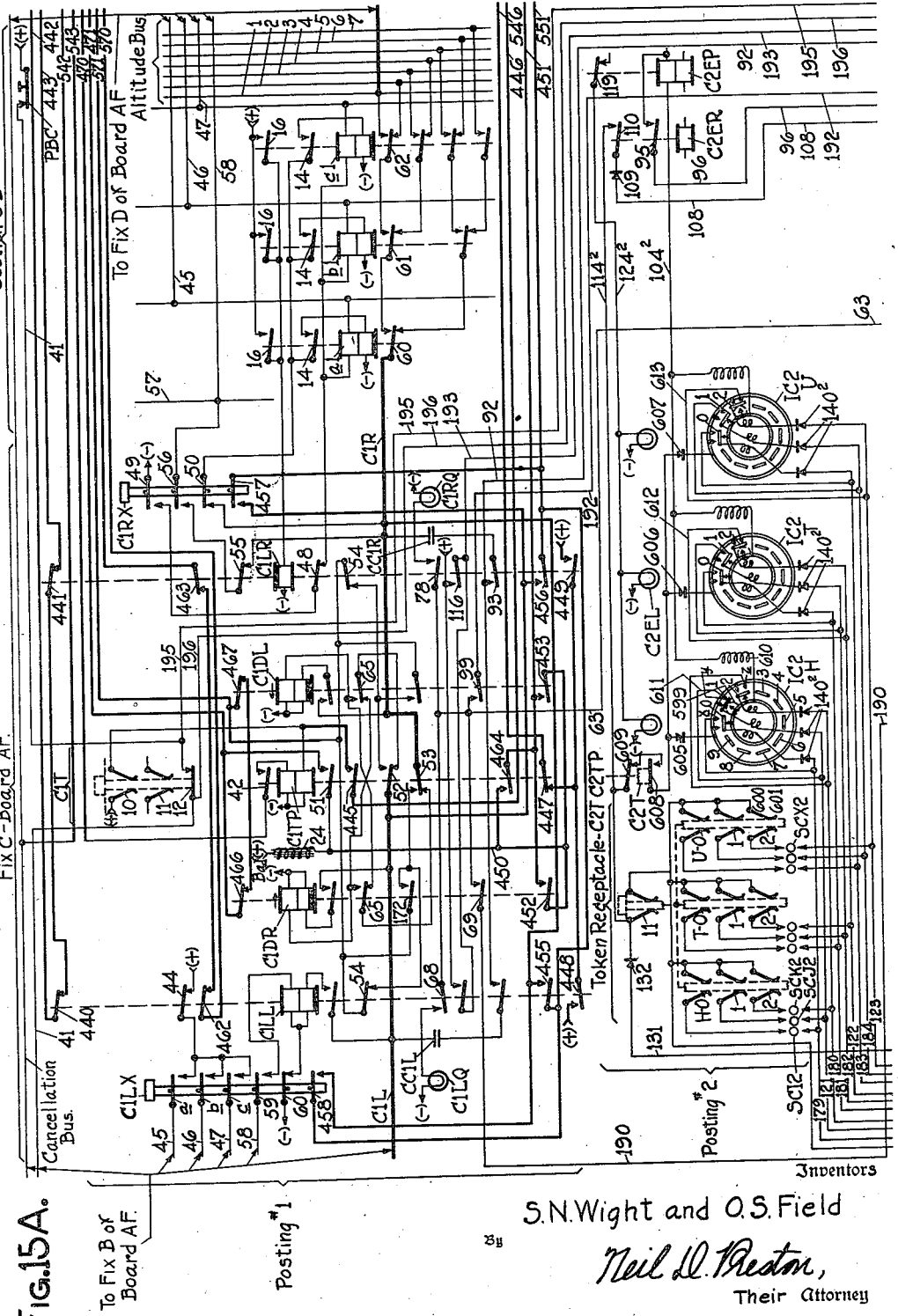
Figure 15B:
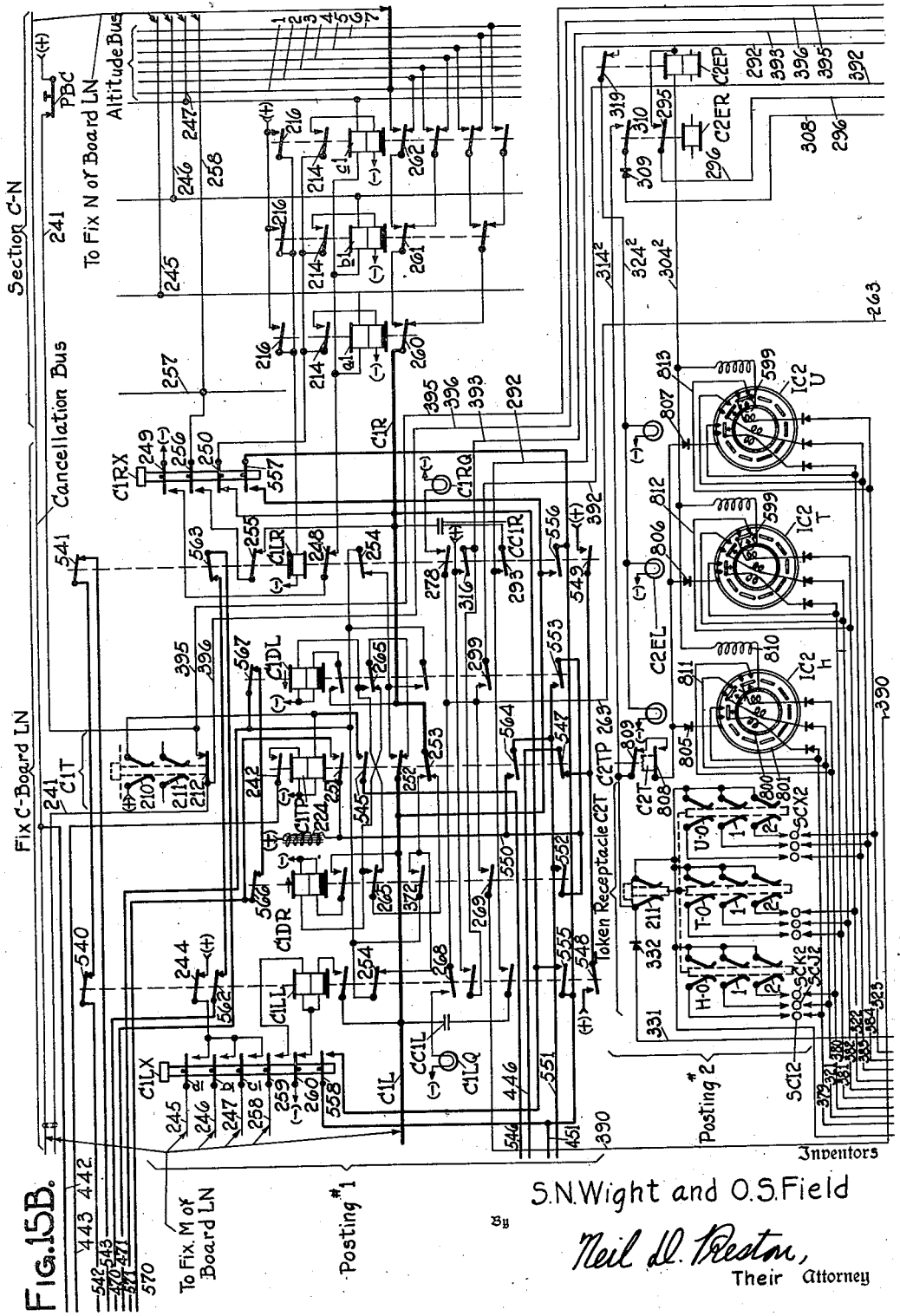

Figs. 10A and 10B illustrate in simplified form the over-report time circuits for controlling the posting unit for one digit of an over-report indication;

Figs. 11A to 11F, inclusive, when assembled as illustrated in Fig. 13 illustrate how two boards having a common fix C are interconnected;

Figs. 15A and 15B may be substituted for Figs. 11A and 11B in the sheet assembly illustrated in Fig. 13 to illustrate a modified system; and Figs. 12, 13, 14 and 16 illustrate how certain sheets of the drawings may be assembled to illustrate various portions of complete systems, of which Fig. 12 shows fixes A and B (Figs. 8A–8G). Fig. 13 shows fix C of both boards connected together (Figs. 11A–11F). Fig. 14 combines the sheets illustrated in Figs. 12 and 13, and Fig. 16 illustrates a modified system wherein Fig. 15A and Fig. 15B are substituted for Figs. 11A and 11B in the sheet combination illustrated in Fig. 14.

*Structure*

Figure 1:
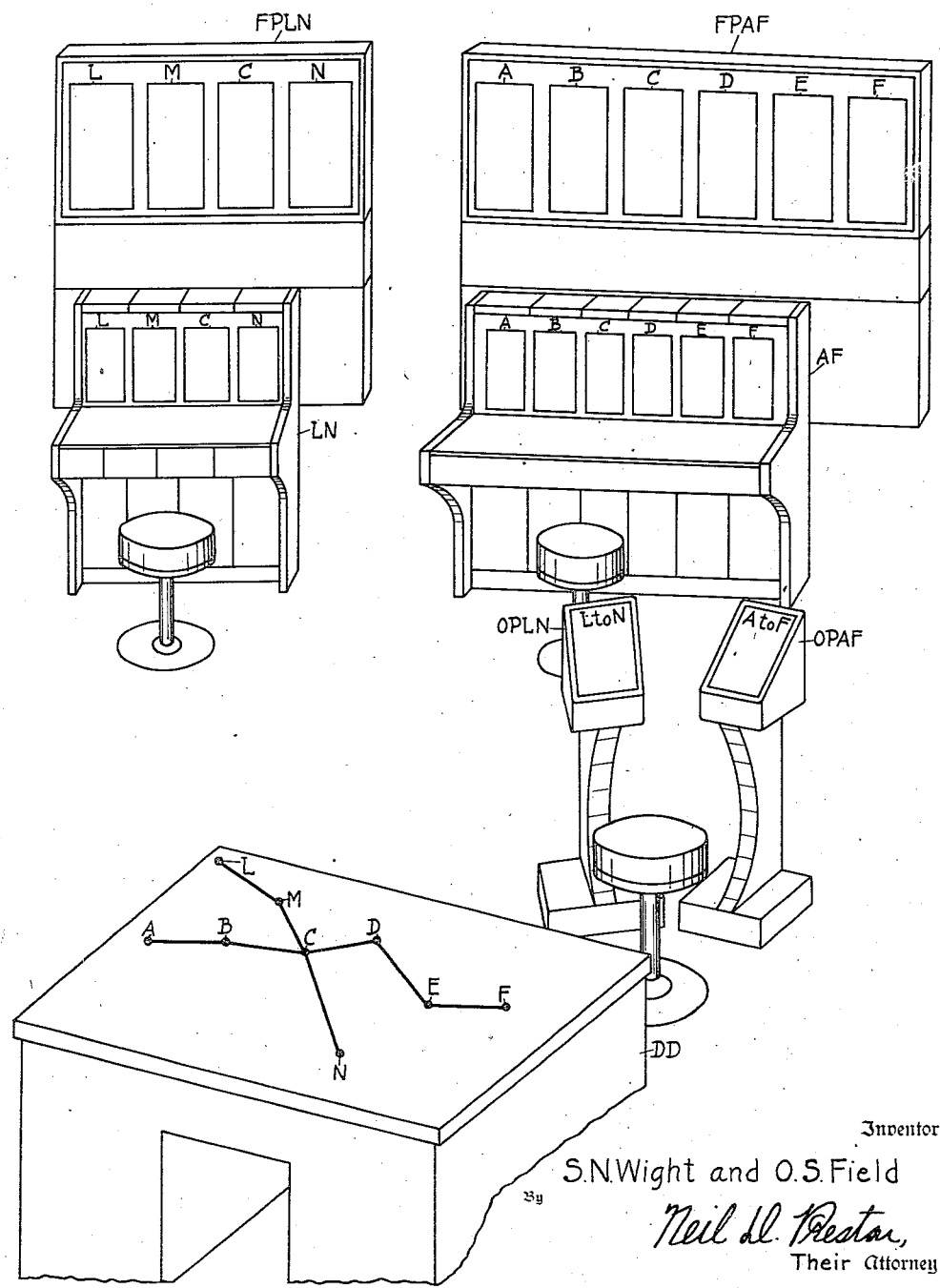
Fig. 1 illustrates the dispatcher's room containing two flight progress boards, two controller's boards, two over-report pedestals, and a dispatcher's desk.

*Dispatcher's desk.*—Referring to Fig. 1 and referring to the dispatcher's desk DD it will be observed that this desk shows the ground routes (route on the ground as distinguished from various flight routes at various altitudes over such ground route) A—B—C—D—E—F and L—M—C—N. It will also be observed that these two ground routes cross at fix or station C. It is desired to point out that the route A—B—C—D—E—F is controlled by the control board AF whereas the route L—M—C—N is controlled by the control board LN. It may also be pointed out that the flight routes over ground route A—B—C—D—E—F are displayed on the flight progress board FPAF whereas flight routes set up over the ground route L—M—C—N are displayed on the flight progress board FPLN. It may also be pointed out that the over-report times displayed on the flight progress board FPLN are obtained by the manipulation of buttons on the over-report pedestal OPLN whereas the over-report times displayed on the flight progress board FPAF are determined by the manipulation of push buttons on the over-report pedestal OPAF. For convenience only circuits and apparatus relative to postings 1 and 2 for fixes A, B and C will be discussed hereinafter.

*Controller's board.*—In Fig. 2 has been illustrated a portion of the controller's board AF illustrating a portion of the control panels for fixes A, B and C and also illustrating the corresponding portion of the arrival time calculators, for calculating west-to-east arrival time and calculating east-to-west arrival time, for calculating the arrival times of fixes A, B and C. Referring to panel A (see Fig. 2) the left-hand column of push buttons including push buttons A1LX and A2LX constitutes the exit buttons for establishing routes from left to right toward station A and constitute the entrance push buttons for establishing routes extending toward the left from check point A, whereas the push buttons in the right-hand column and including push buttons A1RX and A2RX are push buttons for extending routes from check point A to check point B and also constitute the exit push buttons for establishing routes from check point B to check point A. The numerals 1 to 10, inclusive, constitute the numeral designations of postings (there being a total of twenty-four postings, see Fig. 4), whereas the numerals 2 to 6, inclusive, for fix A illustrate that these postings or flight authorizations may exist in altitudes 2000, 3000, 4000, 5000 and 6000 feet, respectively, sixteen altitudes (2–17) being contemplated, see Fig. 4. In other words, these various numerals indicate that the 2000 foot altitude may be occupied by airplanes authorized by postings or flight authorizations 1 and 2, that the 3000 foot altitude may be occupied by airplanes flying on routes authorized by postings 3 and 4, that the 4000 foot altitude may be occupied by airplanes flying on flight routes authorized by postings 5 and 6, that the 5000 foot altitude may be occupied by airplanes flying on flight routes authorized by postings 7 and 8, and that the 6000 foot altitude may be occupied by airplanes flying on flight routes authorized by postings or flight authorizations 9 and 10. Referring again to panel A of the operator's control board AF (Fig. 2) the left-hand column of lamps including the lamps A1LQ and A2LQ are employed to signify when energized that a route either to or from the next station to the left of check point A has been set up, whereas the indicating lamps in the right-hand row including the lamps A1RQ and A2RQ when lighted signify that either a route from check point A to check point B or a route from check point B to check point A has been either tentatively or actually established. Obviously, if a lamp in each column for a particular posting is illuminated indicates that an airplane flight route through the check point A at the altitude signified by the altitude marker for such posting has been set up. What has been said in regard to check point A is likewise true of check point B where like reference characters are employed except that the letter B has been substituted for the letter A. It should, however, be noted that the altitude assignmens for some of the posting of fix B are different from fix A.

The west-to-east calculator and the east-to-west calculator have been fully disclosed and described in our prior application, Ser. No. 470,018, above referred to, and the functions performed by these calculators will only be briefly discussed. At the upper left-hand corner of the desk of the controller's board (see Fig. 2) is illustrated a cruising knob EC and a transfer button WETB for the west-to-east calculator of which the cruising knob EC may be adjusted to the particular cruising speed of an airplane under consideration. If it is now desired to calculate the arrival time of an airplane at fixes B and C which starts at a particular starting time at fix A it is only necessary to adjust the cruising knob EC to a speed characteristic of that airplane and to then adjust the starting time knobs EHA and EMA to indicate the starting time at A and the arrival times for fixes B and C will be immediately indicated. It may also be necessary to adjust the variable factor knob EVAB, to compensate for a change of cruising speed due to prevailing winds, ascending and descending factors, and the like, after which the arrival time for fixes B and C will be indicated on the indicating knobs EHB, EMB, EHC and EMC without further manipulation. The arrival time for all subsequent fixes D to F, inclusive, will be calculated in a similar manner and simultaneously therewith without further manipulation. In the lower portion of the desk of the controller's board illustrated in Fig. 2 a similar calculator for calculating east-to-west arrival times is indicated which latter calculator includes a cruising speed knob WC and an east-to-west transfer button EWTB.

Each of the posting areas for each fix is also provided with a receptacle for receiving a token. These receptacles are for convenience called token receptacles or token jacks and are staggered by reason of the token data plate which is of considerable size. It will be seen that the token receptacle A2T (see Fig. 2) is shown to the right and slightly above the indicating lamp A2LQ whereas the token receptacle A1T is shown to the left and slightly above the indicating lamp A1RQ. However, as shown, a token when in place in a receptacle will have its token plate directly in line with the push buttons, indicating lamps and altitude and posting numerals for that particular posting. These token plates may have suitable data written thereon, such as the pilot's name, the type of airplane, the kind of cargo, its final destination, etc. One such token has been shown on enlarged scale in Fig. 2A of the drawings. These token receptacles are provided with a large number of contacts some of which are closed when any token is inserted therein; whereas, others are closed only by certain tokens to electrically characterize the identifying character of the token. Some of these token receptacle contacts are shown in Figs. 8 and 11. This token receptacle or jack is constructed to be depressible and certain contacts are closed and others are opened when the jack is depressed either with or without a token therein. For a more detailed illustration and description of these tokens and receptacles, attention is directed to our joint application 489,775 filed on even date herewith and entitled "Token and receptacle for ATC systems."

*Over-report pedestal.*—The panel of the over-report pedestal OPAF shown in Fig. 1 is illustrated on an enlarged scale in Fig. 3 of the drawings. The buttons 2 to 17 in the left-hand column below the heading "altitude" signify altitudes of 2000 feet to 17,000 feet, inclusive. The push buttons A to F, inclusive, shown in a horizontal row near the top of the panel signify check points or fixes A to F, inclusive. The three columns H, T and U of push buttons 0 to 9, inclusive, below the heading "identification" are employed for signifying the three digits hundreds, tens and units, respectively, of airplane identification numbers, from which it is readily seen that airplane identification numbers from 1 to 999, inclusive, may be characterized. The two columns T and U of push buttons designated "over-report time" indicate in tens and units, respectively, the minutes of an hour when an airplane is reported over a particular fix, it being understood that if the actual arrival time over a fix in minutes is known, the actual arrival time in hours can be ascertained from the estimated arrival time which has been indicated on the flight progress board adjacent the over-report time. This over-report board OPAF also includes a transfer button OTB and a cancelling button OCB. It may be pointed out that each of the push buttons shown on the over-report pedestal, except the transfer button and the cancelling button, is constructed to be latched down when manually depressed and which will only be released by the energization of a release magnet LM shown in Fig. 8G of the drawings. In other words, if the over-report operator wishes to manifest electrically that he has received, as by radio, a report that airplane number 122 has arrived at fix B at the 3000 foot altitude at 11:12 o'clock, he will operate his push button 3 in the "altitude" column, push button 1 in the first column of "identification," push button 2 in each of the second and third columns of "identification," the push button B, the push button 1 in the first column of "over-report time" and the push button 2 in the second column of "over-report time." All these buttons will remain in their depressed position until the over-report time has been displayed on the flight progress board, all in a manner as hereinafter described, after which the cancelling or latch magnet LM (see Fig. 8G of the drawings) is automatically energized to cause all of these push buttons to return to their normal retracted position.

*Flight progress board.*—The panels A, B and C of the flight progress board FPAF (see Fig. 1 of the drawings) have been illustrated in detail in Fig. 4 of the drawings. It will be observed that at the left-hand side of panel A, as signified by the numerals 1 to 24, the various postings or airplane flight authorizations that may be displayed for fix A on the flight progress board have been indicated. It will be observed that the numbers shown on horizontally disposed markers, as indicated by numerals 2 to 17 inclusive, signify that the 24 postings or flight authorizations may be divided among altitudes 2000 feet to 17,000 feet, each altitude being spaced 1000 feet from the next adjacent altitude. It will also be observed that for each of altitudes 2 to 9, inclusive, signifying 2000 feet to 9000 feet altitudes, there may be two postings, whereas only one posting for each altitude from 10,000 feet to 17,000 feet is permitted. Referring now to panel B on this same flight progress board it will be observed that one posting only may exist on the 2000 foot altitude, two postings numbered 2 and 3 may exist on altitude 3000 feet, that postings 4, 5 and 6 may exist for altitude 4000 feet, that postings 7 and 8 may exist at altitude 5000 feet, that posting 9 only may exist at altitude 6000 feet, that postings 10 and 11 may exist at altitude 7000 feet, that three postings 12, 13 and 14 may exist at altitude 8000 feet, two postings may exist at altitude 9000, and that one posting may exist at each of altitudes 10,000 to 17,000, each inclusive. It will be noted that in practice these altitude markers 1 to 17, inclusive, are provided with pins which fit in holes in the panel so that the particular postings assigned to a particular altitude may be definitely indicated and may be changed at will, corresponding circuit changes being made in the posting assignment plug board shown in Fig. 5 of the drawings.

Referring again to panel A for fix A on the flight progress board FPAF (see Fig. 4) the left-hand column of lamps including indicating lamps A1RK and A2RK display an arrow pointing to the right when illuminated and that a right column of lamps, including lamps A1LK and A2LK, is provided to display arrows pointing to the left when illuminated. Similar lamps are provided for each of the other fixes. Each of these displayed arrows manifests that a flight route to such fix in the direction as indicated by the arrow has been set up. No lighted arrow is displayed to indicate the direction of departure of an airplane from a fix, this being deemed unnecessary in that there is only one direction left for the airplane to depart in.

Referring to panel A (see Fig. 4) there are three columns of changeable exhibitor indications or posting units each of which is capable of displaying multiple digit numbers. The first column headed "identity" has sufficient indications to display three digit numbers signifying the identity of the airplane, the second column headed "estimate" has sufficient indicators to indicate four digit numbers signifying the hours and minutes of estimated arrival time, and the third column headed "over" has only sufficient indicators to display two digit numbers signifying the actual arrival time of a plane over that fix expressed in minutes. These changeable exhibitor indicators may be of a construction such as shown in Figs. 7 to 10 of our copending application, Ser. No. 470,018, filed December 24, 1942, or may be of a construction such as illustrated in our copending joint application, 489,776, filed on even date herewith entitled "Posting units for ATC systems."

*Posting assignment plug board.*—Referring to Fig. 5 of the drawings, it will be observed that the posting assignment plug boards A and B have been illustrated in detail insofar as the face of these plug boards is concerned. The actual wiring to accomplish the desired results for a small portion of these posting assignment plug boards is illustrated in Fig. 8G of the drawings in which the lower right-hand corner and the upper right-hand corner of each of the plug boards A and B and the lower right-hand corner only of plug board C is shown insofar as the actual wiring connections are concerned. Referring now to posting assignment board A (see Fig. 5) the numerals 1 to 24, inclusive, shown in the column "postings" designate postings or airplane flight authorizations for a maximum of 24 airplanes. Obviously, a larger number may be provided. The column of numerals extending from left to right (see Fig. 4) and starting with 17000 and ending with 2000 designate altitudes at which airplanes may be authorized to fly. It will be observed that there is a hole or receptacle on the panel for each posting for each altitude. Some of these receptacles have, however, not been illustrated because they would never be used in practice. Some of these receptacles or holes have been shown cross-sectioned which signifies that a conducting pin or plug has been inserted therein to make an electrical connection and the plugs illustrated in boards A and B establish the proper wiring connections as illustrated in Fig. 8G to establish the proper wiring for posting-altitude assignments illustrated for flight progress panels A and B shown in Fig. 4 of the drawings. Each time that an altitude marker is changed in panel A of Fig. 4 a corresponding change must be made by removing the corresponding plug from its receptacle in posting assignment board A of Fig. 5 and by inserting it in the proper receptacle in that board, all as is clearly understood from the examination of the altitude markers for panels A and B shown in Fig. 4 when compared with the plug distribution in the various receptacles in posting assignment boards A and B shown in Fig. 5 of the drawings and with the wiring associated with the posting assignment boards shown in Fig. 8G.

Figure 8C:
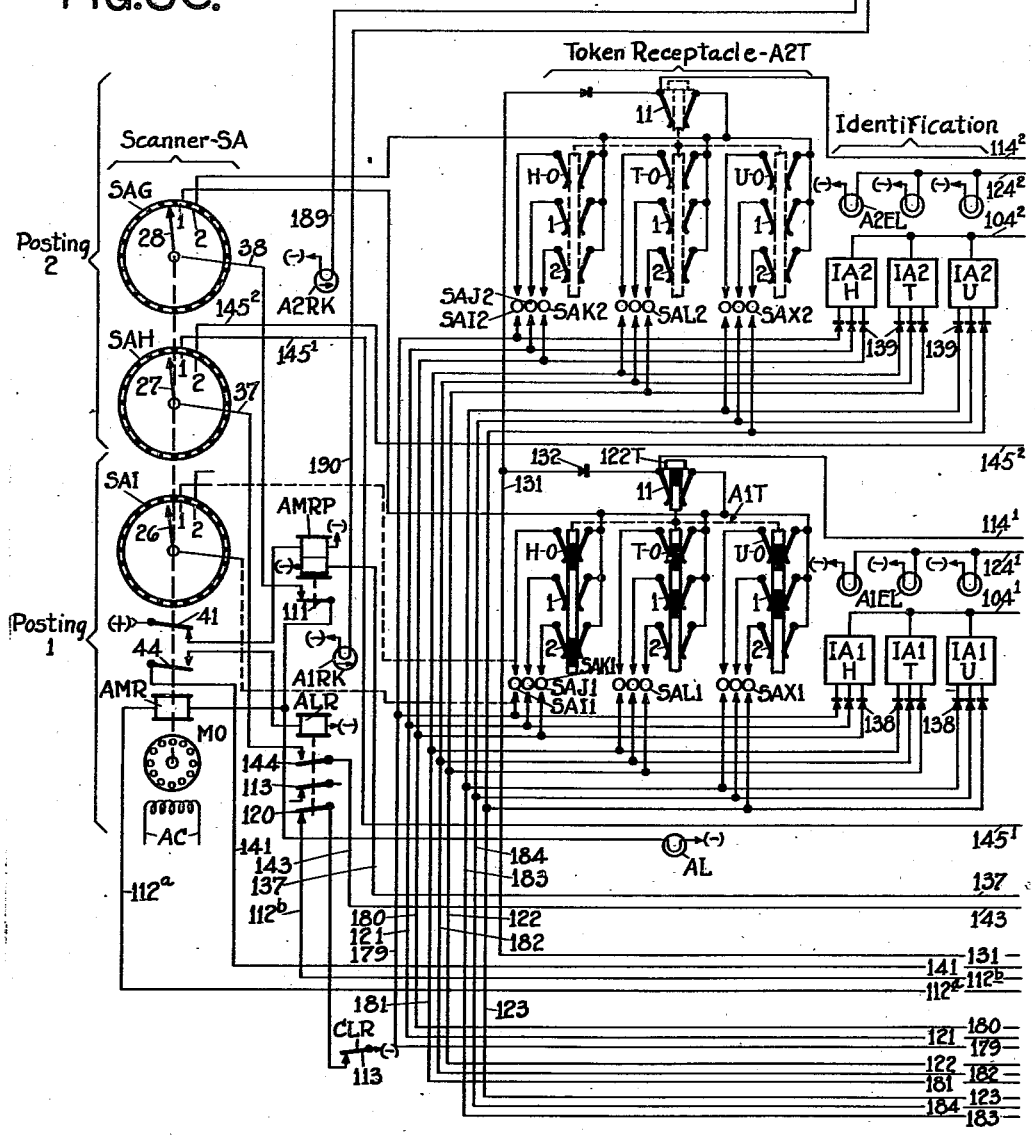

*Token and token receptacle.*—The token receptacles employed are shown conventionally in Figs. 8A–8F of the drawings, whereas token 122T is shown in Figs. 2 and 2A of the drawings and is also shown conventionally in Figs. 8A and 8C of the drawings. Referring to Figs. 8A and 8B of the drawings it will be observed that a portion of each of the token receptacles A1T, A2T, B1T and B2T has been illustrated and that a token 122T has been shown inserted in the token receptacle A1T. As illustrated in Fig. 8A of the drawings the token receptacle A1T shows associated therewith only four contacts of which contacts 10 and 11 are closed when the token is inserted and of which contact 12 is opened when the token and its receptacle are depressed and of which contact 13 is closed when the token and its receptacle are depressed.

Attention is also directed to the fact that the token receptacle contact 11 is also shown in Fig. 8C of the drawings and that contact 13 is also shown in Fig. 8D of the drawings. In addition to the contacts already mentioned there are 30 other contacts, one in each column of which is closed by insertion of a token in the receptacle and irrespective of whether the token and its receptacle are depressed or not. Of these 30 contacts 9 contacts have been illustrated in the lower portion of Fig. 8C of the drawings, 3 contacts having been illustrated in each of the hundreds column H, the tens column T, and the units column U, the contacts in each column having been designated 0, 1 and 2 respectively. It should be understood that there are 10 such contacts in each digit column and for future reference purposes these contacts will be designated H0, H1, H2, etc., T0, T1, T2, etc.; and U0, U1, U2, etc. Although the 30 contacts just mentioned, which are used for airplane identification purposes are illustrated as being arranged in three columns one column for each digit. These contacts are actually, in practice, arranged in two columns, there being 15 such contacts in each column. This is done to permit a narrower and longer token to be employed and is advantageous by reason of the limited space on the face of the operator's control board available. As illustrated in Fig. 2A each of the tokens is provided with three actuating ears each of which can close a particular airplane identification contact and these ears are arranged differently on each of the tokens so that various airplane identification numbers from 1 to 999 may be characterized in these various tokens. For instance, token No. 122 would be constructed to close contact 1 in column H (see lower portion of Fig. 8C) close contact 2 in the tens column T and close contact 2 in the units column U. By properly distributing the ears in each of these tokens, numbers from 1 to 999 may be electrically manifested. The token receptacle contacts 10, 11, 12 and 13 are actuated by any token and no ears are required to cause such actuation. For a more detailed illustration and more detailed description of these tokens and token receptacles attention is directed to our copending application, Ser. No. 489,775 filed on even date herewith.

*Scanning mechanism.*—Referring to Figs. 8C and 8E it will be observed that scanners SA and SB have been shown conventionally in these figures of the drawings, respectively. These scanners are used to establish a large number of groups of circuits one group at a time. The scanner SA has been illustrated more specifically in Figs. 6, 6A and 7 of the drawings. These scanners are provided to effectively connect any one of the 24 token receptacles or jacks employed on each panel of the controller's board AF to a multiple network one at a time, and also to make certain other related circuit connections in synchronism with the act of connecting a particular token receptacle to the network. Referring to Figs. 6, 6A, and 7 of the drawings, it will be observed that the preferably vertical shaft 20 at times driven through the medium of the clutch 21—22 by the motor M has secured thereto but insulated therefrom rotatable contact arms 25, 26, 27 and 28. There are, however, in actual practice 30 of the contact arms designated 25 and 26 for contactors SAI and SAJ, etc. making a total of 32 rotatable contact arms. It will be observed that the rotatable contact arm 28 of the contactor SAG is normally in engagement with its stationary contacts 1 to 24, inclusive, of which the contacts 6 and 19 only have been illustrated in Fig. 6; whereas, the other contact arms 25, 26 and 27, etc. are, as shown, normally out of engagement with their respective stationary contacts. The contact arm 28 is normally required to at all times be in engagement with the associated stationary contacts because it is employed as a circuit hunting arm whereas the contact arms 25, 26 and 27 are circuit closing arms that are normally out of engagement with their stationary contacts and close circuits only when the associated clutch-relay magnet AMR is energized. It should also be noted that each of the contact arms 25, 26, and 27 is insulated from the shaft 20 by insulating sleeves 29 pinned directly to the shaft 20, whereas the contact arm 28 is insulated from but slidably key-fastened to the shaft 20 so that all of the arms will rotate in synchronism during rotation of the shaft but upon endwise movement of the shaft the rotatable arms 25, 26 and 27 will move endwise with the shaft whereas the contact arm 28 is slidably keyed to the shaft and will not move endwise as the shaft is moved endwise, this arm 28 being prevented from moving endwise by reason of fixed stop members 30 of insulating material. All of these contact arms are operatively connected to and insulated from the shaft 20. The clutch members 21 and 22 are normally held in engagement with each other through the pressure exerted by the spring 31. This shaft 20 is pivoted in bearings 32 and 33. The contact arms 25, 26, 27 and 28 are connected to wires 35, 36, 37 and 38 through suitable slip ring connections including contact brushes conveniently shown.

Adjacent the shaft 20 and contact arms 25—28 is fixedly mounted a combined clutch, brake, and contact operator conveniently called a clutch relay magnet. This clutch relay magnet preferably includes a magnet coil AMR having associated therewith an armature secured to an arm 34 having one end pivotally secured to a fixed bracket 39. The end of this arm 34 operatively engages the upper end of the shaft 20 so that upon energization of the magnet coil AMR the shaft 20 is operated endwise downwardly to disengage the clutch 21—22 and cause the contact arms 25, 26 and 27 to engage their respective stationary contacts. This disengagement of the clutch members 21—22 removes the drive connection between the motor M and the shaft 20. This downward endwise movement of the shaft 20 also causes one of the V-shaped lugs 19ª of the disc 19ᵇ fixedly secured to the shaft 20 to engage a hold 29ª in the brake disc 29ᵇ. This engagement of the V-shaped lugs 19ª in the openings of the stationary brake disc 29ᵇ not only causes the shaft 20 to come to a sudden stop but also causes the contact arms 25—28 to be properly centered on their respective stationary contacts. The operating arm 34 controlled by the magnet coil AMR upon being moved downward by this magnet not only operates the shaft 20 endwise downwardly but also causes the normally closed contacts 41 and 42 to open and causes the normally open contacts 43 and 44 to close. The housing of the motor M is preferably provided with suitable reduction gearing (not shown) to rotate the clutch member 21 at a very low speed of say 60 R. P. M. It is thus seen that energization of magnet AMR as by the closure of a circuit by contact arm 28 causes the shaft 20 to abruptly stop to close a specific circuit for each of the 31 selectors SAH, SAI, SAJ, etc. The particular circuit selected by each selector depends on the particular contact then engaged by the circuit hunting contact arm 28.

*Posting units.*—Referring to the upper part of Fig. 8C of the drawings and to the panel A shown on Fig. 4 of the drawings it will be observed that the three indicators for indicating plane identification and located in the column "identity" (Fig. 4) have been designated IA2H, IA2T and IA2U. These are used for indicating the hundreds, tens and units digits of the airplane identifying number. Similarly, indicators or posting units EA2HT, EA2HU, EA2MT and EA2MU are provided in the column headed "estimate" to indicate the tens of hours, units of hours, tens of minutes and units of minutes of the estimated arrival time, respectively. Similar posting units OA2MT and OA2MU are provided in the third column of the panel A of the flight progress board and shown in Fig. 8D of the drawings and headed "over" in Fig. 4. These posting units are used for indicating the over-report time in minutes. Similar units are provided for each posting of the 24 postings employed for each fix. These movable indicator posting units may be of a construction such as illustrated in Figs. 7 to 10, inclusive, of our prior application, Ser. No. 470,018 or may be of a construction such as indicated in our copending application, Ser. No. 489,776, filed on even date herewith.

Generally speaking, these posting units constitute a rotatable belt or drum of translucent material on the inside of which the numerals are painted or otherwise affixed, there being an indicating lamp such as AIEL or AIOL (see Fig. 8C) for rendering these numerals visible only when such lamp is illuminated. The construction is such that the lamps are illuminated only when the number displayed by such drum or belt is to be rendered visible. The construction is further such as to provide a plurality of inlet wires to each indicator to actuate the same by suitable power operating means and including means for opening the energizing circuit for such power operating means and including a particular wire when the drum or belt has been rotated to a position to display a number corresponding to the number of the wire. In other words, if wire No. 5 is energized the rotatable drum or belt will be operated by the power operating means until the number 5 is displayed by the indicator at which point in the operation the energizing circuit for the power operating means is opened and the rotatable belt or drum is suddenly brought to stop by a spring pressed electro-magnetically operated brake. For a detailed description of the construction and operation of these movable indicators attention is directed to the above-mentioned copending applications.

*Indicating lamps.*—As already pointed out indicating lamps such as AILQ and A2RQ (see Fig. 2 of the drawings) are employed on the controller's board. These lamps indicate whether a route has been established up to that fix or has been established through that fix and that arrow displaying indicating lamps such as AIRK and A2LK on the flight progress board are employed for indicating the direction in which airway traffic is to move over a proposed flight route. In addition to these indicating lamps there are lamps, such as AIEL and A2EL (see Figs. 8C and 8D) which light corresponding posting units for displaying the airplane identification and the estimated arrival times on corresponding portions of the flight progress board. These latter lamps will only be lighted when the numerals displayed by these posting units are to be recognized on the flight progress board, these numerals on the posting unit being invisible so long as the lamps associated therewith are extinguished. There is also provided a scanner indicating lamp for each panel of the control board. These lamps are lighted only when the corresponding scanner is at rest and performing a circuit making function. These lamps are designated AL, BL and CL for control panels A, B and C, respectively of Fig. 2.

*Arrival time calculator.*—The estimated arrival time calculators include a series of differential or epicyclic gear units through the medium of which a shaft may be driven by several other shafts, these units being located in the desk shown in Fig. 2 of the drawings, there being three such units in the control board AF for each check point for each direction of calculations. The west-to-east arrival time calculator is located underneath the back part of the desk, whereas the east-to-west arrival time calculator is located underneath the front part of the desk. A west-to-east calculator has been shown in Figs. 1, 2 and 3 of our prior copending application, Ser. No. 470,018, to which attention is directed.

Generally speaking, this west-to-east arrival time calculator includes a cruising knob EC (see Fig. 2), which may be adjusted to the cruising speed of the airplane under consideration. This cruising knob EC is so associated through gearing with the hour and minute indicating knobs EHA and EMA for fix A and EHB and EMB for fix B that these hour and minute indicators will indicate a difference in time depending on the adjusted position of the cruising knob EC. The actual distance in miles between fixes A and B and between B and C is taken into consideration by gear ratios built into the calculator between the gear units for fix A and the gear units for fix B and between gear units for fix B and gear units for fix C. From this it is readily seen that if the hour and minute knobs EHA and EMA for fix A are set to indicate the starting time and the cruising knob EC is set to indicate the cruis- the speed of the airplane under consideration that the arrival time for that airplane at fixes B and C will be indicated on the hour knobs EHB and EHC and the minute knobs EMB and EMC. It may be pointed out that due to variable factors such as a head wind, a tail wind, an airplane ascent or an airplane descent, it may be desirable to compensate for these variable factors and for this reason a variable factor correcting knob EVAB for making such correction between check points A and B and a variable factor correcting knob EVBC for making variable factor correction between check points B and C have been provided and are illustrated on the desk of the control board shown in Fig. 2 of the drawings. A similar variable factor correcting knob EVCD is also illustrated. The hour knob EHA has associated therewith contact mechanisms EHTA and EHUA (see the lower part of Fig. 8D of the drawings), whereas the minute knob EMA has associated therewith contact mechanisms EMTA and EMUA (see the lower part of Fig. 8D of the drawings). Similarly, the hour knob EHB (see Fig. 2) has associated therewith contact mechanism EHTB and EHUB (see Fig. 8F), whereas the associated minute knob EMB has associated therewith contact mechanisms EMTB and EMUB (see Fig. 8F). The manner in which these contact mechanisms are associated with the arrival time calculator is indicated in Figs. 2A, 2B, 2C and 3 of our prior application, Ser. No. 470,018 to which attention is directed. These contact mechanisms electrically reflect the arrival times that have been calculated by the calculator. These electrical manifestations may be electrically projected onto the flight progress board in response to manual push button and token manipulation as more specifically pointed out hereinafter.

*Posting interlocking network.*—The posting interlocking network is substantially entirely shown in Figs. 8A and 8B of the drawings and is almost wholly controlled from the operator's control board and is used to establish flight route circuits which electrically identify certain ones of the postings of the network. These flight route circuits are controlled by the push buttons of control areas on the control board and control indicating lamps located in corresponding posting areas on the flight progress board. These route circuits conform substantially, that is, rise and fall in the same way as the actual flight route rises and falls in passing through the altitudes involved. Fig. 8A shows the postings 1 and 2 of the network for fix A, whereas Fig. 8B shows postings 1 and 2 of the network for fix B. It will be observed that each posting of the network is provided with two link wires. For posting 1 of fix A these link wires have been designated A1L and A1R and are electrically connected together only if a route circuit extending through the network of that posting has been established. If the route circuit in question starts at that particular posting it receives its energy through the front contact 51 of the associated token repeating relay TP (relay A1TP for posting 1 fix A). Any one right-hand link wire for fix A can be connected to any left-hand link wire for fix B through the vertical bus wires 1 to 7 of the altitude bus indicated on the right-hand side of Fig. 8A. Similarly, any right-hand link wire of fix B can be connected to any left-hand link wire of fix C through the medium of similar altitude bus wires shown at the extreme right-hand side of Fig. 8B. When a route is set up from left to right current flows from left to right from link wire to link wire and it flows from right to left if the route has been set up from right to left.

The connections for connecting any particular right-hand link wire of fix A to any particular left-hand link wire of fix B is carried out through altitude bus wires numbered 1 to 7, inclusive, and these altitude wires are selected through the medium of combination relays or selecting relays $a$, $b$, and $c$. There is a set of such combination relays for each posting-fix. The manner in which these combination relays $a$, $b$, $c$, etc. are picked up, that is, whether all or only some of these relays $a$, $b$, and $c$ are picked up, for the section AB is determined by the particular push button BLX depressed at fix B, whereas the particular group of combination relays energized, that is, those with a suffix 1 (posting 1) or those with a suffix 2 (posting 2) is determined by the particular push button ARX depressed at fix A. The combination contacts for these combination relays $a$, $b$, and $c$ are shown directly below these relays and from consideration of these contacts and their electrical inter-connection it is readily seen that altitude bus 1 is selected by having the relays $a$, $b$, and $c$ of any group energized, whereas, altitude bus wire 2 is selected when relays $a$ and $b$ only of any group are energized, altitude bus wire 3 is selected when relays $a$ and $c$ only of any group are energized, altitude bus wire 4 is selected when the relay $a$ only of any group is energized, altitude bus wire 5 is selected when the relays $b$ and $c$ only of any group are energized, altitude bus wire 6 is selected when the relay $b$ only of any group is energized, and altitude bus wire 7 is selected when the relay $c$ only of any group is energized. As illustrated only seven altitude bus wires are employed and this would take care of only seven different postings at each check point. Since it is contemplated to employ 24 postings at each check point these combination relays would have to be increased to 5 and the circuits illustrated would have to be correspondingly extended as will be obvious to any one skilled in the art. It is thus seen that any push button toward the left from any section (such as section AB) selects a particular, namely the associated, bank of combination relays, whereas any push button toward the right determines how the selected group shall be energized to select a particular altitude bus wire. The combination contacts $a$, $b$, $c$ provided on the push buttons to the right of the section, such as B2LX (Fig. 8B) are such as to select the altitude bus wire connected to the associated link wire, such as B2L.

Each posting is provided with a token receptacle such as A1T or A2T (Fig. 8A) directly below which is shown its associated token repeating relays ATP. To the left of each token relay is shown the right-hand direction relay DR and to the right of each token repeating relay is shown a left-hand direction relay DL. Directly to the left of each right-hand direction relay is shown the push button repeating relay LL, whereas directly to the right of the left-hand direction relay DL is shown the push button combination relays, repeater relay LR. The push button repeating relay LL is directly associated with the push button LX, whereas the push button repeating relay LR is indirectly associated with the push button RX; the relay LR, however, to be picked up requires at least one of the associated combination relays $a$, $b$ or $c$ to be up. These combination relays are picked up by a circuit passing through the contact 49 of such push button RX and a back contact 48 of its associated push button relay LR. The reference characters for the various relays just mentioned are supplemented by prefixes which designate the fix and the posting with which they are associated. It may be pointed out that the push button repeating relays LL and LR control the indicating lamps Q located on the control board whereas the direction relays DR and DL control the direction indicating lights K located on the flight progress board.

Referring to posting 1 for fix A (Fig. 8A) it will be observed that if token 122T, for instance, is inserted in token receptacle A1T that the token repeating relay T1TP will be immediately energized and picked up and that current may then flow from the positive terminal of the main battery through front contact 51 of token repeating relay A1TP through inductance 24, back contact 54 of relay A1LL and front contact 53 of relay A1TP, to the link wire A1R, or through back contact 54 of relay A1LR and front contact 52 of token relay A1TP to link wire A1L. If a route is to be set up toward the right, the push button repeater relay A1LR will be picked up and by the opening of its back contact 54 will remove energy from the link wire A1L, whereas if a route toward the left is to be set up the push button repeater relay A1LL will be picked up and by the opening of its back contact 54 will remove energy from the link wire A1R. The manner in which these push button repeating relays A1LL and A1LR and their associated direction relays A1DR and A1DL are controlled will be more specifically pointed out in the complete operation of the system hereinafter described.

Operation

*Brief operation.*—By reason of the complex network of circuits involved it is considered desirable to give a brief operation of the system first by discussing the manipulation of the apparatus and the results accomplished and without discussing the specific circuits involved.

Referring to Fig. 1 of the drawings let us assume that the dispatcher is informed that an airplane numbered 122 is to start at fix or station A which airplane is to proceed to station F over the ground route A—F shown on his desk and which route may be set up by manipulation of push buttons and a token on the controller's board AF. This information would come to the dispatcher in short form called a flight plan which might read: flight plan 122, speed 180, estimated over A at 10:00, cruising 2000 to cross B 3000. The dispatcher will advise the controller of the desired flight route for airplane 122 and the necessity of settling up and assigning an air flight route for airplane 122 on the flight progress board FPAF starting at station A at 10 o'clock in a direction from left to right toward station F and that this route is to start at altitude 2000 either because the airplane is approaching at the 2000 foot altitude and will not stop at station A or because the flight is actually started at station A and is to proceed out of the air field check point A at this altitude. The controller at the control board AF will observe his board and also the flight progress board FPAF and will observe that he has postings 1 and 2 available, both assigned to the 2000 foot altitude, at fix A on the control board AF and the flight progress board FPAF and that he has postings 2 and 3 available both assigned to 3000 foot altitude at fix B, and has posting 2, assigned to the 2000 foot altitude available at fix C. The operator will now conclude, knowing the base time or starting time for the airplane at station A to be 10 o'clock, that it will probably be safe to choose the 2000 foot altitude at fixes A and C and the 3000 foot altitude at check point B for his proposed route for aiplane 122. Let us also assume that the airplane flight identification number is 122 which is also the identification number for that particular airplane. These identification characters may, however, be different and if they are the airplane identifying character will be inscribed on the token plate, as will also the cruising speed, the destination of the airplane, its cargo, etc. The operator will now take token number 122T and insert it in token receptacle A1T on the control board (see Figs. 2 and 8C). He could just as well have inserted it in receptacle A2T because they have both been assigned to the same altitude. He will then depress the push button A1RX on panel A of his control board and will simultaneously therewith depress the push button B2LX on the panel B of this control board. Depression of these push buttons will cause the indicating lamps A1RQ and B2LQ on his controller's board to be illuminated. On the flight progress board (see Fig. 4) the indicating lamp 2BRK will be illuminated displaying an arrow pointing to the right and evidencing that an airplane flight from left to right and entering fix B at posting 2 at altitude 3000 feet has been set up. The operator will be informed by his token on panel A, if there is only one there, from what posting on panel A his route entered panel B. The operator will then depress the push buttons B2RX and C1LX simultaneously. As a result of this push button manipulation the indicating lamps B2RQ and C1LQ will be illuminated on his control board. The arrow displaying indicating lamp C1RK will be lighted on panel C of the flight progress board FPAF. By depressing his token 122 the indicating lamps lighted on the control board and on the flight progress board for the route represented by that token will be intermittently flashed so that he can readily observe at what altitudes at particular fixes his proposed route is located.

The operator will now set the west-to-east cruising knob EC, direction of airplane travel being toward the east, to the proper cruising speed for the airplane 122 under consideration. He will then manipulate the indicating-control dials EHA—EMA (see Fig. 2) to display the starting time of 10:00 on these dials. He will then adjust, if necessary, the variable factor correcting dials EVAB and EVBC to make the proper correction for windage and other variable factors entering into the effective airplane speed. As a result of these manipulations the arrival time for the airplane at fixes B and C will be directly indicated on the control and indicating dials EHB—EMB and EHC—EMC on the controller's board which we will assume is 11:10 for fix B and 11:30 for fix C (see Fig. 4). This starting time of 10:00 will also be electrically manifested by the circuit controllers EHTA, EHUA, EMTA and EMUA (see Fig. 8D of the drawings) whereas the arrival time of 11:10 and 11:30 will be electrically manifested by the circuit controllers EHTB, EHUB, EMTB, EMUB and EHTC, EHUC, EMTC, EMUC, respectively, of the west-to-east calculator contained in the controller's desk. Had the arrival time desired for fix C been known the starting time for fix A and the arrival time for fix B could have been calculated in a similar way by first setting the time for fix C.

The operator now has before him the display of a tentative flight route not only on his control board by the illumination of indicating lamps such as A1RQ and B2LQ but he is also provided with illuminated direction indicating lamps B2RK and C1RK of which the arrows point to the right. The operator is also informed by the readings on the starting time indicating dials EHA—EMA and the arrival time indicating dials EHB—EMB, EHC—EMC when the airplane 122 is to fly over fixes A, B and C of the proposed flight route. The operator may now compare these time readings with other time readings displayed on postings at fixes A, B and C in the neighborhood of the 2000 and 3000 foot altitudes. If the operator concludes that it is safe to assign the proposed route to the pilot of airplane 122 he will depress the token 122T and will simultaneously therewith depress the west-to-east transfer button WETB (see Figs. 2 and 8G) in response to which the airplane identification number 122 as well as the starting and arrival times will be displayed in the proper display areas on each of the panels A, B, and C of the flight progress board FPAF, as shown in Fig. 4 of the drawings. The operator or the dispatcher, as the case may be, will now issue orders to the pilot of airplane 122 informing him that he is to fly from west to east over fix A at 10:00 o'clock, over fix B at 10 minutes after 11 and over fix C at 11:30, and that he is to fly at an altitude of 2000 feet when passing over fixes A and C and is to fly over fix B at an altitude of 3000 feet. In practice this order will be issued in short form somewhat as follows: Flight plan 122, speed 180, proposed departure A 10:00, cruising 2000, to cross B 3000 at 11:10 to C at 11:30 which means he is to fly at 2000 feet throughout the entire flight except where other altitudes are specified.

Let us now assume that this airplane 122 proceeds over the flight route assigned to it and that it arrives at fix B two minutes late, namely, at 11:12 o'clock. The pilot will then report, as by radio-phone, to the over-report man stationed at over-report pedestal OPAF (see Figs. 1 and 3) the fact that his plane 122 is passing over fix B at altitude 3000 feet at 11:12 o'clock. The over-report reporter will then (see Fig. 3) depress the push button B, the push button 3 in the column headed "altitude" the push buttons 1, 2 and 2 in the three columns of airplane "identification," will push the push button 1 in the first column T and push button 2 in the second column U of the "over-report time" push buttons, and will then depress the transfer push button OTB on his over-report pedestal OPAF. It should be borne in mind that the various scanners SA, SB, etc. (see Figs. 8C and 8E) are normally operating and can perform their operating function only when at rest. Depression of these various push buttons on the over-report pedestal will, of course, cause these push buttons to remain in their depressed position by electro-magnetically operated latches, one such latch designated LM having been illustrated in Fig. 8G of the drawings. With these push buttons held in their depressed position a circuit is established to identify postings 2 and 3 at check fix B because both of these postings are assigned to altitude 3000. Remembering that the token 122T might be located at any control area at any fix to the rear of fix B, it will be necessary for all the scanners to hunt for this token. Each scanner will hesitate at each contact segment of its 24 positions where there is a token in place to check the token identification with that of the flight number stored in the identification push buttons on the over-report board. As the scanner SA assumes its first contact position, the token 122T being located in token jack AIT, it will become manifest that token 122T agrees with the number identified by the identity push buttons on the over-report board as a result of which the over-report time of 12 minutes will appear on the two over-report posting units for fix B posting 2. It will, however, not appear in the posting units for posting 3 of fix B (also assigned to the 3000 foot altitude) because alternating current for energizing ER relay for posting 3 fix B will not be closed; whereas, such alternating current circuit for posting 2 fix B is closed and flows over a portion of the originally established route circuit. In other words, the contacts closed in a token receptacle by token 122 will establish circuits through the contacts of depressed push buttons in the column "identification" on the over-report pedestal only if proper correspondence exists between the push buttons depressed on the over-report pedestal column headed "identification" agree with the airplane identification contacts of the token 122T, and then only if this token 122T is contained in a receptacle associated with a route circuit passing through altitude 3000 at fix B. In other words, if the airplane identification reported by the pilot agrees with the contact combination of a token located in a route circuit passing through the altitude and at the fix reported by the pilot, proper circuits will be established to cause the over-report posting units OB2MT and OB2MU (see Fig. 8F) to be operated to positions to indicate the actual arrival time in minutes as reported by the pilot to the over-report operator, and in turn electrically manifested by him by the depression of buttons 1 and 2 in columns T and U respectively in the "over-report time" push button columns of the over-report pedestal OPAF illustrated in Fig. 3 of the drawings.

The operator who sits at the control board AF will be expected to watch his board and observe that the over-report time of 12 minutes has been displayed on panel B of his flight progress board FPAF at posting 2 located in the 3000 foot altitude band. As he observes this actual arrival time, or time at which the airplane flew over fix B, he is of course aware of the fact that the flight route 122 from fix A to fix B on his flight progress board is no longer necessary and he will then remove his token 122T from token jack AIT and will advance it and insert it in token jack B2T. As a result of this advancement of the token 122T from token jack AIT panel A to token jack B2T of panel B on the operator's control board there will be no cancellation of any part of the route. If, however, the token after having been inserted is depressed, the lamps in all of the posting units to the rear of fix B will be extinguished as will also the direction indicating lamp B2RK located on panel B of the flight progress board FPAF and the push button lamps AIRQ and B2LQ located on panels A and B of the control board.

It is thus seen that the operator may first set up a tentative flight route on his control board which will be manifested on the control board by one or two lights for each affected control area and which is also manifested by direction lamps located on the flight progress board displaying arrows indicating the direction of flight over the proposed route. He may then display on his west-to-east arrival time calculator the starting time as well as the cruising speed of the airplane which will result in the visual display of arrival time on the indicating dials of his calculator at each of the fixes on the entire route extending from fix A to fix F. The operator may then compare these arrival times with arrival times displayed on conflicting flight routes already set up on the flight progress board adjacent the proopsed flight route and if he is convinced that it is safe to complete the setting up of the new route for airplane 122 as proposed he may depress his token and depress a transfer button also located on the controller's desk as a result of which both the airplane identification numerals and the estimated arrival time numerals will be transmitted electrically and automatically from contacts on the token and contacts on the arrival time calculator to display both the airplane identification and the estimated arrival times on the flight progress board. If thereafter the pilot reports arriving at some subsequent fix the over-report operator will depress proper push buttons in accordance with the report received by him, as by radio-phone, and if the pilot's over-report agrees with the route and airplane identifying token located therein on the control board the over-report time will be displayed on the flight progress board in the proper display area. Advancement of the token to another token jack in the route followed by depressing of the same will result in cancellation of that portion of the route to the rear of the token.

*Complete operation.*—Let us now consider the operation of the system more fully under the same conditions and circumstances as were the case in the discussion under the heading "Brief operation" by giving consideration to each circuit involved in such operation.

In this discussion it will be assumed that Figs. 8A—8G and 11A—11F are assembled as illustrated in Fig. 14 of the drawings. Let us first assume that the operator inserts the token 122T in token jack A1T (see panel A of Fig. 2 and see Figs. 8A and 8C) and let us assume that he simultaneously depressed push buttons A1RX and B2LX. The insertion of the token 122T in token receptacle A1T (see lower part of Fig. 8A) causes the immediate closure of contacts 10 and 11 (Figs. 8A and 8C) and airplane identifying contacts H1, T2 and U2 (Fig. 8C). The insertion of this token 122T in token receptacle A1T (Fig. 8A) by closure of contacts 10 causes the immediate energization and picking up of the token repeating relay A1TP, through a circuit including contact 10 of token receptacle A1T. As soon as this token repeating relay A1TP assumes its energized position a stick circuit for this relay A1TP is closed beginning at the plus (+) terminal of the network battery (see top of Fig. 11A) through cancel push button PBC, through front push contact 12 of token jack C1T, in multiple with back contact 40 of relay C1EOPS (Fig. 11D) through wire 41, push contact 12 of token jack B2T and its associated multiple contact 40 (Fig. 8B) through front push contact 12 of token jack B1T in multiple with back contact 40 of relay B1EOPS, wire 41, through front push contact 12 of token jack A2T in multiple with back contact 40 of relay A2EOPS (Fig. 8A) through front push contact 12 of token jack A1T in multiple with back contact 40 of relay A1EOPS, through jumper connection 15, cancellation bus CB and stick contact 42 of token repeating relay A1TP through the winding of this relay to the minus terminal of this same battery.

With push button A1RX and B2LX now depressed energizing circuits for the combination relays *a1* and *b1* for section A—B (Fig. 8A) will be closed through circuits which may be traced from the plus terminal of the network source of current (indicated by the tailend of an arrow) through back contact 44 of relay B2LL (Fig. 8B) through contacts *a* and *b* of push button B2LX through wires 45 and 46, the upper windings of relays *a1* and *b1* of section A—B through back contact 48 of relay A1LR, through push button contact 49 of push button A1RX, to the other terminal (—) of said network source (indicated by the pointed end of an arrow). The relays *a1* and *b1* only (not *c1*) will by the closure of these circuits be picked up and will be stuck up through the holding windings and stick contacts 14 of these relays, through stick circuits including cancelling contact 50 of the push button A1RX by energy derived from the link wire A1R. This link wire receives current through front contact 51 of token repeating relay A1TP, back contact 54 of relay A1LL, and front contact 53 of token repeating relay A1TP. The relay A1LR is slow pick-up as conventionally shown and although energized through front contacts 16 of relays *a1* and *b1* (section A—B) it has not yet picked up. With the push buttons A1RX and B2LX still depressed an energizing circuit for the relay B2LL (Fig. 8B) is closed which may be traced from the terminal plus (+) of the network battery, through inductance 24, front contact 51 of token repeating relay A1TP, back contact 54 of relay A1LL, front contact 53 of token repeating relay A1TP, back contact 55 of push button relay A1LR, contact 56 of push button A1RX, bus wire 57, wire 58 of posting 2, contact 59 of push button B2LX through the upper winding of relay B2LL through the cancel contact 60 of push button B2LX to the other terminal minus of the network battery. The inductance 24 is employed to prevent alternating current which, as later pointed out is superimposed on this route circuit from flowing to other route circuits on the same network. That is, the inductances 24 keep the A. C. confined to particular route circuits and the condensers C keep the D. C. out of the alternating current controlled apparatus. The picking up of this relay B2LL will by the opening of its back contact 44 open the pick-up circuits for the relays *a1* and *b1*.

The picking up of the relay A1LR, which was delayed by its slow pick-up feature, now by the opening of its back contact 55 opens the pick-up circuit of relay B2LL but this relay B2LL remains stuck up through its stick circuit including stick contact 74 and cancel contact 60 of push button B2LX. The opening of back contact 48 of relay A1LR opens the pick-up circuits for the relays *a1* and *b1* at a second point but these relays *a1* and *b1* will remain stuck up through their stick circuits heretofore traced. As already pointed out each posting-fix for the circuit network is provided with two link wires which for fix A and posting 1 have been designated A1L and A1R, and other posting-fixes have been similarly designated, where the reference letter denotes the fix and the numeral denotes the posting. With the token repeating relay A1TP and the push button control relays A1LR and B2LL now energized and with the combination relays *a1* and *b1* also energized the front contact 51 of token repeating relay A1TP can feed energy to the link wire B2L (Fig. 8B) and in turn to the condenser CB2L through the following contacts and wires: beginning at the front contact 51 of token repeater relay A1TP, back contact 54 of push button relay A1LL, front contact 53 of token repeating relay A1TP, link wire A1R, front contacts 60 and 61 and of combination relays *a1* and *b1* and back contacts 62 of relay *c1* of section A—B, up on the wire 2 of the altitude buses to link wire B2L to the condenser CB2L from whence it may for alternating current continue through front contact 64 of push button repeating relay B2LL and wire 94 to the transformer TB2. Although direct current derived through front contact 51 of token repeating relay A1TP cannot flow through the condenser CB2L alternating current may subsequently and under certain conditions of the apparatus flow through this condenser CB2L as pointed out hereinafter. Also, with the link wire B2L now connected to the plus terminal of the network battery current may flow through back contact 52 of token repeater relay B2TP through back contact 65 of direction relay B2DL through the upper winding of the direction relay B2DR to cause energization and picking up of this latter relay. This latter direction relay will, of course, be held up also through its stick circuit including its stick contact 173.

With the relay A1LR (Fig. 8A) and B2LL now energized current may flow to the indicating lamps A1RQ located on panel A and B2LQ located on panel B of the operator's control board (Fig. 2). The first of these lamps is lighted through a circuit including the back contact 66 of relay A1ER (see Fig. 8D), wire 63, and front contact 78 of relay A1LR; whereas, the indicating lamp B2LQ is energized through a circuit including back contact 66 of relay B2ER (Fig. 8F), wire 67 and front contact 68 of relay B2LL. It should be noted that the lifting of contacts 66 will apply flashing energy (F+) to these indicating lamps. As pointed out later the depression of the token 122T will cause the lifting of these contacts 66. Also with the direction relay B2DR now energized and picked up current may flow to the direction indicating lamp B2RK through a circuit including the back contact 66 of relay B2ER, wire 67, and front contact 69 of direction relay B2DR. This lamp B2RK is not located on the operator's control board but is located on panel B of the flight progress board (see Fig. 4). Lifting of contact 66 will, of course, also cause flashing of this direction indicating lamp B2RK.

Let us now assume that the operator wants to continue his proposed route toward the east by simultaneously depressing the push button B2RX (Fig. 8B) and push button C1LX (Fig. 11A) on the left-hand portion of panel C (Fig. 2). This manipulation of these push buttons will cause the indicating lamp B2RQ and the indicating lamp C1LQ on the panels B and C, respectively, of the control board AF to be illuminated for reasons as just described in extending the route from fix A to fix B and will also cause the direction lamp C1RK on the flight progress board FPAF to be illuminated. As thus far considered the relays A1LR, relays a1 and b1 section A—B (Fig. 8A), relays B2LL, B2DR, B2LR and relays a2, b2, c2, section B—C all assume their energized positions. Also, as thus far considered the token 122T is located in token jack A1T and the indicating lamps A1RQ, B2LQ, B2RQ, and C1LQ on the operator's control board are lighted (Fig. 2) and the direction indicating lamps B2RK and C1RK on the flight progress board (Fig. 4) are illuminated.

The operator will now, if he has not already done so, manipulate his west-to-east arrival time calculator shown in the upper part of the control desk of control board AF and shown in detail in Figs. 2 and 3 of our prior application, Ser. No. 470,018. As heretofore assumed, the starting time of 10:00 o'clock will be set up on the dials EHA—EMA (Fig. 2) with the cruising knob EC adjusted to the proper cruising speed, namely, that of airplane 122. The operator may then read on dials EHB—EMB and EHC—EMC the arrival time for airplane 122 at fixes B and C respectively. The operator may then compare the arrival time for each of the fixes B to F, inclusive, with arrival times at other postings displayed on the flight progress board and if he is convinced that it is safe to fully set up the proposed flight route for airplane 122 as tentatively set up on the control board and the flight progress board he will simultaneously depress the token 122T located in token jack A1T (Fig. 8A) and the west-to-east transfer push button WETB (Figs. 2 and 8G).

With the west-to-east transfer push button WETB (Figs. 2 and 8G) depressed a pick-up circuit for the master posting relay MPR and including the back contact 80 of the master over-report relay MOP is closed. This causes the relay MPR to pick up and through its front contact 81 and contact 82 of push button WETB close a pick-up circuit from the west-to-east relay WER, which pick-up circuit includes wire 83 and back contact 84 of the east-to-west relay EWR. As soon as the west-to-east relay WER picks up a stick circuit including the front contact 81 of the master posting relay MPR, wire 85, the stick contact 86 of the west-to-east relay WER, and the back contact 84 of the east-to-west relay EWR is closed. This west-to-east relay WER now remains energized so long as the master posting relay MPR remains in its energized condition. It will be observed that the relays WER and EWR are interlocked so that only one of these relays can be energized at a time. It will also be observed that with the west-to-east relay WER energized all of the rotary contacts EHTA, EHUA, EMTA, EMUA (Fig. 8D), EHTB, EHUB, EMTB, EMUB (Fig. 8F) and EHTC, EHUC, EMTC, EMUC (Fig. 11D) will have current applied thereto from the battery B$af$ so that the calculations of arrival time electrically manifested by the west-to-east calculator may flow through feed-back preventing rectifiers directly to any and all arrival time posting units, such as posting units EAIHT, EAIHU, EAIMT and EAIMU for posting 1 fix A and to similar posting units for fixes B and C providing the common outlet wire 104[1] for these postings units is connected to the (—) terminal of the same source of current, as it will be for that altitude for posting for that fix which has its alternating current relay ER (with the proper prefix) energized. If and when such common outlet wire is connected to the negative terminal of said source B$af$ each of the arrival time posting units will operate until the digit indication thereon corresponds to the electrical manifestation of that digit for that fix of the west-to-east arrival time calculator, after which such indicator will be brought abruptly to rest and its internally located indicating lamp will be energized to display that digit number. By referring to Fig. 4 it will be seen that the airplane identifying number 122 has been displayed in postings 1 of fixes A and C and in posting 2 for fix B. It will also be seen that the direction lights B2RK and C1RK display their arrows. By looking at Fig. 2 it will also be seen that lamps A1RQ, B2LQ, B2RQ and C1LQ are lighted as they are for reasons heretofore pointed out.

Let us now observe how the proper alternating current relays ER (with proper prefix) are energized and picked up. Referring to Figs. 8A and 8D and bearing in mind that contact 13 of token jack A1T (shown in both Figs. 8A and 8D) is closed upon depression of the token 122T in this jack A1T, this token having been depressed when the transfer button WETB was depressed. Closure of contact 13, token jack A1T (Fig. 8D), will allow current to flow from the right-hand terminal of the secondary winding of transformer TAS (Fig. 8G), wire 87, through back contact 88 of the master over-posting relay MOP, wire 89, through contact 13 of token jack A1T (Fig. 8D) to primary winding of transformer TA1, back through wire 90 to the other terminal of secondary winding of transformer TAS (Fig. 8G). Energization of the transformer TA1 (Fig. 8D) will, of course, cause the relay A1ER to pick up through its associated full-wave rectifier to cause completion of the circuits through the identification posting units IA1H, IA1T and IA1U (Fig. 8C) and estimated arrival time posting units EA1HT, EA1HU, EA1MT and EA1MU (Fig. 8D). Not only will the alternating current that has been derived through the medium of closure of the contact 13 of token jack A1T flow to the transformer TA1 (Fig. 8D) but it may also flow through wire 92, front contact 93 of push button repeating relay A1LR, condenser CA1R, link wire A1R, front contacts 60 and 61 of relays $a1$ and $b1$ (section A—B), back contact 62 of relay $c1$ (section A—B), vertical wire 2 of altitude bus (section A—B), link wire B2L, condenser CB2L, front contact 64 of push button repeating relay B2LL, and wire 94, to the right-hand terminal of the primary winding of transformer TB2 (Fig. 8F). Also, this alternating current may flow from link wire B2L, back contact 52 of relay B2TP, back contact 65 of relay B2DL, front contact 65 of relay B2DR and back contact 53 of relay B2TP, to link wire B2R and then through front contacts 60, 61 and 62 of relays $a2$, $b2$, $c2$ (section B—C) down altitude bus wire 1 of this same section and to link wire C1L, through condenser CC1L, contact 76 of relay C1LL and wire 92 to the transformer TC1 (Fig. 11D). This flow of alternating current causes the relays B2ER and C1ER to pick up and by closing of their front contacts 95 connect the identification posting units IB2H, IB2T and IB2U and estimated arrival time units EB2HT, EB2HU, EB2MT and EB2MU to the negative terminal of the direct current source through the medium of the winding of the relay B2EP connected in series in the common return wire 96, and front contact 97 of master transfer relay MPR (Fig. 8G). The posting units for fix C posting 1 are similar operated through circuits including front contact 95 of AC relay C1ER.

As pointed out above the calculator electrically manifests starting time of 10:00 for fix A and arrival time of 11:10 and 11:30 for fixes B and C respectively, and that the west-to-east relay WER is energized. We may now trace individual circuits to the various rotary contacts of the west-to-east calculator units for fix B from battery B$af$ through front contacts 17 of relay WER through contact drums EHTB, EHUB, EMTB and EMUB through feed back preventing rectifiers 19 through control magnets (not shown) in posting units EB2HT, EB2HU, EB2MT and EB2MU where all these circuits join and pass through the upper winding of the relay B2EP and through front contact 95 of relay B2ER, wire 96 and front contact 97 of relay MPR to the negative terminal of this battery B$af$. Similar circuits may be traced for controlling the arrival time posting units for fixes A and C through cables 174 and 175 and rectifiers 72 for fix A and through cables 70 and 71 and rectifiers 73 for fix C.

As the circuits for these various arrival time posting units are completed the various series relays A1EP (Fig. 8D) B2EP (Fig. 8F) and C1EP (Fig. 11D) will pick up and at their front contacts 100 will close stick circuits for the master posting relay MPR including front contacts 101 of their associated ER relays, wire 102 and stick contact 103 of this master posting relay MPR.

We may now assume that the indicator drums or belts in the posting units will operate until the proper starting time is displayed on the posting units for the number 1 posting of fix A and that proper arrival time is displayed on the posting unit for the number 2 posting at fix B and for number 1 posting at fix C on the flight progress board. When all the posting units of a group have reached their proper indicating positions the circuits therethrough will be opened and their associated series relays A1EP (Fig. 8D), B2EP (Fig. 8F) and C1EP (Fig. 11D) will be deenergized and dropped. Such dropping relays A1EP, B2EP and C1EP will result in dropping of the master relay MPR by the opening of the stick circuits for this relay MPR heretofore traced and including front contacts 100 of these EP relays. This is however not necessarily the case because it is possible that some of the airplane identification posting units such as IA1H, IA1T, IA1U (Fig. 8C); IB2H, IB2T and IB2U (Fig. 8E) or IC1H, IC1T and IC1U (Fig. 11E) have not yet completed their operation and for this reason these series relays EP will remain energized. Attention is also directed to the fact that so long as any one of these series relays A1EP, B2EP or C1EP is energized it will through its front contact 105 continue to supply alternating current through wires 92 to the network including link wires such as A1R, B2L, B2R and C1L through various condensers resulting in maintaining all the associated alternating current relays ER (with proper prefix) energized for the entire route which has been set up in the control board until all of these EP relays have assumed their deenergized position. This is necessary since if, for instance, the posting units for the fix at which the token is located were to finish first, if its ER relay were not held energized until all the posting units have completed their operation the scanner might disconnect the token too early (due to opening of contact 110 of its relay ER) and prevent the complete identification being set up at all fixes.

Let us now observe how the airplane identification posting units such as IA1H, IA1T, IA1U (Fig. 8C), IB2H, IB2T and IB2U (Fig. 8E) and IC1H, IC1T and IC1U (Fig. 11E) will be operated to indicate the airplane identification number 122 as determined by this particular token 122T even though there are many other tokens at various fixes and postings on the control board as would be the case in practice. In this connection it should be borne in mind that the only alternating current relays ER in the entire system which are energized at this time are the alternating current relays which reflect the proposed flight route, the particular route circuit having been selected by depressing the token 122T (Fig. 8A). These alternating current relays ER remain energized temporarily through a holding effect in that they through contacts 95 hold their associated EP relays energized and in that these EP relays through their contacts 105 maintain alternating current on the route circuit including the various link wires. This holding effect is of course dependent on current flowing through at least one posting unit to supply operating current to such relay EP included in series therewith.

In combination with depression of the transfer button WETB (Fig. 8G), the various scanners, of which scanners SA, SB and SC only have been illustrated (Figs. 8C, 8E, 11C and 11E), which are normally continuously operated and are always ready to hunt a posting area at its particular fix at which the alternating current relay ER (with the proper prefix) is energized, will stop at posting areas where the ER relays are up. Since the alternating current relay A1ER for fix A, the alternating current relay B2ER for fix B and relay C1ER for fix C are the only alternating current relays which are now energized, it may be assumed that scanners SA and SC will come to a stop at stationary contact 1 whereas scanner SB will come to a stop at the stationary contact 2 (see circuits through contacts 110 of relays A1ER, B2ER and C1ER). It may be pointed out that scanner SB will not stop at stationary contact 2 unless contact 11 were excluded from the circuit. If it did stop it would perform no particular function in so stopping at this time because there is no token in token jack B2T. In a modified form of this invention wherein scanning contacts are also included in series with the airplane identifying posting units, this stopping feature may be taken advantage of, in which case the rectifiers 138 hereafter mentioned and used to prevent sneak circuits are replaced by properly controlled scanning contacts closed only when the scanner stops at contact 2, so that for the present we need only consider the operation of the scanner SA shown in Fig. 8C. In this modification, however, sneak circuit preventing rectifiers must be included for the vertical riser buses at points just after they leave the main buses for airplane identifying posting units. Attention is again directed to the fact that the hunting rotary contact arm SAG of scanner SA (Fig. 8G) engages its stationary contacts at all times whereas the rotary arms 27, 26, etc., of the remaining scanners SAH, SAI, etc. are only in contact with their stationary contacts when that scanner is at rest with its magnet AMR energized.

With the master posting relay MPR (Fig. 8G) in its energized condition, as has been assumed, current may flow from battery B*af* over the front contact 107 of this relay, wire 108, rectifier 109 (Fig. 8D), poled in the same direction, through front contact 110 of the alternating current relay A1ER, wire 113¹, contact 11 of token jack A1T, to the stationary contact 1 of the scanning circuit controller SAG, through rotatable contact arm 28 thereof, wire 38, front contact 111 of the relay AMRP, through the winding of the clutch-brake-relay magnet AMR, wire 112ª, back contact 113 of the relay BLR, back contact 120 of relay CLR as well as through back contacts of all other relays LR (not shown) to the terminal (—) of the same battery. The first time that the rotary arm 28 of the hunting contact SAG moves over its stationary contact 1 the circuit just traced will be completed, thereby causing the scanner SA to abruptly come to rest on this segment 1 which results in the closure of the contacts 1 of the various scanners SAH, SAI, SAJ, . . . SAX of which only scanning contact SAH, SAI, SAJ have been shown in considerable detail in Figs. 6, 7 and 9 of the drawings. The relay AMRP is not dropped in spite of the opening of the back contact 41 of the clutch-relay magnet AMR, because the bottom winding is held energized through wires 137 and 142 and front contact 154 of relay MPR (Fig. 8G). In Fig. 9 contacts 1 of scanners SAI and SAJ have been illustrated specifically; whereas, contact SAK1 constituting contact 1 of scanner SAK has been illustrated conventionally. In other words, the scanner SA has stopped at a point to connect, as by contacts SAI1, SAJ1, SAX1 (see Fig. 8C), the circuits leading from the token receptacle A1T to the identification wires or token buses, resulting in the flow of current through one circuit for each digit H, T and U (Fig. 8C) of the token jack A1T to the identification posting units of posting 1 fixes A and C and posting 2 fix B. As shown in the drawings the contacts H1, T2 and U2 of the token receptacle A1T are closed, thereby allowing current to flow through feed-back preventing rectifiers 138 not only to the posting units IA1H, IA1T and IA1U for posting 1, check point A, but also allowing such current to flow through buses 121, 122 and 123, through similar rectifiers 139 to the posting units IB2H, IB2T and IB2U for posting 2 check point B and through similar rectifiers 140 to posting units IC1H, IC1T and IC1U (Fig. 11D). It may be pointed out here that all half-wave rectifiers shown in the drawings are used to prevent the flow of direct current in unauthorized circuits; whereas, all full-wave rectifiers are employed to rectify alternating current. As heretofore pointed out the posting units include movable indicators which operate until they indicate the number assigned to the inlet wire which is then energized.

We may therefore assume that the posting units IA1H, IB2H and IC1H will be operated to a position to display the number 1, that the posting units IA1T, IB2T and IC1T as well as the posting units IA1U, IB2U and IC1U will each be operated to a position to display the numeral 2, so that the airplane identification displayed at posting 1 fix A, posting 2 fix B and posting 1 fix C on the light progress board FPAF will be the number 122.

Each series relay EP, such as relay A1EP for posting 1 fix A, when picked up closes a pick-up circuit for its repeater relay, such as relay A1EPS, through its front contact 115, wire 193 and front contact 116 of its associated push button relay A1LL or A1LR, after which this light controlling relay A1EPS will be stuck up through a stick circuit readily traced and including its stick contact 117 and also the contact 116 of its associated push button relay.

We may now assume that all of the arrival time posting units have been operated and all of the airplane identifying posting units at all of the fixes of the established flight route on the flight progress board have been operated to their proper (number 122) position and that in response to the completion of these operations the various series direct current relays such as A1EP (Fig. 8D), B2EP (Fig. 8F) and C1EP (Fig. 11D) have been dropped to their deenergized position thereby not only opening their contacts 100 to open all stick circuits for the master posting relay MPR, but also by opening their front contacts 105 to remove all alternating current from the link wire network involving the particular flight route under consideration. The dropping of the various alternating current relays A1ER (Fig. 8D), B2ER (Fig. 8F) and C1ER (Fig. 11D) will allow their respective scanners such as SA, SB, SC to be restored into normal operation because the circuit including the clutch-brake-relay magnet AMR for scanner SA (and like magnets for other scanners) has been broken at front contact 110 of the alternating current relay A1ER. Also, dropping of the master posting relay MPR causes dropping of the west-to-east arrival time calculator relay WER, thereby disconnecting the west-to-east calculator from the circuits of the flight progress board. The transfer and scanning apparatus has thus been returned to its normal condition under which condition the various relays controlled by the master transfer relay MPR as well as this relay MPR are deenergized and all of the various scanners SA, SB, etc., are set in operation. The various circuits involved and traced during the posting of identity and arrival time are also shown conventionally in Fig. 9 of the drawings.

Referring for a moment to the flight progress board FPAF (Fig. 4) the airplane identity number 122 will appear in the "identify" column of panel A for posting 1 and this same airplane identification number 122 will appear at posting 2 in the "identify" column of panel B and posting 1 in the "identify" column of panel C.

Similarly, the starting time of 10:00 is indicated at posting 1 in the column "estimate" of panel A (Fig. 4) whereas the arrival time 11:30 is indicated at posting 1 in "estimate" column of panel C. It should be observed that postings 1 on panels A and C are located at the 2000 foot altitude and that posting 2 on panel B is located at the 3000 foot altitude (see Fig. 4). The lighted direction lamps B2RK and C1RK by their lighted arrows indicate that the route involving airplane 122, that is, the flight route 122 is from left to right. Since the lamps A1EL and B2EL for the airplane identification posting units and estimated arrival time posting units at posting 1 panel A and posting 2 panel B are now illuminated through contacts 118 and 119 of their associated EPS and EP relays respectively, these identification numbers and arrival times are clearly indicated on the flight progress board. It should be understood that the numbers on the inside of the drums of these posting units are not visible until these units are lighted from within.

Attention is directed to the fact that relay A1EP is provided with two windings. For those operations where at least one of the associated posting units has not already assumed the proper positions this lower winding is unnecessary and performs no function. If, however, all of the seven posting units assume the proper position when a transfer takes place the upper winding of relay A1EP receives no current and therefore would not pick up were it not for the lower winding. If the relay A1EP were not to pick up, its repeater relay also would not pick up and the lighting circuit for the associated posting units through contacts 118 and 119 would not be closed. Let us now assume that all of the seven posting units for "identify" and "estimate" posting 1 panel A already assumed the correct position when a transfer takes place. This transfer function applies positive current from battery Baf to wire 108 and applies negative current from this same battery to wire 96. This current may then flow from wire 108 through front contact 195 of relay A1ER, lower winding of relay A1EP, back contact 196 of relay A1EPS and front contact 95 of relay A1ER to the other wire 96. The completion of this circuit will cause this relay A1EP to pick up resulting in the picking up of the relay A1EPS which latter relay will then stick up for reasons heretofore given. When relay A1EPS picks up it drops relay A1EP by opening contact 196 (assuming circuits through all posting units open) and the dropping of contact 119 of relay A1EP then illuminates these posting units. The flight route having now been fully displayed the operator will again check the estimated arrival times displayed thereon against the arrival times of all conflicting routes and if he finds that no potential hazards have been created he advises the pilot either directly or through a dispatcher, that he may proceed over the route all in a manner as hereinbefore discussed. The transfer circuits above traced are also shown in simplified form in Fig. 9 of the drawings.

The flight route 122 has now been fully posted. Since, however, there may be many other routes posted, the route 122 cannot be readily traced through the various postings on the board. In order to afford ready tracing of a particular flight route on the board, provision has been made to flash only the direction lights on the flight progress board and the corresponding push button lights on the control board for that particular flight route. Let us assume that it is desired to have the indicating lights of route 122 flash to make them stand out above the other lights. This may be accomplished by depressing the token 122T in that each time token 122T now in token jack A1T (Figs. 8A and 8C) is depressed, the contact 13 of token jack A1T causes alternating current to be applied to all of the ER relays of the route. Each ER relay (see relay A1ER, Fig. 8D) by the lifting of its contact 66 will apply flashing energy (F+) instead of non-flashed energy (+). In this connection it should be understood that if desired the posting unit lights for "identify" and "estimate" may also be flashed. This may be accomplished by connecting the front point of contact 118 to the wire 63 of the corresponding fix-posting instead of to the terminal plus (+) in which case these posting units will be flashed when the corresponding alternating current relay EK is energized.

*Posting over-report time.*—Let us now observe how the portion of the flight route 122 extending from fix A to fix B may be cancelled by the operator only after the over-report time has been displayed on panel B or at some subsequent panel on the flight progress board for that flight route by the over-report operator.

By referring to Fig. 1 it will be observed that the over-report pedestals are portable and connected to the associated control board by flexible cable (not shown). This is done so that during inactive periods of the system when one or a few men can operate all boards the over-report may be handled by the operator himself or by an operator of another board in which event the over-report pedestal is moved near the seat of the proper man.

Let us now assume that the over-report man or monitor sitting at the over-report pedestal OPAF (Figs. 1 and 3) receives a communication from the pilot, as by radio-phone, of airplane 122 to the effect that this airplane is passing over fix B at altitude 3000 at 11:12 o'clock. In response to this information the monitor or over-report man will depress the push button 3 (3000 foot altitude) in the column headed "altitude" (Fig. 3), the push button B (fix B) the over-report transfer push button OTB, the airplane identification push buttons 1H, 2T and 2U (left to right and signifying 122) in the columns headed "identification" and the push buttons 1 and 2 (left to right and signifying twelve) in the columns headed "over-report time" on the over-report pedestal OPAF. All of these push buttons, just mentioned, except the transfer push button OTB, remain after being depressed in their depressed positions as by electromagnetic latches of which the latch LM for push button BPB (see Fig. 8G) has been illustrated.

Depression of the over-report transfer button OTB (Figs. 3, 8G and 10B) closes a pick-up circuit for the preliminary relay MOR readily traced in Figs. 8G and 10B of the drawings. With this relay MOR once energized it remains temporarily energized through a stick circuit including its stick contact 125 and the back contact 126 of the master over-posting relay MOP. Also, with relay MOR in its energized condition a pick-up circuit for the master over-posting relay MOP, including the back contact 107 of the master posting relay MPR and the front contact 127 of the relay MOR, is closed. With the master over-posting relay MOP once energized it is stuck up through a stick circuit including its stick contact 128 and the back contact 129 of the cancel repeating relay CANP and also including the normally closed contact of the cancelling button OCB. This cancelling push button OCB is used to cause dropping of the relay MOP and to cause temporary energization of the latch magnet LM in order to cancel a wrong push button set up on the over-report pedestal created by improper manipulation of the various push buttons thereon. It should be observed that the back contact 129 of the relay CANP has in multiple therewith the front contact 168 of the relay CANR. This is done so that sequential picking up of these relays will not drop relay MOP but so that sequential dropping of relays CANR and CANP will. It is also desired to point out at this time that, if desired, the push button OTB may pick up the relay MOP directly through a circuit including back contact 107 of relay MPR in which case the relay MOR is omitted. This relay MOR is employed so that should the over-report operator try to post an over-report at a time when the operator is posting a route (relay MPR energized) the apparatus is conditioned and will be automatically set into operation to post the over-report as soon as relay MPR drops. With the master over-posting relay MOP now energized correspondence circuits between the token receptacle containing a token which electrically manifests the same plane identification number as is manifested by the depressed push buttons in the "identification" columns of the over-report pedestal OPAF are established as soon as the scanner, associated with the token receptacle in which the token 122 is then located, has come to a stop at the posting containing such receptacle. Remembering that token 122 is still located in token receptacle AIT it should be observed that direct current energy is supplied to each token receptacle containing a token through the front contact 130 of the master over-posting relay MOP and the bus wire 131. It is thus readily seen that the stationary contact for each posting, which has a token in its receptacle at check point A and associated with rotary contact arm 28 of the distributor SAG for scanner SA of check point A, is energized. From this consideration it is readily seen that the scanner SA will hesitate at each stationary contact which is energized at least long enough until the open back contact 41 of clutch-brake-relay magnet AMR has been open long enough to drop repeater relay AMPR as a result of which the circuit for this clutch-brake-relay AMR is broken at front contact 111 of the repeater relay AMRP. If, however, the lower winding of this repeater relay AMPR becomes energized as a result of the three relays HR, TR and UR (Fig. 8G) all assuming their energized condition, manifesting that correspondence exists between the token 122T in token receptacle AIT and the depressed contacts of the push buttons marked "identification" on the over-report pedestal OPAF, then the contact 111 of relay AMRP remains closed and the scanner SA remains at stop.

In other words, when the scanner SA comes to rest at contacts 1 current will flow from battery Baf through front contact 130 of relay MOP through wire 131, feed back preventing rectifier 132, through contact 11 of token receptacle AIT, and then through these branch circuits: (one) including contact H1 of token receptacle AIT, scanning contact SAJ1, wire 121, contact H1 of the push buttons on over-report pedestals OPAF marked "identif," through relay HR, to the other terminal (—): (two) including the contact T2 of token receptacle AIT, scanning contact SAL1, wire 122, contact T2 of the push buttons on over-report pedestal OPAF headed "identif" and winding of the relay TR to the other terminal (—), and (three) the contact U2 of token receptacle AIT, scanning contact SAX1, wire 123, and contact U2 of the push buttons on the over-report pedestal OPAF headed "identif," and through winding of the relay UR to the other terminal (—) of the same source of current. With the relays HR, TR and UR (Figs. 8G and 10B) now energized current may flow from the terminal (+) of the battery Baf through front contact 130 of the relay MOP, wires 131 and 133, front contacts 134, 135 and 136 of relays UR, TR and HR respectively, through back contacts 42 of clutch-relay magnets CMR and BMR, front contact 43 of clutch-relay magnet AMR, wire 137, through the lower winding of the relay AMRP (Figs. 8C and 10A), to the other terminal (—). This circuit, of course, maintains the clutch magnet repeating relay AMRP energized and holds the scanner SA at rest at its contact 1 position. With the correspondence relays HR, TR and UR (Figs. 8G and 10B) energized a second circuit is closed through front contacts thereof which may be traced from the terminal (+) of battery Baf through front contact 130 of relay MOP, wires 131 and 133, front contacts 134, 135 and 136 of correspondence relays UR, TR and HR respectively, back contacts 42 of clutch-magnet relays CMR and BMR, front contact 43 of clutch relay magnet AMR, wire 142, front contact 146 of relay MOP, wire 141, front contact 44 of clutch magnet relay AMR, through the winding of relay ALR, to the other terminal minus (—) of the source of current.

Under the present condition of the apparatus, and particularly with the relay ALR energized, alternating current may flow from the right-hand terminal of the secondary winding of transformer TAS through wires 87 and 143, through front contact 144 of the relay ALR, through wire 37, rotatable contact arm 27 of scanning contactor SAH and its stationary contact 1, through wire 145¹ to the upper terminal of the primary winding of the transformer TAI (Fig. 8D) to cause energization of the alternating current relay AIER, the lower terminal of this transformer TAI being connected to the left-hand terminal of the secondary winding of the transformer TAS through wire 90 (Figs. 8G and 10B). The picking up of this alternating current relay AIER does, however, not perform any particular function except the flashing of the indicating lamps for posting 1 of check point A.

The alternating current which is supplied to the upper terminal of the transformer TA1 may, however, also flow through wire 92, front contact 93 of relay A1LR, condenser CA1R, link wire A1R, front contacts 60 and 61 of relays a1 and b1 and back contact 62 of relay c1, bus wire 2 of the altitude bus for section A—B, link wire B2L, condenser CB2L, front contact 64 of relay B2LL, wire 94 to the upper terminal of the transformer TB2. The energization of this transformer TB2 causes the alternating current relay B2ER to be picked up. This alternating current relay B2ER, as distinguished from relay A1ER, by being picked up, however, performs a specific function because the wire 147 leading to its front contact 148 is now connected to the minus terminal of the main battery Baf because the altitude push button 3PB (denoting 3000 foot altitude) and the check point push button BPB (denoting fix B) on the over-report pedestal OPAF were depressed by the over-report operator. Energy may thus flow through the following circuit: beginning at the terminal plus of the main battery Baf through two branches in multiple one including the "over-report time" push button T1, wire 150, wire 150X (Figs. 11E and 11D), wire 150 (Figs. 11D, 11C and 8F), feed back preventing rectifier 151, the number one terminal of the tens of minutes indicator OB2MT (Figs. 8F and 10B) to the upper winding of the relay B2EOP, and the other branch including the over-report time push button U2, wire 152, wire 152X (Figs. 11E and 11D), wire 150 (Figs. 11D, 11C and 8F), feed back preventing rectifier 153, the number two terminal of the units indicator OB2MU, from which point these two branches unite and extend through the upper winding of relay B2EOP, through front contact 148 of the alternating current relay B2ER, wire 147 (Figs. 8F, 11C, 11D and 8G also see 10B), push button contact BPB which identifies check point B, through plug 155 on the posting assignment board B, push button contact 3PB identifying altitude 3000, through the front contact 156 of the master over-report posting relay MOP to the other terminal (—) of the main battery Baf. With this circuit closed, which can be closed only if the token inserted in a receptacle of a route passing through the reported fix altitude agrees with the reported airplane identification, the two indicators OB2MT and OB2MU will be operated to positions to indicate the over-report time of 12 minutes at posting 2 fix B and will also cause the relay B2EOPS to be picked up through front contact 157 of relay B2EOP.

When the relay B2EOP (Figs. 8F and 10B) was picked up by the transmission of the over-report time to the indicators OB2MT and OB2MU a circuit was closed for the cancel relay CANR (Figs. 8G and 10B) which circuit may be traced from terminal plus of the main battery Baf through front contact 165 of relay B2EOP, wire 266, front contact 166 of relay B2ER, wire 167 (Figs. 8F, 11C, 11D and 8G) and the winding of the cancelling relay CANR to the other terminal minus of said main battery Baf.

The picking up of the cancelling relay CANR (Figs. 8G and 10B) by the closing of its front contact 168 closed a second stick circuit for the master relay MOP. Also, the picking up of the cancelling relay CANR through its front contact 170 picks up the slow-dropping cancel repeating relay CANP which latter relay upon picking up opens the first stick circuit for the master relay MOP at its back contact 129, so that subsequent dropping of the cancelling relay CANR will break this second stick circuit for the relay MOP at front contact 168 of relay CANR before the back contact 129 of relay CANP has had an opportunity to reclose. The net result is that the master over-report relay MOP (Figs. 8G and 10B) is deenergized in response to deenergization of relay B2EOP (Figs. 8F and 10B). Dropping of the master over-posting relay MOP will, of course, cause the scanner SA to resume its continuous operation and will cause all of the apparatus involved in displaying the over-report time at posting 2, fix B, to its normal condition. Also, dropping of cancel relay CANR by closing its back contact 170 closes a circuit for the latch magnets LM (see Fig. 8G) including front contact 171 of relay CANP as a result of which all of the latched push buttons on the over-report board OPAF will be returned to their normal non-depressed positions.

*Cancellation of portion of route.*—The operator at control board AF, who is also expected to keep an eye on the flight progress board FPAF will observe that the over-report time of 12 minutes is displayed in the third column of panel B posting 2 (see Fig. 4), namely, in the column entitled "over." The operator upon observing that the airplane 122 has passed over fix B at 11:10 o'clock and at the 3000 foot altitude will in response to this information remove the token 122T from token jack A1T (Fig. 8C). This will produce no immediate result because token repeating relay A1TP is held energized through a holding circuit heretofore traced and including its stick contact 42 and cancel push button PBC (Fig. 11A). He will then insert the token in token jack B2T (Fig. 8B).

Insertion of token 122T in token jack B2T causes token repeating relay B2TP to be picked up to apply plus energy to link wire B2R through inductance 24 (Fig. 8B) its front contact 51, front contact 172 of relay B2DR, this latter relay being stuck up through stick contact 173, and front contact 53 of relay B2TP to the link wire B2R. Since the stick relay B2EOPS is still energized and stuck up through its stick circuit to maintain the over-report indicator lamps B2OL illuminated, the multiple branch portion of the holding circuit for token repeating relay A1TP (Fig. 8A) which includes back contact 40 of relay B2EOPS, no longer exists and the operator may by depressing his token 122T now located in token jack B2T cause opening of the holding circuit heretofore traced for the token repeating relay A1TP (Fig. 8A) by opening contact 12 of token jack B2T. Dropping of the token repeating relay A1TP (Fig. 8A) will by the opening of its front contacts 51 and 53 remove plus energy from the link wire A1R resulting in the deenergization of the stick circuits for the combination relays a1 and b1, section A—B, and causing dropping of these relays a1 and b1, to in turn cause the deenergization and dropping of the relay A1LR. In this connection it may be pointed out that as the token 122T was advanced to token receptacle B2T, the link wires B2L and B2R were isolated from each other by the picking up of the token repeating relay B2TP, current being supplied to the link wire B2R through front contact 51 of token repeating relay B2TP through front contact 172 of direction relay B2DR, front contact 53 of token repeating relay B2TP, so that as soon as the link wire B2L is deenergized by the dropping of the token repeating relay A1TP and combination relays a1 and b1 the link wire B2L is also deenergized. Since the push button repeating relay B2LL and the direction relay B2DR derive their stick up energy from this link wire B2L they will drop to their deenergized position. The direction relays are, however, somewhat more slow dropping than are the push button relays as a result of which the back contact 54 of relay B2LL closes before the front contact 172 of relay B2DR opens so that the continuity of energization of the route circuit in advance of the token, and receiving its energy through front contact 51 of token repeating relay B2TP, is not disturbed. All of the relays that were involved in setting up the route for airplane 122 in the network and located to the rear of fix B have now been returned to their normal deenergized position so that posting 1 for check point A may now be used for assignment to another airplane and flight route. The dropping of the relay A1EPS of course extinguished the lamps A1EL in the posting units for posting 1 fix A so that a flight route passing through this posting is no longer displayed.

It should be observed that the operator cannot cancel that portion of the flight route for airplane 122 to the rear of fix B by merely moving his token from a posting for fix A to a posting for fix B and by then depressing the token when in token receptacle B2T because such depression of the token would not cancel the route unless the back contact 40 of the stick relay B2EOPS were then open. Attention is directed to the fact that cancellation of the route under consideration at fix A will not cause the lamps B2EL and B2OL for illuminating the posting units IB2H, IB2T, IB2U, EB2HT, EB2HU, EB2MT, EB2MU, OB2MT and OB2MU at fix B to be extinguished even though the push button relay B2LL (Fig. 8B) is now deenergized. This is due to the fact that front contact 159 of this relay B2LL is in multiple with the now closed front contact 116 of the push button repeating relay B2LR and this latter relay has not yet assumed its deenergized position and holds the stick circuit for the relays B2EPS and B2EOPS closed. At altitude 1 fix A the indicating lamps A1EL are, however, now extinguished, the lamps A1OL for indicators OA1MT and OA1MU not having been lighted at all, because no over-report was received for fix A. The energizing circuits for the lamps A1EL which pass through back contact 119 of relay A1EP and front contact 118 of relay A1EPS on the other hand are now broken at this front contact 118 because the stick relay A1EPS had its stick circuit broken by the opening of front contact 116 of push button repeating relay A1LR as soon as the flight route 122 to the rear of fix B was cancelled by the depression of the token 122 when located in token jack B2T. In other words, the apparatus for posting 1 fix A has now returned to its normal condition in which all of the indicators for this fix posting are extinguished.

Since the various apparatuses and circuits for each posting-fix is the same as that for every other posting-fix the operation of the entire system insofar as a flight route involving only one ground route is concerned should now be understood from the foregoing description. By referring to the dispatcher's desk DD (Fig. 1) it will, however, be observed that the ground route A—B—C—D—E—F and controlled by the control board AF intersects at fix C with the ground route L—M—C—N controlled by control board LN.

Referring for a moment to Fig. 14 of the drawings which shows how Figs. 8 and 11 may be combined to illustrate an essential portion of the wiring diagram for fixes A, B and C, for ground route A—F and also shows fix C for the ground route L—N. Let us assume that these drawings are assembled as indicated in Fig. 14. In this connection it is desired to point out that the wires leading off of the left-hand end of Fig. 8G should connect to the left side of the rectangle denoting Fig. 8G. The dotted lines back of this rectangle indicate that the "identification bus wires" and the "over-report time bus wires" of the two systems are permanently connected together.

Figure 11C:
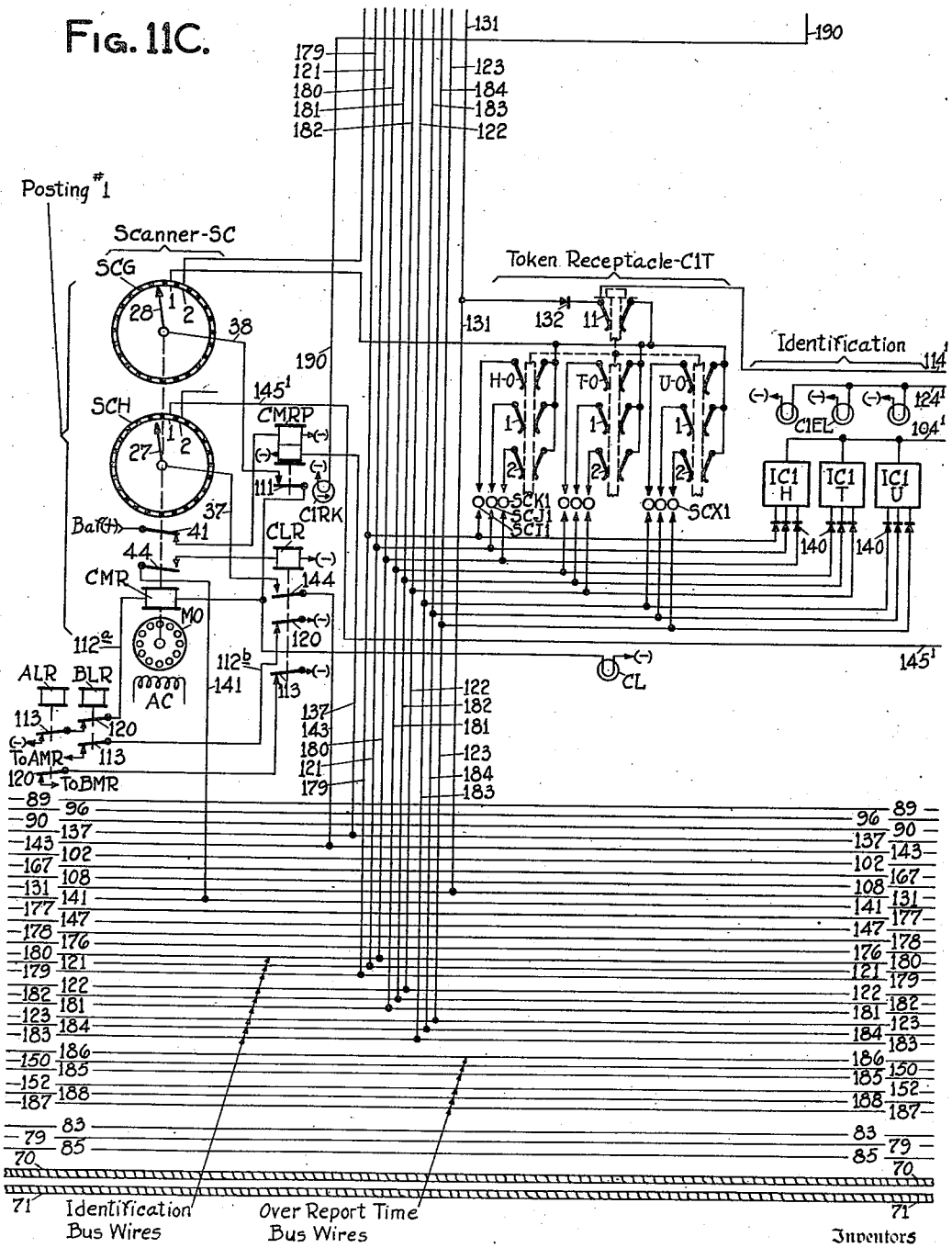
Figure 11E:
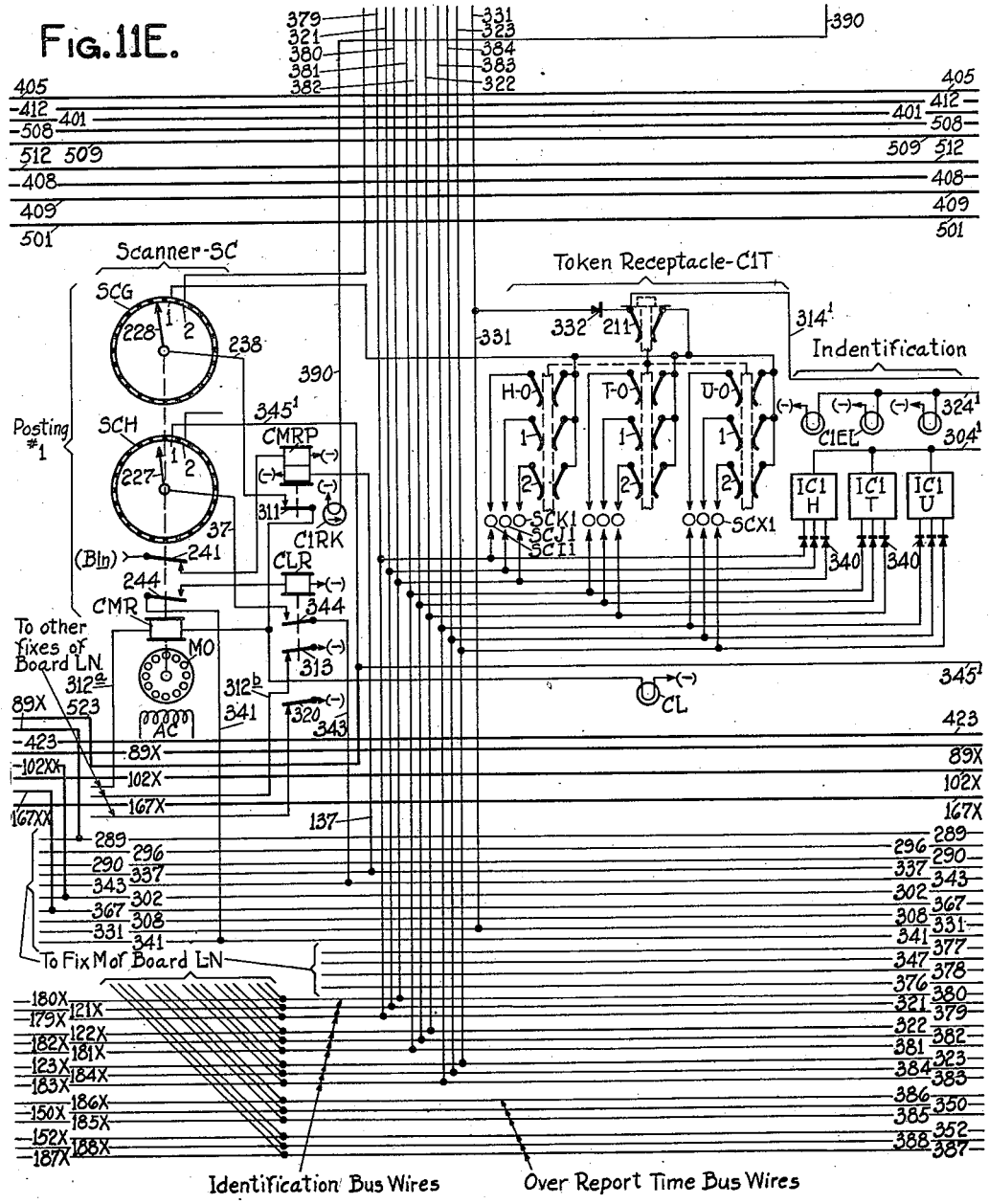

The structure of fix C route A—F is shown in Figs. 11A, 11C and 11D; whereas, like structure for fix C route L—N is shown in Figs. 11B, 11E and 11F.

We have heretofore assumed that the operator at the control board AF had depressed his push buttons B2RX (Fig. 8B) and C1LX (Fig. 11A) and that as a result of this depression of these push buttons the relays B2LR, a2, b2 and c2 (Fig. 8B) and relays C1LL and C1DR (Fig. 11A) have been picked up as the result of this depressing of push buttons B2RX and C1LX. Network energy may now flow from the link wire B2R (Fig. 8B) through front contacts 60, 61 and 62 of relays a2, b2 and c2, downward on vertical bus wire 1 of altitude bus for section B—C, to link wire C1L. This extension of the route network from posting 1 fix A through posting 2 of fix B and to posting 1 of fix C, which was heretofore assumed and described in considerable detail, allows alternating current to flow from this route circuit through condenser CC1L, the front contact 76 of relay C1LL and wire 92 to the transformer TC1 (Fig. 11D). When posting on this route now takes place it will also cause posting of station C board AF because relay C1ER will pick up due to alternating current flowing through condenser CC1L. It is now proposed to point out how the airplane identification No. 122 may not only be displayed at posting 1 of fix C on flight progress board FPAF but will also be displayed at posting 1 of fix C on flight progress board FPLN, as determined by the token which is presumably now located in token receptacle B2T (Figs. 8B and 8E) and likewise how the arrival time calculated for fix C on control board AF is not only displayed at posting 1 fix C on flight progress board FPAF but is also displayed at posting 1 fix C on flight progress board FPLN.

*Simultaneous posting of identification and estimated arrival time at common fixes on two different boards.*—Assuming again that the token 122T is now located at token jack B2T and that the arrival time for fix C has been calculated as 11:30. Let us observe how this arrival time is displayed on the posting units for posting 1, fix C on flight progress board FPLN, it being understood that it will be displayed at posting 1 fix C on flight progress board FPAF in a manner as already described.

By referring to the junction between Figs. 11D and 11E it will be observed that the "identification bus wires" and the "over-report time bus wires" of the system for route A—F are directly and permanently connected to corresponding bus wires for the system for route L—N. These bus wire connections between the boards A—F and L—N and extending from Fig. 11D to Fig. 11E have been assigned like reference characters with the suffix X added. For like reasons all other wires constituting part of the main system and connecting from the system A—F to the system L—N have also been designated by like reference numbers with the suffix X added (see the junction between the Figs. 11D and 11E). In order to further avoid confusion these bus wires as well as all other wires and contacts for the system for route L—N have been designated by a reference character corresponding to the reference character used for system A—F except that 200 has been added to the reference character. In other words, the bus wire 89 for system A—F has been identified by the reference characters 289 in the system L—N and similarly, the reference character 187 constituting one of the bus wires for transmitting "over-report time" in system A—F has been designated 387 in the system L—N. Numerous wires and contacts are necessary to perform special functions for setting up airplane identification and arrival time on a second flight progress board which has a common fix with a first flight progress board and these new and cross connecting wires and associated contacts have been identified by reference characters of the 400 group except insofar as some of these cross connecting wires are merely extensions of wires constituting part of one of the systems.

It has been herein before pointed out that the link wires such as link wires AlL, AlR, B2L, B2R, etc., have been shown by heavy lines. In order to distinguish all the special wires that are necessary to establish indications at, and to provide interlocking between, postings on common fixes of two different boards from other wires these added wires have been shown by medium heavy lines.

It should be remembered that the token 122T is now located in token jack B2T and that the route circuit for this flight route 122 has been continued to posting 1 of fix C and that this fix C is also common to the route L—N. Let us now assume that the arrival time calculations heretofore mentioned, namely, 11:10 for fix B and 11:30 for fix C will stand in the west-to-east calculator of board AF and that the operator is desirous of posting these arrival times at fixes B and C, board A—F and fix C, board LN, and that he also desires to post the airplane identification 122. The operator at AF will therefore depress his transfer button WETB (Fig. 8G) resulting in the energization of the master transfer relay MPR and the west-to-east calculator relay WER, all in a manner as already described, and the operator will at the same time depress his token 122T. The depression of the token 122T will cause the alternating current relays B2ER and C1ER of board AF to assume their energized positions. The arrival time 11:10 and the airplane identification 122 will, of course, be posted at fix B, posting 2, in a manner as already herein before described, and the arrival time of 11:30 on airplane identification 122 will be posted at posting 1, fix C, board AF, all in a manner as already herein before described.

Let us now observe how this latter posting of identity 122 and arrival time 11:30 will be posted at posting 1, fix C, board LN. The scanner for fix B will, of course, stop at contact 2 resulting in the closure of all of the scanning contacts which connect the token jack B2T to the identity buses and since the identity buses for board AF are directly and permanently connected to the identity buses of board LN this token jack B2T may feed energy to the airplane identification posting units IC1H, IC1T and IC1U (Fig. 11F) if the negative side of the battery Baf is connected to the right-hand terminal of the relay C1EP (Fig. 11F). This circuit for posting identity for the hundreds digit may be traced as follows: starting at the terminal (+) of the battery Baf, front contact 107 of the relay MPR (Fig. 8G), wire 108 (Figs. 8G, 11D, 11C, 8F) sneak circuit preventing rectifier 109 (Fig. 8F) front contact 110 of the alternating current relay B2ER, wire 114² (Figs. 8F and 8E) contact 11 of token jack B2T, the closed contact 1 in the hundreds column H of this token jack B2T, scanning contact SBJ2, bus wire 121 (Figs. 8E, 8F, 11C and 11D), bus connecting wire 121X (Figs. 11D and 11E), bus wire 321, sneak circuit preventing rectifier 340 magnet of the posting unit IC1H, wire 304¹, upper winding of the series relay C1EP of fix C, board LN, wire 401 (Figs. 11F, 11E and 11D), front contact 402 of the alternating current relay C1ER (Fig. 11D), wire 96 (Figs. 11D and 8G), front contact 97 of the master posting relay MPR, to the (—) terminal of battery Baf of board AF. Current from the battery of the board AF may now flow through the posting unit IC1H of board LN (Fig. 11E) to cause the series relay C1EP (Fig. 11F) board LN, to pick up and by closing of its front contact 315 close the energizing circuit for the repeater relay C1EPS (board LN). This circuit may be traced from the terminal (+) of a suitable source of current, front contact 116 of the relay C1LR (board AF, Fig. 11A) wire 193, to Fig. 11D, wire 405 (Figs. 11D, 11E and 11F) wire 393, front contact 315 of the relay C1EP (board LN, Fig. 11F) through the winding of the repeater relay C1EPS of this board LN to the other terminal (—) of the same source of current. This relay after being picked up is stuck up through a stick circuit including its front stick contact 317, so that when the posting unit IC1H (Fig. 11E) has completed its operation and has opened the control circuit for the series relay C1EP to cause it to be deenergized, the repeater relay C1EPS will remain stuck up. The dropping of relay C1EP by closing its back contact 319 will close an energizing circuit for the various lamps C1EL for lighting the identification posting units and the arrival time posting units for posting 1, panel C, board LN. Obviously, the tens posting unit IC1T and the posting unit IC1U (Fig. 11E) will be operated in a similar manner and through a similar circuit, and this is also true of the arrival time posting units EC1HT, EC1HU, EC1MT, EC1MU for board LN (Fig. 11F) of the drawings.

It was pointed out hereinbefore that depression of the token 122T in token jack B2T caused the alternating current relays B2ER and C1ER (Figs. 8F and 11D) to pick up. In this connection it is desired to point out that the alternating current relay C1ER of board LN (Fig. 11F) assumed its deenergized position. This is true because the back contact 507 of the relay C1ER, board AF (Fig. 11D) is included in series with the winding of the alternating current relay C1ER, board LN (Fig. 11F). The back contact 407 for board LN is included in the circuit for the alternating current relay for the board AF through wires 408 and 409. The alternating current relay C1ER for board LN is similarly interlocked through a back contact of the alternating current relay C1ER of board AF through the medium of wires 508 and 509, and back contact 507 of the relay C1ER, board AF (Fig. 11D).

It is of course understood that so long as the posting units for posting identity and for posting arrival time for posting 1, fix C, board AF, have not completed their operation the series relay C1EP (Fig. 11D) will remain energized and will through the medium of its front contact 100 complete a stick circuit for the master posting relay MPR (Fig. 8G) and including its stick contact 103. Since for fix C there are posting units on both boards this master posting relay MPR (Fig. 8G) should also have stick circuits for holding it closed until posting on the other board FPLN has been completed. Such a stick circuit has been provided and may be traced from the terminal (+), of the battery Baf, front contact 415 of the series relay C1EP, board LN (Fig. 11F), back contact 416 of the associated relay C1ER, wire 102X (Figs. 11F, 11E and 11D) which may be traced into the master control board (Fig. 8G) over wire 102, through front stick contact 103 of master posting relay MPR through the winding of this relay to the other terminal (—) of the battery Baf.

For like reasons the master over-report posting relay MOP should not be dropped until both of the relays C1EOP (Figs. 11D and 11F) have been picked up and have thereafter again been deenergized and dropped away. This latter function of dropping the stick relay MOP is accomplished by first energizing and picking up the cancelling relay CANR (Fig. 8G) and by thereafter again dropping this relay CANR. The circuit for causing such picking up and dropping of such cancelling relay CANR in response to the picking up and dropping of the relay C1EOP of board AF is accomplished through the medium of front contact 165 of relay C1EOP, board AF, and front contact 166 of the associated alternating current relay C1ER, and wire 167. A similar circuit for this cancelling relay CANR may be traced from the terminal (+) of the battery Baf through front contact 425 of the relay C1EOP for posting 1, fix C, board LN (Fig. 11F) through back contact 426 of the associated relay C1ER, wire 167X (Figs. 11F, 11E and 11D), to the wire 167 (Figs. 11D and 8G) through the winding of the cancelling relay CANR (Fig. 8G) to the other terminal (—) of the battery Baf.

Also as heretofore explained the front contact 105 of the series relay C1EP, board AF (Fig. 11D), provides a sort of holding circuit in that it, when closed, shunts the token jack contact 13 of token jack C1T and thereby provides energy on the transformer TC1 feeding relay C1ER, so long as the associated relay C1EP remains energized and this alternating current may hold the associated alternating current relay C1ER energized to maintain closed the energizing circuit for the relay C1EP at front contact 95 of the relay C1ER. If now posting takes place at one board due to a calculator and token on the other board it is essential that a similar stick feature be provided for the alternating current relay ER of one board so long as the corresponding series relay EP of the other board is still energized. As just explaned the alternating current relay C1ER, board AF (Fig. 11D), is now energized to transfer a posting from the calculator and from the token of that board to posting 1, fix C on both boards and for this reason it is essential that alternating current remain on the primary winding of transformer TC1, board AF (Fig. 11D), so long as either the series relay C1EP of board AF or the series relay C1EP of board LN are energized. The necessary energizing circuit for maintaining the primary winding of transformer TC1 energized insofar as series relay C1EP (Fig. 11D) for board AF is concerned has already been explained and is accomplished by the front contact 105 of this relay C1EP. This primary winding of transformer TC1 (Fig. 11D) is however also maintained energized by relay C1EP of board LN through a circuit starting at the righthand terminal of the secondary winding of transformer TAS (Fig. 8G), back contact 88 of the master over-report relay MOP, wire 89 (Figs. 8G and 11D), wire 89X (Figs. 11D, 11E and 11F), front contact 421 of relay C1EP (Fig. 11F, back contact 422 of the associated relay C1ER, wire 423 (Figs. 11F, 11E and 11D), to the upper terminal of the primary winding of the transformer TC1 for posting 1, fix C, board AF (Fig. 11D).

It will be remembered that relay C1EOP (Fig. 11D) is provided with a bottom winding so that in the event the over-report time posting units OC1MT and OC1MU already assume the position to which they are to be operated in which event the upper winding will not be energized this relay will be energized through said bottom winding. Since this relay C1EOP may be operated from either of the two boards and by energy from either the Baf battery or the Bln battery, the back point of contact 161 of relay C1ER (Fig. 11D) is connected to the battery Bln and has been added to the common fix location shown in Fig. 11D as distinguished from an ordinary fix such as shown for fixes A and B shown in Figs. 8D and 8F. A similar back point of contact 361 of relay C1ER connected to the plus terminal of battery Bln is employed for posting 1, fix C, board LN (Fig. 11F).

We have now traced all of the special circuits for displaying a posting on a second flight progress board FPLN of a fix common to a first board FPAF and it is desired to point out that all of the circuits and contacts involved for posting information on the board FPAF due to the setting up of a route which originated on control board LN have been assigned like reference characters with the exception that they are 100 higher than are the reference characters assigned to these contacts and wires for boards AF and FPAF.

The airplane identifying number 122 and the estimated arrival time 11:30 are now displayed by the posting units at both of the postings 1, fix C, on the two boards. The operator of the board LN may now adjust his arrival time calculator so as to cause the time for fix C to indicate 11:30. He will of course pick the proper calculator depending upon the direction in which he wants to continue the route over ground route L—N. By looking at Fig. 1 of the drawings it would appear that the probability is that the route is to be continued from fix C to fix N on the route L—N. He would therefore use his north-to-south arrival time calculator.

There are two methods of token manipulation or token usage that may be employed in those cases where the route to be set up extends over two different boards. The first one of these methods contemplates the provision of two tokens 122T one for each of the two boards. If this method is employed board AF would, for instance, be supplied with all of the tokens from, say, No. 1 to No. 200 whereas board LN would be provided with all of the tokens from 1 to 100 and from 201 to 300. In other words, the tokens from 1 to 100 would be common to both boards and would be reserved for usage only on routes which pass through both boards. By following this rule there would always be available on the second board a token corresponding to a flight route which originated on the first board. The second method of operation involves a special token which will display the airplane identifying number 000 (zero, zero, zero) and this method will be described hereinafter.

*Employing identical tokens on both boards.—* The operator on the board LN will now observe that a route has been set up on another board which identifies flight No. 122 and displays an arrival time of 11:30 at posting I, fix C. He will of course be informed by written instruction what this flight consists of and what its ultimate destination is. He will therefore, as heretofore mentioned, adjust his north-to-south calculator to indicate 11:30 for fix C and by properly setting the cruising speed and the variable factor dial on his north-to-south arrival time calculator the arrival time at fix N will be automatically indicated on his calculator which we will assume to be 11:54. He may now take his token 122T (the other token 122T being used on board AF) and insert it in token jack CIT, board LN. If he now depresses his token 122T and depresses the north-to-south transfer button (not shown) similar to transfer button WETB (Fig. 8G) the airplane identifying No. 122 will appear in posting I of fix N of board LN as will also the arrival time for posting I of fix N which may be assumed to be 11:54, all for reasons hereinbefore discussed.

Let us now assume that the pilot of airplane 122 reports flying over fix C at, say, 11:31. The over-report operator for board AF will operate the proper push buttons to signify fix C, altitude 2000, airplane identifying No. 122 over-report time of 11:31. This will cause the over-report time of 31 minutes to be displayed by the over-report time posting units OCIMT and OCIMU on both boards FPAF and FPLN, the master over-report posting relay MOP (Fig. 8G) not being deenergized until both of the relays CIEOP (Figs. 11D and 11F) have been returned to their normal deenergized position for reasons hereinbefore described. This over-report time posting takes place on the flight progress board FPAF in a manner as already explained but is transmitted to the same units for fix C altitude I of flight progress board FPLN over special circuits. The circuit for displaying the numeral I on the over-report time posting unit OCIMU (Fig. 11F) will now be traced. This circuit starts at the terminal (+) of the main battery for board AF, namely, battery B*af*, passes through push button contact I in the column U of the "over-report time" located on the over-report board for pedestal OPAF (Fig. 8G) over wire 188 (Fig. 8G) to wire 188 (Fig. 11D), wire 188X (Figs. 11D and 11E), wire 388 (Figs. 11E and 11F), sneak circuit preventing rectifier 410, magnet coil (not shown) in the posting unit OSIMU (Fig. 11F) through the upper winding of the series relay CIEOP, wire 412 (Figs. 11F, 11E and 11D), front contact 413 of the alternating current relay CIER, fix C, board AF (Fig. 11D), wire 77 (Figs. 11D and 8G), second contact of push button CPB (signifying fix C) through posting plug 190 of the plug board for posting I, fix C, through altitude push button 2PB (signifying 2000 foot altitude) through front contact 156 of the master over-report relay MOP to the terminal (—) of the same battery B*af*. The completion of this circuit will of course cause the over-report digit I to appear in the posting unit OCIMU of fix C for board LN, the posting unit OCIMT associated therewith being operated to a position to display the numeral 3 by a similar circuit which will for convenience not be traced.

The over-report time is now indicated for posting I, fix C, on both boards FPAF and FPLN. The operator of the board LN upon observing that the airplane has passed over fix C at substantially the estimated arrival time so that no new hazards have been created will take his token 122T from his token rack ready to continue the flight route 122 on his board LN. The operator of the board AF will now remove his token from token jack B2T and insert it in token jack CIT of his board AF. This movement of the token to the next fix on the route produces no change in the apparatus except that it causes the token repeating relay CITP, board AF (Fig. 11A) to be picked up. Upon depression of this token 122T (now in token jack CIT, board AF) the token repeating relay B2TP will be deenergized because its stick circuit is interrupted at depression contact 12 of token jack CIT, board AF (Fig. 11A) and all of the apparatus associated with posting 2, fix B, will be returned to its normal condition for reasons hereinbefore explained. The airplane identifying number, the arrival time and the over-report time however remain posted at fix C, posting I, on both boards. The airplane 122 now comes under the jurisdiction of the operator of board LN and if the operator of board AF now removes the token 122T from his board and returns it to his token rack and then depresses the cancelling button PBC (see upper right-hand corner of Fig. 11A) all the apparatus associated with posting I, fix C, board AF, will be returned to its normal condition except that the displayed airplane identification, arrival time, and over-report time will remain on both boards. The reason for this is that the stick circuits for the relays CIEPS and CIEOPS of both boards for lighting the lamps for these posting units all receive their energy from a network including wire 405 (Figs. 11C, 11D, 11E and 11F), and since this network is fed through front contacts 116 and 316 of push button relays CILR (Figs. 11A and 11B) and front contacts 159 and 359 of push button relays CILL (Figs. 11A and 11B) these posting units will remain lighted until the route 122 has been cancelled for posting I fix C on both boards.

Let us now assume that the pilot of airplane 122 reports flying over fix N at 11:51. The over-report operator of board LN will operate the proper push buttons to signify fix N, the altitude of the airplane, its identifying number 122 and the over-report time of 11:51. If the apparatus through the medium of the scanner for fix C board LN finds that there is a token 122T in a flight route passing through the reported altitude of fix N the over-report time of 51 minutes will be displayed in the over-report time posting units of the proper posting at fix N. If now the operator of board LN advances his token 122T from posting I fix C to the proper posting of fix N and then depresses the token the entire indication of identity, estimated arrival time and actual arrival time or over-report time will be extinguished at posting I fix C on both boards. This is true because the opening of contact 212 of the proper token jack at fix N of board LN, Fig. 11B, will open the stick circuit for the token repeating relay CITP which will drop push button repeating relay CILR (Fig. 11B) which had its front contact 316 included in the stick circuits for each of the posting unit lighting relays CIEPS and C1EOPS (Fig. 11D) and C1EPS and C1EOPS (Fig. 11F), so that the lamps for lighting all of the posting units of posting 1 fix C of both boards will be extinguished thereby extinguishing the display of information even though the number drums remain in their former position.

Thus far we have only discussed the posting of both airplane identification and arrival time at a common fix-posting on two different boards simultaneously and how over-report time may be posted at such common fix-posting and how the route passing through such common fix-posting may be cancelled. There is, however, still another problem and that is the problem of preventing the setting up of a route into a fix-posting on one board if a route has already been set up into the corresponding common fix-posting on the other board. In other words, if one of the operators has already set up a route to a particular fix-posting the operator of the other board should not be permitted to set up a route into the same common fix-posting. He should, however, be permitted to set up a route leading from such fix-posting. This limitation upon the operators of the two boards is taken care of by suitable interlocking which will now be explained.

It will be remembered that the setting up of a posting from left to right into fix C of board AF (Fig. 11A) requires energy to be available at back points of contacts $a$ and $b$ of push button C1LX. It will be noted that for ordinary fixes (see Fig. 8A) this energy is available at back contact 44 of the left push button relay C1LL. It will be observed that in Fig. 11A such energy is not available unless either the front contact 430 of the token relay C1TP is closed or both of the back contacts 532 and 533 of the direction relays C1DR and C1DL, respectively (Fig. 11B) are closed, the circuit just mentioned also including the wire 431. Similarly, a route cannot be set up into posting 1, fix C of board AF from the right unless the movable contact 49 of the push button C1RX is connected to the negative terminal of a source of current as it is at ordinary fixes. At a fix common to two boards, however, to obtain such connection to the (—) terminal of the battery it is necessary that either the token repeating relay C1TP (Fig. 11A) be in its attracted position to maintain its front contact 435 closed or that the back contacts 537 and 538 of the direction relays C1DR and C1DL, respectively (Fig. 11B) be closed. This latter circuit for supplying the necessary energy to set up a route from right to left into posting 1, fix C, board AF, also includes the wires 436. Similar interlocking circuits are provided to prevent the setting up of a route into posting 1, fix C, board LN, when a route into posting 1, fix C of board AF has already been set up, and these latter interlocking circuits and contacts have ben designated by like reference characters except for the addition of 100 to the reference number for the contacts on the token repeating relay and the wires and the subtraction of 100 from the reference numbers for the contacts on the direction relays. In other words, the interlocking in the route net-work at a fix-posting common to two boards is such that a token is required in the token jack of the second board to set up a route either to or from such fix-posting, and since no token will be there when it is attempted to set up a route into such fix-posting only a route extended from such fix-posting will be set up.

Since the operator on board AF has now returned all of the apparatus on his board to its normal condition that can be so returned by him and he has returned his token to his rack, he may await the cancellation of that route by the operator on board LN after the airplane 122 has progressed and reported flying over fix N as has been assumed.

Since, as already seen, all circuits are symmetrical and after inserting a token in any token jack a route may be set up in either direction from that token jack. It is readily seen that airway traffic may be set up from right to left in the same way as from left to right. In the event, however, that traffic is set up from right to left the operator must calculate his estimated arrival times on the east-to-west calculator instead of the west-to-east calculator as above assumed. Also, in transferring the calculations to the flight progress board he must depress the token for the route in combination with the depression of the east-to-west transfer button EWTB (Fig. 8G) instead of using the west-to-east transfer button WETB. In this connection attention is directed to the fact that if the operator wishes to post only airplane identification (not arrival time) he will depress the identification transfer button ITB (Fig. 8G) instead of one of the other two transfer buttons.

*Employing a token 000T on second board.*—If now the complete operation under the preceding chapter headed "Employing identical tokens on both boards" is reviewed with the assumption that a token 000T (zero, zero, zeroT) is employed instead of the token 122T, it will be seen that an airplane identifying number 000 (zero zero zero) is displayed instead of the number 122. The operator may be instructed to interpret the identifying number 000 to signify any airplane the flight route of which originated on another board and on which the airplane has not yet reached the territory governed by the board under consideration. By such interpretation a few 000T tokens only would be necessary instead of a complete number of tokens from 1 to 100 as hereinbefore assumed. As soon as a particular airplane flying over a route which originated on another board has reached the fix common to the two boards the operator of the first board will hand his token to the operator of the second board, namely, the board under consideration, who will then insert it in the token jack for the proper flight route which is identified by the proper flight number in the fix common to the two boards. The operator of the second board will then depress the identity push button ITB (see Fig. 8G) in combination with the token 122T identifying the particular flight route in response to which the specific flight route identity number 122 will be automatically displayed at each of the various proper fix-postings on the second board. Airplane arrival time for that route will not be changed since depression of the button ITB does not cause posting of the arrival time. Thereafter the operation of the system when employing a token 000 on the second board will be identical to the operation already described when employing duplicate identical tokens on both boards. It is desired to point out that the need for using a token 000 instead of merely depressing the token jack which may be depressed and perform the token depressing function without employing a token therein (see our joint application entitled "Token and receptacle for A. T. C. system," filed on even date herewith), is to avoid displaying an airplane identifying number which was already standing in the various airplane identity posting units of the proposed flight route and which was made visible by illumination of the lamps for lighting these posting units. From the circuits it is readily seen that these lamps will be lighted in response to the transfer of estimate arrival time from the calculator and to the associated posting units in the column headed "Estimate."

It is thus seen that a flight route extending over two flight progress boards may be set up either using two duplicate tokens one for each board or maybe be set up by temporarily using a 000 token on the second board and by transferring the original token from the first board to the second board when the airplane passes over the fix common to the two boards and by then substituting the original token for the 000 token.

It is, of course, understood that even though only nine bus wires leading to token jacks and identity posting units have been shown, a total number of thirty such bus wires are employed in the system, and that even though only twelve estimated arrival time buses are shown a total of three plus ten plus six plus ten or twenty-nine are employed in the system. Similarly, sixteen over-report time buses instead of the six shown are employed. Also although only three route selecting combination relays a, b, and c are shown for each posting section five will be required for a system employing twenty-four postings per fix.

It should be understood that even though flight routes have been assumed to have started at an end-fix and ended at a fix common to a fix on another board that a flight route may start at any fix and may end at any fix as would be the case if the airplane is to stop to take on or discharge passengers. The point at which the flight route is started is determined by the fix-posting at which the token is inserted to identify the route and the end of the flight route is determined by the extent to which push buttons defining entrances and exits to route portions have been operated. That is, the flight route circuit extends only as far along the board as these push buttons have been operated. The route circuit may, of course, be cancelled to the rear of a token by merely depressing the token which will also extinguish all posting units, direction arrow and push button lights to the rear of such token. The apparatus associated with the last fix-posting of a route irrespective of whether such fix-posting is at the end or at an intermediate point along the board may be cancelled by removing the token and by then depressing the route cancelling push button PBC shown in the upper right-hand corner of Fig. 11A of the drawings.

Attention is again directed to the fact that where a fix is common to two boards, as is for instance the case for fix C for boards AF and LN, shown in Figs. 11A and 11B of the drawings, the push buttons for fix C on the two boards are so interlocked that if a flight route has been set up into a particular posting of fix C on one board a flight route cannot be set up into the corresponding fix-posting on the other board, but this interlocking feature does not prevent continuation of the route on such other board out of such corresponding fix-posting.

Modified system

*Structure of modified system.*—We have just discussed under the heading "Employing identical tokens on both boards" how a route may originate on one control board and be automatically posted at the common fix on a second flight progress board and then may be extended on that second flight progress board by the employment of a second token identical to the first token. We then discussed how this route may be extended on the second board by employing a special token 000T which posts 000 in the identity column of the second flight progress board and this latter discussion took place under the heading "Employing a token 000T on second board."

*Extending route identification on second Board without the employment of any token.*—In a proposed modification of the invention as illustrated in Figs. 15A and 15B, when assembled with Figs. 8A–8G and Figs. 11C–11F in a manner as illustrated in Fig. 16 of the drawings and as more specifically pointed out hereinafter, a flight route which originated on one flight progress board is posted on a second flight progress board through the medium of its associated control board without the employment of any token on this second control board. Not only will the arrival time be posted but also the airplane identification number will be posted in the common fix-posting of all boards which have that particular fix in common. In the structure hereinbefore described no provision was made for repeating an airplane identification number, or other character, from the posting units for identity of the second board to other airplane identification posting units for identity either on that second board or on another board beyond such second board and for this reason a token was necessary to continue the flight on a second board. In accordance with the modified form of the invention disclosed in Figs. 15A and 15B when assembled with Figs. 11C–11F and Figs. 8A–8G it is proposed to repeat, so to speak, the airplane identification displayed in one posting area on a flight progress board into another posting area of either that same flight progress board or an associated flight progress board, having a common fix, through the medium of contacts associated with the posting units for identity in said one posting area and reflecting the indicating positions of such posting units.

As described hereinbefore each token repeating relay is provided with a stick circuit which enables the relay to be held up independently of its token and which enables a route to the rear of a token to be cancelled by dropping such token repeating relay in the rear. Where a route extends from one board into another board, through the medium of a common fix, it immediately becomes apparent that it would be desirable to drop a token repeating relay on the first board in accordance with token insertion in a token jack at the common fix-posting on a second board. In order to provide for this special form of release of a token repeating relay on the first board it is proposed to provide two stick circuits for each token repeating relay for each common fix, one stick circuit of which is used when the token repeating relay is to be dropped by depressing a token on the same board and the other of which enables the token repeating relay to be dropped by inserting a token in the common posting-fix on the next board in advance in the route.

Referring to Figs. 15A and 15B, in which all newly added circuits have been shown in medium heavy lines, it will be observed that the regular stick circuit for the token repeating relay C1TP of Fig. 15B, constituting the apparatus for the common fix of board LN, and including the stick contact 242 has been modified to include wires 442 and 443, and back contacts 440 and 441 of push button repeating relays C1LL and C1LR, respectively associated with fix C for control board AF shown in Fig. 15A. The corresponding stick circuit for the stick relay C1TP of Fig. 15A has been similarly modified and for convenience the added wires and contacts have been given the same reference numbers as just mentioned except that the reference numbers have been increased by 100.

Referring again to Fig. 15B it will be observed that the token repeating relay C1TP has been provided with a second stick circuit including stick contact 545 and also including wire 546, back contact 447 of the token repeating relay C1TP of Fig. 15A, and front contacts 448 and 449 in multiple of push button repeating relays C1LL and C1LR respectively (Fig. 15A) of the common fix-postings of board AF. A similar special stick circuit has been provided for the push button repeating relay C1TP of Fig. 15A and for convenience the added wires and added contacts have been given the same reference numbers except for the subtraction of 100 from the reference numbers for the stick contact and wire and the addition of 100 to the reference numbers for the remaining contacts.

As above mentioned, it is proposed to extend the route on a second board without the employment of a token of any kind on such second board. From the description of the first form of applicants' invention, it will be remembered that a route circuit cannot be originated on the board except through the medium of a front contact 51 of a token repeating relay. Since in the present modified form of the invention, it is proposed to extend a route circuit on a second board without the employment of a token it will be readily understood that energy must be applied to a link wire (both in case of an intermediate fix) of the common fix-posting for the second board before the route circuit may be extended on such second board. To perform this function of applying energy to the link wires of the second board LN (Fig. 15B) in response to the picking up of either direction relay or the token repeating relay for that common fix-posting on the first board AF (Fig. 15A) the front contacts 452 and 453 of direction relays C1DR and C1DL, respectively, and front contact 464 of token repeating relay C1TP board AF (Fig. 15A) have been provided. These contacts 452, 453 and 464 are all in multiple and feed energy from the source Baf through inductance 24, wires 450 and 451 through either contacts 555 and 558 of devices C1LL and C1LX through contacts 556 and 557 of the devices C1LR and C1RX (Fig. 15B) in multiple to link wire C1L (Fig. 15B). For like reasons when a route originates on the board LN (Fig. 15B), which terminates or passes through the common fix C, energy is applied to the left-hand link wire C1L and the right-hand link wire C1R of the control board AF (Fig. 15A) through the medium of wires and contacts which have been assigned the same reference numerals except for the addition of 100 to the wire reference characters and the contact reference characters of the board AF and the subtraction of 100 from the contact reference characters of the board LN. In all other respects the apparatus and circuits for the control boards AF and LN and flight progress boards FPAF and FPLN illustrated in Figs. 15A and 15B is identical to the apparatus shown for fixes C in Figs. 11A and 11B except that the interlock including back contacts 432, 433, 437, 438, 532, 533, 537 and 538 on the direction relays has been omitted.

Referring now to the lower portion of Figs. 15A and 15B it will be observed that the token receptacle and the posting units for posting identity for posting 2 of fix C of control boards AF and LN and flight progress boards FPAF and FPLN have been added to the posting 1 for fix C shown in Figs. 11C, 11D, 11E and 11F of the drawings. It should, however, be observed that only the posting units for the posting of identity, namely, the posting units IC2H, IC2T, and IC2U have been illustrated. Also, these three posting units for posting identity have been shown by a more comprehensive conventional illustration, this conventional illustration showing end views of a series of contacts 0 to 9, inclusive, which are arranged in a cylindrical manner, and are primarily used for stopping the posting unit at the proper number and of which one contact of each posting unit is raised at a time through the medium of a roller 599 substantially the same as disclosed in Figs. 7 to 10 inclusive of our prior application, Ser. No. 470,018, filed December 24, 1942. For a detailed view of this contact construction attention is directed to Figs. 10 and 11 of our joint application filed on even date herewith and entitled "Posting unit for A. T. C. system." This more comprehensive conventional showing has been resorted to, to show how additional contacts X, Y, Z, etc. for shunting the run-around circuit preventing rectifiers $140^2$ may be provided. As shown the particular sneak circuit, or run-around, preventing rectifier $140^2$ that is associated with the contact finger that is then lifted by the roller 599 only will be shunted. It is necessary to shunt out such sneak circuit preventing rectifier $140^2$ in order that energy may be fed toward the airplane identification bus wires. In other words, a posting unit is operated by the flow of current from the identification posting bus wires to the posting unit through a rectifier $140^2$ but the current for operating other posting units in accordance with the posting position assumed by the posting units under consideration requires that current flow from the posting unit under consideration around such rectifier to the identification bus wires. Only three of the contact fingers 0-9, inclusive, for the airplane identification posting units IC2H, IC2T and IC2U have, for convenience, been provided with wires leading to the identification buses. These fingers may engage an inner ring 600 nine at a time as shown by arrows, and may engage an outer ring 601, similarly illustrated by arrows, one at a time and may also individually engage individual outer stationary contacts $x$, $y$ and $z$ as these contact fingers are successively lifted one at a time by the roller 599. It will be observed that the three outer rings 601 for the posting units IC2H, IC2T and IC2U (Fig. 15A) are connected, through the medium of individual sneak circuit preventing rectifiers 605, 606 and 607, respectively, to the wire $114^2$ also shown in the first form of the present invention (see Fig. 8C). This is accomplished through the medium of a push token jack contact 608 of token jack C2T and a back contact 609 of the associated token repeating relay C2TP. It may be pointed out here that this token depressing contact 608 of token jack C2T and back contact 609 of the token repeating relay C2TP in series therewith in the circuit which feeds energy to the outer rings 601 of these airplane identification posting units are employed to manifest that the token receptacle has been depressed without the insertion of a token therein, in that contact 608 closed manifests that the token jack has been depressed and contact 609 closed manifests that there is no token in the associated token jack. Since the circuit through the token jack contact 608 and relay contact 609 is closed only when there is no token in the token jack the contact 608 is shown by a slightly different conventional showing that is contact 13 of this same token jack (see also Fig. 11D). It is proposed that the operator be instructed never to depress a token jack without a token therein except when it is desired to extend a flight route from a common fix on a second board which flight route originated on a first board or when he desires to flash the indicating lamps of such extended route. It is believed that the functioning of the modified system is most clearly understood by considering a specific flight route originating on one board and then extended on another board and which flight route is cancelled step-by-step in a manner so that the last portion (common fix) of the flight route on one board is cancelled by depression of the token at a second or subsequent fix on the second board.

*Operation of modified system.*—In order to avoid an unnecessary duplication of drawings the route circuit net-work for posting 2 fix C on both control boards AF and LN has not been illustrated in the modified system (Figs. 15A and 15B) it, of course, being understood that it is the same as that for the fix C posting 1 shown. Posting 2 fix C on both flight progress boards has been added to posting 1 fix C shown in Figs. 11C–11F but was added in Figs. 15A and 15B.

Let us assume that the operator of control board AF in response to a flight route order now desires to set up a flight route 122 beginning at posting 1 fix A, passing through posting 2 fix B, and extending to posting 1 fix C, and that the operator on board LN without the employment of a token continues this flight route from his posting 1 fix C to a posting at fix N considering the modified system illustrated in Figs. 15A and 15B when combined with Figs. 8A–8G and Figs. 11C–11F by arranging these drawings as shown in Fig. 16. The operator will insert his token 122T in token jack A1T (Fig. 8C) and will then depress the push button A1RX and B2LX resulting in the extension of the route circuit through link wires A1R and B2L. He will then depress the push buttons B2RX (Fig. 8B) and C1LX (Fig. 15A) to extend to route circuit to link wire C1L (Fig. 15A). With the direction of relay C1DR (Fig. 15A) now energized the link wires C1L and C1R for fix C of the second board LN (Fig. 15B) may have plus energy applied thereto in response to the picking up of the push button repeating relay C1DR board AF (Fig. 15A). The circuit to accomplish this is illustrated in Figs. 15A and 15B and current may flow over this circuit from the network source of current B*af* through inductance 24 (Fig. 15A) wire 450, front contact 452 of the relay C1DR (Fig. 15A) through the wire 451 to front contacts 555 and 556 of push button repeating relays C1LL and C1LR respectively of the control board LN shown in Fig. 15B of the drawings. The manner in which this supply of current may be used will be explained hereinafter.

The operator of the board LN may now depress his push button C1RX and one of the push buttons NRX (not shown) of fix N on his board to extend the route to fix N (not specifically shown). Depression of push button C1RX board LN (Fig. 15B), as above assumed, results in the picking up of at least one of the associated combination relays a1, b1 and c1 which in turn pick up relay C1LR. Relay C1LR picking up through its front contact 556 allows said current supply to flow over back contact 252 of token repeating relay C1TP (Fig. 15B) back contact 265 of direction relay C1DL to the upper winding of the direction relay C1DR (Fig. 15B). The picking up of this direction relay C1DR by the closing of its front contact 265 and through back contact 253 of its associated token repeating relay C1TP supplies energy to the link wire C1R (Fig. 15B). In other words, the left-hand link wire C1L is directly energized through front contact 556 of relay C1LR from the other board AF and this link wire C1L supplies energy to the right-hand link wire C1R through back contacts 252 and 253 of token repeating relay C1TP, same board, and eventual picking up of this token repeating relay segregates these link wires C1L and C1R (Fig. 15B) from each other. The relays C1DR and a1, b1, etc. are, of course, stuck up by energy derived from the link wires C1L. The push contact 557 on push button C1RX is provided to supply energy temporarily through the circuit including back contact 255 of relay C1LR to pick up the next push button relay such as N1LL (not shown) and to also pick up the direction relay C1DR (Fig. 15B) before the relay C1LR actually picks up. This is necessary because contact 255 is open when contact 556 (both on relay C1LR, Fig. 15B) is closed. If the operator for control board AF now sets his west-to-east arrival time calculator to the proper base time, or starting time, position with the cruising dial EC set at the proper cruising speed position and if he then depresses the token 122T now located in token jack A1T (Fig. 8C) and depresses his west-to-east transfer push button WETB (Fig. 8G) the flight route identification number 122 will be automatically displayed in each of the identification posting areas of fix A posting 1, fix B posting 2, fix C posting 1, board AF (Fig. 15A) and fix C posting 1, board LN (Fig. 15B). The arrival time calculations (different for each fix) will be simultaneously posted with such posting of the airplane identification and will be posted in the proper and associated "estimate" posting areas.

The operator of control board LN will now observe that in posting 1 of fix C has been displayed the air plane or flight route identification number 122 and the estimated arrival time which we will assume to be 11:30. This operator of board LN who has already extended the flight route 122 to fix N positions his calculator to indicate base time of 11:30 for fix C on his north-to-south calculator (not shown) and adjusts the cruising speed by turning his cruising dial SC (not shown) to the proper cruising speed position. The operator of control board LN will then depress his token jack C1T (Fig. 15B no token in the jack) and will also depress his north-to-south transfer button NSTB (not shown but see button WETB, Fig. 8G) as a result of which the estimated arrival time of 11:54 will be displayed on the arrival time posting units at the proper posting of fix N, as will also be displayed the airplane identifying number 122 in the identification posting units for that same posting of fix N. The specific manner in which this posting of airplane identification at fix N, without a token of any kind on board LN for that flight route, is accomplished will be explained hereinafter. This posting will not be explained specifically at this time by reason of the fact that the identification posting units IC1H, IC1T and IC1U (Fig. 11E) have not been shown provided with rectifier shunting contacts and have not been illustrated in sufficient detail in Fig. 11E of the drawings, the corresponding units IC2H, IC2T and IC2U shown in Fig. 15A have, however, been shown in sufficient detail, and the specific manner in which the airplane identification posting may be extended over a second board without the employment of a token on such second board will be described hereinafter by reference to the posting units IC2H, IC2T and IC2U for fix C board AF shown in Fig. 15A of the drawings.

The operation of the modified system as thus far described has resulted in the display of both airplane identification and estimated arrival time in posting areas posting 1 fix A, posting 2 fix B, posting 1 to fix C, board AF (Figs. 11C and 11D) and posting 1 fix C, board LN (Figs. 11E and 11F) and a suitable posting of fix N (not shown) board LN, the token 122T still being located in token jack A1T (Fig. 8C).

Let us now assume that the airplane 122 which started at fix A arrives at fix C, the pilot not having reported when he flew over fix B, and that the pilot reports his arrival over fix C and reports airplane 122, fix C, altitude 2000, and the actual "over" time 11:31. The over-report operator will then depress the push buttons 2PB and CPB (Fig. 8G) and in the identification columns will depress button H1, T2 and U2 and in the over-report time columns will depress the push buttons T3 (not shown) and U1. In a manner as hereinbefore described the over-report time will be automatically displayed in the over-report posting units OC1MT and OC1MU of both board AF (Fig. 11D) and board LN (Fig. 11F).

The operator of board AF will now remove his token 122T from token receptacle A1T (Fig. 8C) and will insert it in token receptacle C1T (Figs. 11C and 15A). The act of removing the token from token jack A1T (Fig. 8C) performs no function, the associated token repeating relay not dropping because it is held energized through the medium of its stick circuit including its stick contact 42. This insertion of the token 122T in token jack C1T (Fig. 15A) will cause the token repeating relay C1TP (Fig. 15A) to pick up, but will not cause the application of network energy through inductance 24, front contact 51 to link wire C1R on board AF (Fig. 15A) because the back contact 563 of push button repeating relay C1LR, board LN (Fig. 15B) is open and the back contact 466 of the direction relay C1DR board AF (Fig. 15A) is also open. That is, energy through front contact 51 of token repeating relay C1TP board AF cannot reach either of the associated link wires C1L or C1R, because contacts 466 of the associated relay C1DR and back contact 563 of the relay C1LR of the other board are open. Had the route circuit been continued to fix D on control board AF, this back contact 563 board LN would have been closed and the link wire C1R board AF (Fig. 15A) would have been energized through inductance 24, contact 51 of relay C1TP (Fig. 15A) contacts 562 and 563 of relays C1LL and C1LR (Fig. 15B) back contact 54 of relay C1LR (Fig. 15A) and front contact 52 of relay C1TP. It should be remembered that link wire C1L (Fig. 15A) is, however, energized through front contact 51 of token repeating relay A1TP (Fig. 8A). The operator will then depress his token 122T when located in his token jack C1T (Fig. 15A) and will thereby open the token jack push contact 12, which at this time is not shunted by the back contact 60 of the relay C1EOPS (Fig. 11D), now energized, as a result of which the cancelling bus will be deprived of energy and the token repeating relay A1TP (Fig. 8A) will be deenergized and dropped to its deenergized position. The dropping of the token repeating relay A1T (Fig. 8A) will result in returning all of the apparatus associated with posting 1 fix A and posting 2 fix B to its normal inactive and non-indicating condition and will also cause the dropping of relays C1LL and C1DR board AF (Fig. 15A) because they derived their energizing current from link wire C1L (Fig. 15A) which derived its energy through front contact 51 of token repeating relay A1TP (Fig. 8A). The indications of airplane identity estimated arrival time and over-report time will, however, still remain displayed at fix C posting 1 on both boards AF and LN by reason of energy supplied to link wires C1L and C1R control board LN (Fig. 15B) through inductance 24 (Fig. 15A) wire 450, front contact 464 of token repeating relay C1TP (Fig. 15A), wire 451, front contact 556 of relay C1LR, board LN to link wire C1L board LN (Fig. 15B). With direction relay C1DR up and direction relay C1DL down (Fig. 15B) and the token repeating relay C1TP still down link wire C1R, of course, received energy from link wire C1L (Fig. 15B) for reasons already given. The token repeating relay C1TP board AF having been picked up is now held energized by the special holding circuit including its stick contact 445, wire 446, back contact 547 of push button repeating relay C1TP board LN (Fig. 15B) and front contact 549 of the associated push button repeating relay C1LR. The regular stick circuit of token repeating relay C1TP board AF (Fig. 15A) is open at back contact 541 of push button repeating relay C1LR board LN (Fig. 15B). The operator of the first board AF will now remove his token 122T from the token receptacle C1T of his board AF (Fig. 15A) which causes no other change in the apparatus to take place because the token repeating relay C1TP (Fig. 15A) is held energized by a special stick circuit including stick contact 445 and above traced. He will then hand this token 122T to the operator of the control board LN who will insert it in his token receptacle C1T board LN (Fig. 15B). The insertion of the token 122T in the token receptacle C1T of board LN and the picking up of the token repeating relay C1TP (Fig. 15B) results in the application of net-work energy of positive polarity to the link wire C1R of that control board LN through inductance 224, front contact 251 of relay C1TP (Fig. 15B) wire 570, back contact 462 of push button repeating relay C1LL and back contact 463 of push button repeating relay C1LR, board AF (Fig. 15A), wire 571, back contact 254 of relay C1LL board LN (Fig. 15B) and front contact 253 of token repeating relay C1TP board LN (Fig. 15B) to link wire C1R (Fig. 15B). This token repeating relay C1TP board LN (Fig. 15B) now being held energized through its regular stick circuit including stick contact 242 and including back contacts 440 and 441 of relays C1LL and C1LR board AF (Fig. 15A).

Energy of positive polarity is temporarily supplied to the link wires C1L and C1R of posting 1 fix C board LN through two different circuits, the one just traced and including front contact 253 of the relay C1TP (Fig. 15B) which feeds link wire C1R (Fig. 15B) and the other passing through wire 450 (Fig. 15A) front contact 464 of relay C1TP of board AF, wire 451 (Figs. 15A and 15B) and front contact 556 of relay C1LR (Fig. 15B) to the left-hand-link wire C1L of board LN (Fig. 15B). The picking up of the token repeating relay C1TP board LN (Fig. 15B), however, by the opening of its back contact 547 interrupts the only closed stick circuit for the token repeating relay C1TP of the other board AF (Fig. 15A) thereby causing it to drop and by opening of its front contact 464 to remove one of the two energies from link wire C1L (Fig. 15B). The link wire C1R now receives energy only through the front contact 251 of its associated token repeating relay C1TP board LN (Fig. 15B).

The indications of flight identity, estimated arrival time and actual arrival time (over report-time) however remain posted at posting 1 fix C on both boards because the light circuit stick relays C1EPS and C1EOPS on both boards are held energized by stick circuits including the front contact 316 of push button repeating relay C1LR board LN (Fig. 15B). The dropping of push button repeating relay C1LL board AF (Fig. 15A) at its back contact 440 closed the regular stick circuit for token repeating relay C1TP board LN (Fig. 15B) including its stick contact 242 so that subsequent removal of the token 122T from token jack C1T board LN (Fig. 15B) will not cause dropping of its associated token repeating relay C1TP, board LN. All relays of control board AF for flight route 122 have now been returned to their normal deenergized positions except lighting stick relays C1EPS and C1EOPS.

The back contacts 562 and 563 of push button repeating relays C1LL and C1LR board LN (Fig. 15B) are provided to shunt the back contacts 466 and 467 of direction relays C1DR and C1DL (Fig. 15A) so that should the flight route which originated on board AF have not yet been continued on the board LN (Fig. 15B) when it is attempted to cancel the route on the first board AF with the token in token receptacle C1T of such first board the route on such first board cannot be cancelled except by special manipulation. This special manipulation consists in removing the token from such token jack C1T (Fig. 15A) and in depressing the special cancel button PBC (see upper right-hand corner of Fig. 15A). Such special cancelling would only be done when an airplane is to land at such common fix C. The reason cancellation would not take place when the route is not yet extended is that energy would be fed back to the various link wires over back contact 54 of relay C1LR and front contact 52 of relay C1TP (Fig. 15A).

Let us now assume that the pilot of the airplane 122 reports flying over fix N at a specified altitude at 11:51. The over-report operator for board LN will now operate the proper push buttons on his over-report pedestal OPLN (Fig. 1) to cause the over-report time to be displayed by the over-report posting units for the proper posting of fix N (not shown) on board LN in a manner and for reasons hereinbefore described. The operator of control board LN will then remove his token 122T from the token receptacle C1T (Fig. 15B) the token repeating relay C1TP of board LN being held energized through the medium of its regular stick circuit including its stick contact 242.

At posting 1 fix C on both boards are now displayed by lighted posting units indications of "identity," "estimate" arrival time, and actual "over" arrival time (11:31) as is also true of the particular posting for that flight route at fix N. The "over" arrival time at fix N will, however, be 11:51. As thus far described the operator of the board LN has removed the token 122T from token pack C1T and is presumably still holding it in his hand and under this condition the energy for the route circuit under consideration (C to N) is derived through contact 251 of token repeating relay C1TP (Fig. 15B).

Let us now assume that the operator of board LN inserts his token 122T in the proper token receptacle at fix N (not shown). Such insertion of the token 122T will cause the associated token repeating relay to pick up and apply energy to the link wire N?L (not shown) through a partial circuit including the front contact 251 of the associated token repeating relay N?TP (not shown). Energy is now supplied to the route circuit for flight route 122 on board LN fix C to fix N through front contact 251 of token repeating relay of fix C and for all fixes beyond fix N through the front contact 251 of the token repeating relay at fix N, assuming the flight route to have been set up beyond fix N.

Let us now assume that the operator of the board LN depresses his token 122T when in the token receptacle for fix N of this board. This will cause the token repeating relay C1TP board LN (Fig. 15B) to be deenergized to cause all energy to be removed from all of the link wires to the rear of fix N and will cause all of the apparatus to the rear of the fix N to be returned to its normal condition. Had the route been set up only to fix N it would have been necessary to cancel that portion of the route (fix C to fix N) by depressing the token receptacle for that posting at fix N without a token therein or by depressing the special cancel button PBC, upper right-hand corner of Fig. 15B, while the token is not inserted in any token jack of the flight route.

*Operation modified system—Posting identity from posting units.*—In the above operation of the modified system (Figs. 15A and 15B, etc.) where a route starting at posting 1 fix A and extending over posting 2 fix B, posting 1 fix C to fix N was set up it was not pointed out how the contacts of the identification posting units of fix C, board LN are employed to control the posting units for identity at fix N. This was not explained because the posting units for identity at posting 1 fix C, board LN (Fig. 11E) were not shown in sufficient detail. These posting units for identity for posting 2 of fix C, board LN (Fig. 15B) are however shown in sufficient detail, and if we now assume that the flight route just considered passes over posting 2 fix C, instead of posting 1 fix C, this phase of the operation of the system may be described.

It is, of course, now understood that the identification posting units IC2H, IC2T and IC2U (Fig. 15B) assume the 1, 2 and 2 position, respectively, signifying 122, and these posting units are, of course, lighted and the flight route circuit has been continued from posting 2 fix C, board LN to a suitable posting, say posting 2, at fix N. After the operator of board LN has set the base time, or starting time, for fix C to 11:30, the estimated arrival time at fix C, and has adjusted his cruising dial of his north-to-south calculator to the cruising speed of airplane 122, he will depress the transfer button NSTB (not shown) but see transfer button WETB (Fig. 8G) and will, at the same time, depress the token jack C2T, board LN (Fig. 15B). Depression of this token jack C2T will cause its associated contact 13 (not shown) to apply alternating current to the route circuit on board LN, extending from posting 2 fix C to posting 2 fix N, to cause the alternating current relay N2ER (not shown) to be energized. Depression of the transfer button NSTB will, of course, cause the master posting relay MPR for board LN (not shown) to be energized to cause direct current from battery B*ln* to be applied to wire 308 (Fig. 11F). This current may flow through the sneak circuit preventing rectifier 309 (Fig. 15B) through front contact 310 of relay C2ER, through back contact 809 of token repeating relay C2TP and through push contact 808 of the token jack C2T (Fig. 15B), the closed contacts 808 and 809 manifesting that the token jack has been depressed without a token therein, and through rectifier 805 to the outer ring 801 of the hundreds digit posting unit IC2H. This current may flow from the outer ring 801 through movable contact 1 in its raised position, due to roller 599, through rectifier shunting wire 811 to bus wire 321, which leads to the wire 1 for the hundreds digit of the identification posting unit IN2H (not shown), at posting 2, fix N, board LN. From thence current may flow through the upper winding of the series relay N2EP (not shown) through a front contact 295 of the alternating current relay N2ER of fix N (not shown) over wire 296 and through front contact 297 of the master posting relay MPR, board LN (not shown) back to the terminal (—) of the battery B*ln*. These various devices at fix N are not shown but are identical to devices at any "through" fix-posting, many of which have been shown in the drawings. The operator is compelled to hold the token jack C2T down so long as the reposting operation for identification and arrival time continues. This will, however, not be a hardship since no scanning apparatus is involved in performing this reposting operation and this operation should be completed in less than two seconds. Since energy from the battery B*ln* was used, the operator of board AF could simultaneously have performed a posting operation on his board provided it did not involve the flight route 122. Complete posting on both boards on a flight route extending over both boards cannot be made simultaneously because both of the alternating current relays at the common fix would have to be picked up simultaneously and these relays, such as C1ER (Figs. 11D and 11F) are so interlocked that they can be energized only one at a time.

Obviously, the reposting operation for the tens and the units digits is accomplished in exactly the same manner as the reposting of identification of the hundreds digit just described is accomplished. All of these three digit posting operations take place simultaneously. The rectifiers 805, 806 and 807 are provided to prevent unauthorized current flow in run-around circuits. It is thus seen that airplane identification may be posted on the second board without the employment of a token on such second board, this identification posting at all postings beyond the common fix-posting being copied off of the identification posting unit at such common fix through the medium of contacts associated with such common fix-posting units, which contacts, including the outer ring 801, are employed to shunt the sneak circuit preventing rectifier $140^3$ in the particular lead-in wire which leads to the raised movable contact, such as contact 1 of posting unit IC2H and contacts 2 of posting units IC2T and IC2U. This feature of permitting a route initiated on the first board to be extended without the employment of any token of any kind on such second board is very desirable, in that, if a plurality of tokens having the same identifying characteristic were employed there would be a possibility that two flight routes might be inadvertently assigned the same identifying number, or other character, on the same control board and flight progress board. If this were possible a real dangerous condition might exist in that the pilot of one flight route, such as a first flight route 122, might report his arrival over a certain fix and thus in turn resulting in the over-report operator posting an over-report arrival time on the board for another flight 122. This could very easily happen if two such flight routes 122 had been assigned to different postings in the same altitude of a particular fix. If this were the case the operator might possibly advance the token of the wrong route and cancel that portion of the route to the rear of such token which under the above assumption would still be occupied by an airplane. This portion of the route having been accidentally cancelled the operator might now set up a route conflicting with such cancelling portion of the route under consideration and in turn set up a hazardous condition which might result in airplane collision. It is believed unnecessary to further discuss the routes set up from left to right and starting at posting 1, fix A on board AF and ending at posting 2, fix N, board LN, in that the manner in which a route extending over two different boards is cancelled step by step has already been fully discussed.

Attention is again directed to the fact that scanners are required when airplane identification numbers are posted from a token; whereas, no scanners are necessary when such airplane identification is reposted, so to speak, that is, is posted off of other airplane identification posting units under conditions when a route is extended on a second board. The reason for not requiring a scanner in reposting airplane identification for a flight route on a second board is due to the fact that the particular posting at a particular fix has been identified by the operator when holding the token jack for that posting and fix down, and also by reason of the provision of sneak circuit preventing rectifiers such as $140^2$ (Figs. 15A and 15B) which remove the necessity of scanning contacts. Obviously, airplane identification may also be reposted off of the identification posting units shown in Fig. 15A of the drawings to other posting units at other fixes on the board AF in the same manner as just described for board LN.

As hereinbefore pointed out the operator of a particular ground route control board after each tentative setting up of a proposed route, by establishing the route circuit and lighting the various push button lights on his control board and the various direction arrow lights on the flight progress board, will compare the estimated arrival time still standing on his calculator with the arrival times of flight routes on the flight progress board which are in space conflict with the proposed route and then by comparing the various estimated arrival times he will be able to determine whether or not there is probable actual conflict. By "space conflict" is meant that two routes may actually traverse the same space and by "actual conflict" is meant the condition when two flight routes not only traverse the same space but they traverse such space at the same time or within such a small period of time, say 10 minutes, that a dangerous and hazardous condition is set up. In order to get a more clear understanding of the conditions under which space conflict or actual conflict exist flight routes 75, 78, 227, 229 and 231 have been displayed on the flight progress board as illustrated in Fig. 4 of the drawings.

It will be observed that flight routes 75, 78 and 227 extend from left to right; whereas, flight routes 229 and 231 are from right to left.

Referring first to flight routes 227 and 229, it will be observed that no space conflict exists between fixes A and B, because the flight route 227 exists at altitude 4000, whereas, the flight route 229 exists at altitude 5000. Between fixes B and C, however, space conflict does exist in that flight route 227 leaves fix B at altitude 4000 to enter fix C at altitude 5000 and flight route 229 leaves fix C at altitude 6000 to enter fix B at altitude 5000. Although these two flight routes are in space conflict they are not in actual conflict if each pilot is instructed to delay his ascent or descent, as the case may be, until he has passed beyond the mid point between fixes B and C. This is true in spite of the fact that both airplanes are scheduled to enter the section B—C in opposite directions at the same time, namely, at 11:27.

Referring now to flight routes 78 and 231 it will be observed that no space conflict exists between these routes between fixes A and B because all of flight route 231 between these fixes A and B traverses altitude 7000 where the flight route 78 between fixes A and B traverse the 8000 foot altitude. Between fixes B and C, however, there is space conflict because flight route 78 leaves fix B at altitude 8000 for fix C at altitude 13,000; whereas, flight route 231 from east to west leaves fix C at altitude 8000 and descends to altitude 7000 at fix B. It will be readily seen that this space conflict may be made safe even though both airplanes enter section B—C at the same time (11:27) by instructing each pilot to make his ascent or descent, as the case may be, in the first half of the distance during his flight between fixes B and C.

Referring now to flight route 75 and 78 with respect to each other it will be observed that no space conflict between these routes between fixes A and B exist, because flight route 75 is above altitude 10,000 and flight route 78 is below altitude 10,000. Between fixes B and C, however, these two flight routes cross each other. It will be observed that the airplane 78 flying on flight route 78 has a much higher cruising speed than does the airplane 75. This is readily ascertained from the fact that airplane 78 leaves point B a period of 8 minutes before airplane 75 does and reaches fix C at a time 14 minutes before airplane 75 reaches fix C. It is this difference in the speed of the two airplanes that establishes actual and dangerous conflict between the two flight routes, which in practice would never be actually established. It may be pointed out that if the airplane 75 on flight route 75 had had an estimated arrival time at fix B at 11:37 instead of 11:35 and had their cruising speeds been the same no time conflict would have existed because there would have been a difference of 10 minutes, considered tolerable, between the leaving time of the two airplanes leaving fix B in the same direction.

It will be remembered that each of the push buttons on each of the control boards is provided with a normally closed cancelling contact, such as contact 60 on the left-hand push button LX and contact 50 on the right-hand push button RX. These cancelling contacts have been provided so that if the operator of a particular control board has actually projected his proposed flight route on the control board but has not yet instructed the pilot of the airplane to proceed over such flight route, the operator may cancel any portion or all of the proposed flight route by pulling out the push buttons involved in the portion of the route to be cancelled. He may then by depressing other push buttons change his flight route to altitudes to remove all hazards and then may again project his airplane identification and the estimated arrival times into the posting units at the various fix-postings on the newly established flight route.

The applicants have thus shown and described several embodiments of their invention in a more or less conventional manner, relying for more complete disclosure of some of the apparatuses employed on co-pending applications, the disclosure of the circuit portions which have been illustrated having been so symmetrically interrelated that the entire system of say 6 fixes each having 24 postings may be built up by extending the circuit portions illustrated. Although several embodiments of the invention have been illustrated, it is desired to be understood that these illustrations do not exhaust all possible physical embodiments of the invention, and it is desired to be understood that various changes, modifications or additions may be made to the embodiments of the invention illustrated, without departing from the spirit or scope of the invention, except as demanded by the scope of the following claims.

What we claim as new is:

1. In an air plane flight route display system, the combination with a display board in which a plurality of fixes are displayed side-by-side in the order in which actual fixes are located on a ground route, a plurality of posting areas one above another for each fix on said board, an indicator for each posting area, manually operable means for establishing a particular route circuit which route circuit if energized renders the proper indicator for each fix active and which route circuit conforms to a particular flight route varying in altitude as the posting areas are located at different heights on the display board, identifying means for each flight route characteristic of an airplane identifying character, an airplane identifying posting unit for each area electrically conditioned and capable of displaying an airplane identifying character, and means including said route circuit and said identifying means and manually controllable for causing the airplane identifying posting unit for each area having its indicator active to be actuated to display the said airplane identifying character.

2. In an airplane flight route display system, the combination with a display board in which a plurality of fixes are displayed side-by-side in the order in which actual fixes are located on a ground route, a plurality of posting areas one above another for each fix on said board, an indicator for each posting area, manually operable means for establishing a particular route circuit which route circuit when energized renders the proper indicator for each fix active and which route circuit conforms to a particular flight route correspondingly varying in altitude to be established, a token for each flight route characteristic of an airplane identifying character, an arrival time calculator, an airplane identifying posting unit for each posting area electrically conditioned and capable of displaying an airplane identifying character, an estimated arrival time posting unit for each area electrically conditionable and capable of displaying the estimated arrival time at that fix for the airplane flying over a particular flight route, and means including said route circuit, said token and said arrival time calculator and manually controllable for causing the airplane identifying posting unit for each area having its indicator active to be conditioned to display the said airplane identifying character and for causing the estimated arrival time posting unit to display the estimated arrival time as manifested by said arrival time calculator for that fix.

3. In an airplane flight route display system, the combination with a display board in which a plurality of fixes are displayed side-by-side in the order in which actual fixes are located on a ground route, a plurality of posting areas one above another for each fix on said board, an indicator for each posting area, manually operable means for establishing a particular route circuit which route circuit when energized renders the proper indicator for each fix active and which route circuit conforms to a particular flight route correspondingly varying in altitude to be established, a token for each flight route characteristic of an airplane identifying number, an airplane identifying posting unit for each posting area electrically conditionable and capable of displaying an airplane identifying number, and means including said route circuit and said token and manually controllable for causing the airplane identifying posting unit for each area having its indicator active to be conditioned to display the said airplane identifying number, and means manually operable to cancel that portion of a route circuit the flight route of which has already been traversed by an airplane.

4. In an airplane flight route and flight progress display system, the combination with a flight progress board having report stations arranged successively horizontally thereon and having a plurality of posting areas for each station arranged one above another, an indicator for each area, an airplane identification posting unit for each area, an estimated arrival time posting unit for each area, manually controllable means for establishing a route circuit which renders active an indicator for one posting area of each of a plurality of successive stations assigned to various altitudes corresponding to the altitudes at which an airplane is to fly over a proposed flight route, an arrival time calculator, identifying means characteristic of the identifying character of an airplane which is to fly over said proposed route, and means including said calculator and said identifying means manually controllable for displaying by said airplane identifying posting units the identifying character of the flight route conforming to the active indicators and for displaying by said estimated arrival time posting unit the estimated arrival times calculated by said calculator.

5. In an airplane flight route and flight progress display system, the combination with a flight progress board having report stations arranged successively horizontally thereon and having a plurality of posting areas for each station arranged one above another, an indicator for each area, an airplane identification posting unit for each area, an estimated arrival time posting unit for each area, manually controllable means for establishing a route circuit which renders active an indicator for one posting area of each of a plurality of successive stations assigned to various altitudes corresponding to the altitudes at which an airplane is to fly over a proposed flight route, an arrival time calculator, a token characteristic of the identifying character of an airplane which is to fly over said proposed route, means including said calculator and said token manually controllable for displaying by said posting units the identifying character of the flight route conforming to the active indicators and for displaying by said estimated arrival time posting unit the estimated arrival times calculated by said calculator, and other means requiring the cooperation of at least two operators for cancelling that portion of a route circuit corresponding to that portion of a route which has already been traversed by such airplane.

6. In an airplane flight route and flight progress display system, the combination with a flight progress board having report stations arranged successively horizontally thereon and having a plurality of posting areas for each station arranged one above another, an indicator for each area, an airplane identification posting unit for each area, an estimated arrival time posting unit for each area, manually controllable means including a token characteristic of the identifying character of an airplane which is to fly over a proposed route for establishing a route circuit which renders active an indicator for one area of each of a plurality of successive stations each area of which is assigned to the altitudes at which such airplane is to fly over such station, an arrival time calculator, means including said calculator and said token manually controllable for displaying by said airplane identifying posting units the identifying character of the flight route conforming to the active indicators and for displaying by said estimated arrival time posting units in the same areas on said board the estimated arrival times calculated by said calculator, and other means distinctively operable for cancelling that portion of a route which has already been traversed by such airplane effective only if the characteristic of the token which established the route circuit corresponds to the identifying character of the reporting airplane and then only if the airplane pilot reports flying at an altitude over a particular station corresponding to the altitude at which the flight route displayed on said board passes over said particular station.

7. In an airplane flight route display system, a display board having report stations thereon arranged horizontally, a plurality of display areas on said board for each station arranged one above another, a token characteristic of a particular airplane, an arrival time calculator, and manually controlled means including said token and said calculator for displaying in a particular area for each station corresponding to the altitude an airplane is to fly over such station the identifying character of the airplane which is to fly over a proposed route as determined by said token and displaying the estimated arrival time of such airplane at such station as determined by said calculator.

8. In an airplane flight route display system, a display board having report stations thereon arranged horizontally, a plurality of display areas on said board for each station arranged one above another, identifying means characteristic of a particular airplane, an arrival time calculator, and means manually controllable and including said identifying means and said calculator for displaying in a particular area for each station corresponding to the altitude an airplane is to fly over such station the identifying character of the airplane which is to fly over a proposed route as determined by contacts operated by said identifying means and displaying the estimated arrival time of such airplane at such station as determined by contacts operated by said calculator.

9. In an airplane flight route display system; a display board having report stations thereon arranged horizontally; a plurality of display areas on said board for each station arranged one above another; a token characteristic of a particular airplane; an arrival time calculator; and means manually controllable and including said token and contacts operated thereby in accordance with the charactertistic of such token, said calculator and contacts operated thereby in accordance with the arrival time manifested thereby, for displaying in a particular area for each station corresponding to the altitude an airplane is to fly over such station the identifying character of the airplane which is to fly over a proposed route as determined by said token and displaying the estimated arrival time of such airplane at such station as determined by said calculator.

10. In an airplane flight route and flight progress display system, the combination with a flight progress board having report stations arranged successively horizontally thereon and having a plurality of posting areas for each station arranged one above another, an indicator for each area, an airplane identification posting unit for each area, an estimated arrival time posting unit for each area, manually controllable means including a token characteristic of the identifying character of an airplane which is to fly over a proposed route for establishing a route circuit which renders active an indicator for one area of each of a plurality of successive stations assigned to various altitudes corresponding to the altitudes at which such airplane is to fly over such proposed flight route, an arrival time calculator, means including said calculator and said token manually controllable for displaying by said airplane identifying posting units the identifying character of the airplane in the areas having their indicators a flight route conforming to the actual flight route and for displaying by said estimated arrival time posting units in the same areas on said board the estimated arrival times calculated by said calculator, and other means distinctively manually operable for cancelling that portion of a route circuit corresponding to that portion of the actual route which has already been traversed by such airplane effective only if the characteristic of the token which established the route circuit corresponds to the identifying character of the airplane reported by the pilot and then only if the airplane pilot reports flying at an altitude over a particular station corresponding to the altitude at which the flight route displayed on said board passes through said particular station.

11. In an airplane flight route display system, the combination with a display board on which a plurality of fixes are displayed side-by-side in the order in which actual fixes are located on a ground route, a plurality of posting areas one above another for each fix on said board, an airplane identification posting unit for each posting area, identifying means characteristic of the identifying character of a particular airplane, means including said identifying means and other manually operable means for establishing a route circuit which electrically identifies a plurality of posting areas one for each of a plurality of successive fixes where each posting area represents a particular airway altitude, and other manually operable means including said route circuit and also including said identifying means for operating each of the airplane identification posting units located in posting areas electrically identified by said route circuit to display the airplane identifying character.

12. In an airplane flight route display system, the combination with a display board on which a plurality of fixes are displayed side-by-side in the order in which actual fixes are located on a ground route, a plurality of posting areas one above another for each fix on said board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a plurality of posting areas one for each of a plurality of successive fixes where each posting area represents a particular airway altitude, and other manually operable means including said route circuit said arrival time calculator and said token for operating each of said arrival time posting units and each of the airplane identification posting units located in posting areas electrically identified by said route circuit to display the arrival time for that fix and the airplane identifying character, respectively.

13. In an airplane flight route display system, the combination with a display board on which a plurality of fixes are displayed side-by-side in the order in which actual fixes are located on a ground route, a plurality of posting areas one above another for each fix on said board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a plurality of posting areas one for each of a plurality of successive fixes where each posting area represents a particular airway altitude in that fix, and other manually operable means including said route circuit and also including said token and said calculator for operating each of the airplane identification posting units and each of the arrival time posting units located in posting areas electrically identified by said route circuit to display the airplane identifying character and the arrival time respectively, and other means distinctively manually operable for cancelling that portion of said route circuit corresponding to that portion of the actual route which has already been traversed by the airplane assigned to said actual route effective only if the characteristic of the token used in establishing the route circuit corresponds to the identifying character of the airplane reported by the pilot.

14. In an airplane flight route display system, the combination with a display board on which a plurality of fixes are located on a ground route, a plurality of posting areas one above another for each fix on said board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a plurality of posting areas one for each of a plurality of successive fixes where each posting area represents a particular airway altitude in that fix, and other manually operable means including said route circuit and also including said token and said calculator for operating each of the airplane identification posting units and each of the arrival time posting units located in posting areas electrically identified by said route circuit to display the airplane identifying character and the arrival time respectively, and other means distinctively manually operable for cancelling that portion of said route circuit corresponding to that portion of the actual route which has already been traversed by the airplane assigned to said actual route effective only if the characteristic of the token used in establishing the route circuit corresponds to the identifying character of the airplane reported by the pilot and then only if the pilot reports flying at an altitude over a particular fix corresponding to the altitude to which the electrically identified posting area for that fix has been assigned.

15. In an airplane flight route and flight progress display system, the combination with a flight progress board having report stations arranged successively horizontally thereon and having a plurality of posting areas for each station arranged one above another, an airplane identification posting unit for each area, an arrival time indicator for each area, an arrival time calculator, manually controllable means including said calculator and a token characteristic of the identifying character of a particular airplane for establishing a route circuit characteristic of a proposed route over which said airplane is to fly for rendering active the posting units in the areas assigned to the altitudes over the various report stations at which said airplane is instructed to fly and for indicating only by said posting unit the identifying character of said airplane and by its time indicator its arrival time at each report station as determined by said token and calculator respectively, and other means distinctively manually operable for cancelling that portion of a route circuit corresponding to that portion of the actual route which has already been traversed by such airplane.

16. In an airplane flight route and flight progress display system, the combination with a flight progress board having report stations arranged successively horizontally thereon and having a plurality of posting areas for each station arranged one above another, an airplane identification posting unit for each area, an arrival time calculator, manually controllable means including said calculator and a token characteristic of the identifying character of a particular airplane for establishing a route circuit characteristic of a proposed route over which said airplane is to fly for rendering active the posting units in the areas assigned to the altitudes over the various report stations at which said airplane is instructed to fly and for indicating by said posting unit the identifying character of said airplane and by its time indicator its arrival time at each report station as determined by said token and calculator respectively, and other means distinctively manually operable for cancelling that portion of a route circuit corresponding to that portion of the actual route which has already been traversed by such airplane effective only if the airplane identified by the report pilot agrees with the airplane identified by said token.

17. In an airplane flight route and flight progress display system, the combination with a flight progress board having report stations arranged successively horizontally thereon and having a plurality of posting areas for each station arranged one above another, an airplane identification posting unit for each area, an arrival time indicator for each area, an arrival time calculator, manually controllable means including said calculator and a token characteristic of the identifying character of a particular airplane for establishing a route circuit characteristic of a proposed route over which said airplane is to fly for rendering active the posting units in the areas assigned to the altitudes over the various report stations at which said airplane is instructed to fly and for indicating by said posting unit the identifying character of said airplane and its arrival time at each report station as determined by said calculator and token, and other means distinctively manually operable for cancelling that portion of a route circuit corresponding to that portion of the actual route which has already been traversed by such airplane effective only if the airplane reported by the pilot is the same as that characterized by said token and then only if such airplane is reported flying at an altitude over a particular fix which agrees to the altitude to which the posting area rendered active for that fix is assigned.

18. In an airplane flight route display system, the combination with a display board in which a plurality of fixes are displayed side-by-side in the order in which actual fixes are located on a ground route, a plurality of posting areas one above another for each fix on said board, an airplane identification posting unit for each posting area, an arrival time posting unit for each posting area, an over-report time posting unit for each posting area, an arrival time calculator, a token characteristic of the identifying character of a particular airplane, means including said token and manually operable means for establishing a route circuit which electrically identifies a plurality of posting areas one for each of a plurality of successive fixes where each posting area represents a particular airway altitude in that fix, other manually operable means including said route circuit and also including said token and said calculator for operating each of the airplane identification posting units and each of the arrival time posting units located in posting areas electrically identified by said route circuit to display the airplane identifying character and the arrival time respectively, and another means distinctively manually operable for operating the over-report time posting unit for a particular fix to indicate the time the pilot reports his arrival over that fix effective only if the identity of the airplane reported by that pilot agrees with the identifying characteristics of that token.

19. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, a token characteristic of the identifying character of a particular airplane, means including said token, and other manually operable means for establishing a route circuit which electrically identifies a plurality of posting areas one for each of a plurality of successive stations in a ground route irrespective of whether such stations are located only on one or on a plurality of display boards where each posting area represents a particular airway altitude over that station, and other manually operable means including said route circuit and also including said token for conditioning each of the airplane identification posting units located in posting areas electrically identified by said route circuit to display the airplane identification character.

20. In an airplane flight route display system, the combination with a display board in which a plurality of fixes are displayed side-by-side in the order in which actual fixes are located on a ground route, a plurality of posting areas one above another for each fix on said board, an airplane identification posting unit for each posting area, an arrival time posting unit for each posting area, an over-report time posting unit for each posting area, an arrival time calculator, a token characteristic of the identifying character of a particular airplane, means including said token and manually operable means for establishing a route circuit which electrically identifies a plurality of posting areas one for each of a plurality of successive fixes where each posting area represents a particular airway altitude in that fix, other manually operable means including said route circuit and also including said token and said calculator for operating each of the airplane identification posting units and each of the arrival time posting units located in posting areas electrically identified by said route circuit to display the airplane identifying character and the arrival time respectively, and another means distinctively manually operable for operating the over-report time posting unit for a particular fix to indicate the time the pilot reports his arrival over that fix effective only if the identity of the airplane reported by that pilot agrees with the identifying characteristic of that token and then only if the pilot reports flying at an altitude over that fix corresponding to the altitude to which the route circuit electrically identified posting area for that fix has been assigned.

21. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a pluraliay of posting areas one for each of a plurality of successive stations in a ground route irrespective of whether such stations are located only on one or on a plurality of display boards where each posting area represents a particular airway altitude over that station, and other manually operable means including said route circuit, said calculator and also including said token for conditioning each of the airplane identification posting units and arrival time posting units located in posting areas electrically identified by said route circuit to display the airplane identification character and the arrival time for the airplane at the corresponding report station, respectively.

22. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a plurality of posting areas one for each of a plurality of successive stations in a ground route irrespective of whether such stations are located only on one or on a plurality of display boards where each posting area represents a particular airway altitude over that station, and other manually operable means including said route circuit, said calculator and also including said token for conditioning each of the airplane identification posting units and each of the arrival time posting units located in posting areas electrically identified by said route circuit to display the airplane identification character and the arrival time for the airplane at the corresponding report station, respectively, and other means distinctively operable for cancelling that portion of a route circuit corresponding to that portion of the actual route which has already been traversed by such airplane.

23. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, an arrival time posting unit for each posting area, an arrival time calculator, a token characteristic of the identifying character of a particular airplane, means including said token and other manually operable means for establishing a route circuit which electrically identifies a plurality of posting areas one for each of a plurality of successive stations in a ground route irrespective of whether such stations are located only on one or on a plurality of display boards where each posting area represents a particular airway altitude over that station, and other manually operable means including said route circuit, said calculator and also including said token for conditioning each of the airplane identification posting units and each of the arrival time posting units located in posting areas electrically identified by said route circuit to display the airplane identification character and the arrival time for the airplane at the corresponding report station, respectively, and other means distinctively operable for cancelling that portion of a route circuit corresponding to that portion of the actual route which has already been traversed by such airplane effective only if the distinctive operation identifying an airplane agrees with the characteristic of the token associated with the route circuit to be cancelled.

24. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, a token characteristic of the identifying character of a particular airplane, means including said token and other manually operable means for establishing a route circuit which electrically identifies a plurality of posting areas one for each of a plurality of successive stations in a ground route irrespective of whether such stations are located only on· one or on a plurality of display boards where each posting area represents a particular airway altitude over that station, and other manually operable means including said route circuit and also including said token for conditioning each of the ariplane identification posting units located in posting areas electrically identified by said route circuit to display the airplane identification character, and other means distinctively operable for cancelling that portion of a route circuit corresponding to that portion of the actual route which has already been traversed by such airplane.

25. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, a token characteristic of the identifying character of a particular airplane, means including said token and other manually operable means for establishing a route circuit which electrically identifies a plurality of posting areas one for each of a plurality of successive stations in a ground route irrespective of whether such stations are located only on one or on a plurality of display boards where each posting area represents a particular airway altitude over that station, and other manually operable means including said route circuit and also including said token conditioning each of the airplane identification posting units located in posting areas electrically identified by said route circuit to display the airplane identification character, and other means distinctively operable for cancelling that portion of the route circuit corresponding to that portion of the actual route which has already been traversed by such airplane effective only if the distinctive operation identifying an airplane agrees with the characteristic of the token associated with the route circuit to be cancelled.

26. In an airplane flight route display system, the combination with a plurality of display boards on each of which a plurality of report stations are displayed side-by-side in the same order in which corresponding actual stations are located on a ground route and of which a particular report station is common to a plurality of such display boards if a plurality of ground routes include that particular station, a plurality of posting areas one above another on each board for each station on each board, an airplane identification posting unit for each posting area, a token characteristic of the identifying character of a particular airplane, means including said token and other manually operable means for establishing a route circuit which electrically identifies a plurality of posting areas one for each of a plurality of successive stations in a ground route irrespective of whether such stations are located only on one or on a plurality of display boards where each posting area represents a particular airway altitude over that station, and other manually operable means including said route circuit and also including said token for conditioning each of the airplane identification posting units located in posting areas electrically identified by said route circuit to display the airplane identification character, and other means distinctively operable for cancelling that portion of a route circuit corresponding to that portion of the actual route which has already been traversed by such airplane effective only if the distinctive operation identifying an airplane agrees with the characteristic of the token associated with the route circuit to be cancelled and then only if the distinctive operation identifies the same altitude at the report station reported by the pilot as the altitude assigned to the posting area for that station on the board for that route circuit.

27. In an airplane flight route display system, a display board having report stations thereon arranged horizontally, a plurality of display areas on said board for each station arranged one above another, a control board corresponding to said display board provided with corresponding report stations and having a control area for each corresponding display area on the display board, a token characteristic of a particular airplane, an arrival time calculator, manually controlled means associated with each control area, a token receptacle associated with each control area, and means including said token when located in one of said receptacles and the control means of control areas corresponding to certain altitudes over certain stations for displaying in corresponding display areas on said display board corresponding to the altitude an airplane is to fly over such station the identifying character of the airplane which is to fly over a proposed route as determined by said token and displaying the estimated arrival time of such airplane at such station as determined by said calculator.

28. In an airplane flight route display system, the combination with a control board and a display board, a plurality of report stations arranged horizontally on each of said boards in the same order as actual report stations are located in a ground route, a plurality of control areas arranged one above another for each report station on said control board, a display area on said display board for each control area on said control board, a token receptacle for each control area, manually operable means for each control area, a token characteristic of a particular airplane, an airplane identifying posting unit for each display area, and means including said token in position in one of said receptacles effective if the manually operable means for certain control areas on said control board are actuated to display by the airplane identifying posting units in corresponding display areas on said display board the identifying character of such particular airplane.

29. In an airplane flight route display system, the combination with a control board and a display board, a plurality of report stations arranged horizontally on each of said boards in the same order as actual report stations are located in a ground route, a plurality of control areas arranged one above another for each report station on said control board, a display area on said display board for each control area on said control board, a token receptacle for each control area, manually operable means for each control area, a token characteristic of a particular airplane, an indicator in each display area, an airplane identifying posting unit for each display area, and means including said token inserted in one of said receptacles effective if the manually operable means for certain control areas on said control board are actuated to render active the indicator in corresponding display areas, and other means manually operable and including said token for displaying by the airplane identifying posting units located in display areas having their indicators active the identifying character characterized by said token.

30. In an airplane flight route display system, the combination with a control board and a display board, a plurality of report stations arranged horizontally on each of said boards in the same order as actual report stations are located in a ground route, a plurality of control areas arranged one above another for each report station on said control board, a display area on said display board for each control area on said control board, two manually operable buttons arranged side by side for each control area, an indicating lamp for each button, a direction arrow light for each direction in each display area, and means effective if two adjacent buttons of adjacent stations are operated to set up a flight route in a particular direction the indicating lamps associated with the operated buttons will be lighted and the direction arrow light indicating that direction in one of the two corresponding display areas is lighted.

31. In an airplane flight route display system, the combination with two ground routes each having a plurality of successive fixes of which one fix is common to both ground routes, a display board for each ground route each having successive fixes thereon in the same order as on its ground route, a plurality of posting areas one above another for each fix on each board, an airplane identifying posting unit for each posting area, identifying means to characterize a particular airplane, means for establishing a route circuit which electrically identifies a plurality of posting areas one for each of a plurality of successive fixes on one of said boards and including the fix common to one fix on said other board where each posting area represents a particular airway altitude, and other manually operable means including said route circuit and also including said identifying means for operating each of the airplane identifying posting units located in posting areas electrically identified by said route circuit and also the posting unit for the corresponding area of the common fix on said other board to display the airplane identifying character.

32. In an airplane flight route display system, the combination with two ground routes each having a plurality of successive fixes of which one fix is common to both ground routes, a display board for each ground route each having successive fixes thereon in the same order as on its ground route, a plurality of posting areas one above another for each fix on each board, an airplane identifying posting unit for each posting area, a token characteristic of the identifying character of a particular airplane, means including said token and including other manually operable means for establishing a route circuit which electrically identifies a plurality of posting areas one for each of a plurality of successive fixes on one of said boards and including the fix common to one fix on said other board where each posting area represents a particular airway altitude, and other manually operable means including said route circuit and also including said token for operating each of the airplane identifying posting units located in posting areas electrically identified by said route circuit and also the posting unit for the corresponding area of the common fix on said other board to display the airplane identifying character.

33. In an airplane flight route display system, the combination with two ground routes each having a plurality of successive fixes of which one fix is common to both ground routes, a display board for each ground route each having successive fixes thereon in the same order as on its ground route, a plurality of posting areas one above another for each fix on each board, an airplane identifying posting unit and an arrival time posting unit for each posting area, identifying means characteristic of the identifying character of a particular airplane, an arrival time calculator for each board for calculating the airplane arrival time for each fix on that board, means for establishing a route circuit which electrically identifies a plurality of posting areas one for each of a plurality of successive fixes on one of said boards and including the common fix on said other board where each posting area represents a particular airway altitude, and other manually operable means including said route circuit and also including said identifying means and said arrival time calculator for operating each of the airplane identifying posting units and each of the arrival time posting units located in posting areas electrically identified by said route circuit and also the posting units for the corresponding area of the common fix on said other board to display the airplane identifying character and the arrival time for each particular fix.

34. In an airplane flight route display system, the combination with two ground routes each having a plurality of successive fixes of which one fix is common to both ground routes, a display board for each ground route each having successive fixes thereon in the same order as on its ground route, a plurality of posting areas one above another for each fix on each board, an airplane identifying posting unit and an arrival time posting unit for each posting area, identifying means characteristic of the identifying character of a particular airplane, an arrival time calculator for each board for calculating the airplane arrival time for each fix on that board, means for establishing a route circuit which electrically identifies a plurality of posting areas one for each of a plurality of successive fixes on one of said boards and including the common fix on said other board where each posting area represents a particular airway altitude, other manually operable means including said route circuit and also including said identifying means and said arrival time calculator for operating each of the airplane identifying posting units and each of the arrival time posting units located in posting areas electrically identified by said route circuit and also the posting units for the corresponding area of the common fix on said other board to display the airplane identifying character and the arrival time for each particular fix, and means including the airplane identifying posting unit at the common fix on said other board displaying said airplane identifying character and including the arrival time calculator for such other board for extending such flight route on said other board by the display of said airplane identifying character and the proper arrival time in the proper posting areas at successive fixes beyond such common fix on said other board.

35. In an airplane flight route display system, the combination with two ground routes each having a plurality of successive fixes of which one fix is common to both ground routes, a display board for each ground route each having successive fixes thereon in the same order as on its ground route, a plurality of posting areas one above another for each fix on each board, an airplane identifying posting unit for each posting area, identifying means characteristic of the identifying character of a particular airplane, means for establishing a route circuit which electrically identifies a plurality of posting areas one for each of a plurality of successive fixes on one of said boards and including the common fix on said other board where each posting area represents a particular airway altitude, and other manually operable means including said route circuit and also including said identifying means for operating each of the airplane identifying posting units located in posting areas electrically identified by said route circuit and also the posting unit for the corresponding area of the common fix on said other board to display the airplane identifying character, and means including the airplane identifying posting unit at the common fix on said other board displaying said airplane identifying character for extending such flight route on said other board by the display of said airplane identifying character in the proper posting areas at successive fixes beyond such common fix on said other board.

36. In an airplane flight route display system, the combination with two ground routes each having a plurality of successive fixes of which one fix is common to both routes, a display board and a control board for each route each display board having successive fixes thereon in the same order as on its ground route, a plurality of posting areas one above another for each fix on each board, a control area on each control board for each posting area on its associated display board, control means for each control area which if operated in conjunction with a control means in a control area of an adjacent fix will display a flight route between corresponding posting areas of the corresponding control board, and means including said control means for permitting such a flight route to be set up out of a posting area of a common fix but preventing such a flight route to be set up into such common fix if such flight route was initiated on the other board.

SEDGWICK N. WIGHT.
OSCAR S. FIELD.